US012380845B2

(12) United States Patent
Wang et al.

(10) Patent No.: US 12,380,845 B2
(45) Date of Patent: Aug. 5, 2025

(54) DISPLAY SUBSTRATE AND PREPARATION METHOD THEREOF, DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Shilong Wang, Beijing (CN); Haigang Qing, Beijing (CN); Yunsheng Xiao, Beijing (CN); Ziyang Yu, Beijing (CN); Zhiliang Jiang, Beijing (CN); Ming Hu, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/779,587

(22) PCT Filed: Jul. 30, 2021

(86) PCT No.: PCT/CN2021/109653
§ 371 (c)(1),
(2) Date: May 25, 2022

(87) PCT Pub. No.: WO2023/004763
PCT Pub. Date: Feb. 2, 2023

(65) Prior Publication Data

US 2024/0194134 A1 Jun. 13, 2024

(51) Int. Cl.
*G09G 3/3233* (2016.01)

(52) U.S. Cl.
CPC ....... *G09G 3/3233* (2013.01); *G09G 2310/08* (2013.01); *G09G 2320/0233* (2013.01); *G09G 2330/021* (2013.01)

(58) Field of Classification Search
CPC ............ G09G 3/3233; G09G 2310/08; G09G 2320/0233; G09G 2330/021; G09G 3/20; G09F 9/00
See application file for complete search history.

(56) References Cited

U.S. PATENT DOCUMENTS

2017/0178571 A1 6/2017 Kang et al.
2019/0157363 A1 5/2019 Lee
(Continued)

FOREIGN PATENT DOCUMENTS

CN 107919090 A 4/2018
CN 207557624 U 6/2018
(Continued)

OTHER PUBLICATIONS

Hyun-Sik Kim et al., "An Active-Matrix OLED Driver CMOS IC With Compensation of Non-Uniform Routing-Line Resistances in Ultra-Thin Panel Bezel", IEEE Journal of Solid-State Circuits, vol. 53, No. 2, pp. 484-500, Feb. 2018.

*Primary Examiner* — Jeff Piziali
(74) *Attorney, Agent, or Firm* — Ling Wu; Stephen Yang; Ling and Yang Intellectual Property

(57) ABSTRACT

A display substrate and a preparation method thereof, and a display apparatus is provided in the present disclosure. The display substrate include a drive circuit layer disposed on the substrate, the drive circuit layer includes a plurality of circuit units, the circuit units include a pixel drive circuit and a data signal wire providing a data signal to the pixel drive circuit and an initial signal wire providing an initial signal; the plurality of circuit units includes at least one normal circuit unit and at least one tracing circuit unit, the normal circuit unit is provided with a first compensation line extending along a first direction and a second compensation line extending along a second direction.

20 Claims, 24 Drawing Sheets

(56) References Cited

U.S. PATENT DOCUMENTS

| | | | | |
|---|---|---|---|---|
| 2020/0043990 | A1* | 2/2020 | Huangfu | H10K 59/131 |
| 2020/0243021 | A1 | 7/2020 | Li et al. | |
| 2020/0279521 | A1 | 9/2020 | Ma et al. | |
| 2021/0159284 | A1* | 5/2021 | Huang | H01L 27/1255 |
| 2021/0183313 | A1* | 6/2021 | Dong | H10K 59/1216 |
| 2021/0241672 | A1 | 8/2021 | Gao et al. | |
| 2021/0305285 | A1 | 9/2021 | Long et al. | |
| 2021/0333671 | A1 | 10/2021 | Fu | |
| 2022/0037447 | A1* | 2/2022 | Cho | H10K 59/88 |
| 2022/0310010 | A1 | 9/2022 | Cheng et al. | |

FOREIGN PATENT DOCUMENTS

| | | | | |
|---|---|---|---|---|
| CN | 108598142 | A | 9/2018 | |
| CN | 109658824 | A | 4/2019 | |
| CN | 109686311 | A | 4/2019 | |
| CN | 109754753 | A | 5/2019 | |
| CN | 109976052 | A | 7/2019 | |
| CN | 109991788 | A | 7/2019 | |
| CN | 110599955 | A | 12/2019 | |
| CN | 110751922 | A | 2/2020 | |
| CN | 111047969 | A | 4/2020 | |
| CN | 111128080 | A | 5/2020 | |
| CN | 112051691 | A | 12/2020 | |
| CN | 112310125 | A | 2/2021 | |
| CN | 112530354 | A | 3/2021 | |
| CN | 212647220 | U | 3/2021 | |
| CN | 112703606 | A | 4/2021 | |
| CN | 213212167 | U | 5/2021 | |
| KR | 10-2015-0064277 | A | 6/2015 | |
| WO | WO-2020054994 | A1 * | 3/2020 | G09G 3/3233 |

* cited by examiner

DISPLAY SUBSTRATE AND PREPARATION METHOD THEREOF, DISPLAY APPARATUS

CROSS-REFERENCE TO RELATED APPLICATION

This application is a national stage application of PCT Application No. PCT/CN2021/109653, which is filed on Jul. 30, 2021, and entitled "Display Substrate and Preparation Method Thereof, Display Apparatus", the content of which should be regarded as being incorporated herein by reference.

TECHNICAL FIELD

The present disclosure relates, but is not limited, to the technical field of display, and particularly to a display substrate and a preparation method thereof, a display apparatus.

BACKGROUND

An Organic Light Emitting Diode (OLED) and a Quantum-dot Light Emitting Diode (QLED) are active light emitting display devices, which have the advantages of self-luminescence, a wide viewing angle, high contrast, low power consumption, an extremely high response speed, lightness and thinness, bendability, a low cost, etc. With the constant development of a display technology, a flexible display that uses an OLED or a QLED as a light emitting device and performs signal control by a Thin Film Transistor (TFT for short) has become a mainstream product in the field of display at present.

SUMMARY

The following is a summary about subject matters described in the present disclosure in detail. The summary is not intended to limit a scope of protection of claims.

In one aspect, the present disclosure provides a display substrate including a drive circuit layer disposed on the substrate, wherein the drive circuit layer includes a plurality of circuit units, the circuit unit includes a pixel drive circuit and a data signal wire providing a data signal to the pixel drive circuit and an initial signal wire providing an initial signal; the plurality of circuit units includes at least one normal circuit unit and at least one wiring circuit unit, the normal circuit unit is provided with a first compensation line extending along a first direction and a second compensation line extending along a second direction, the tracing circuit unit is provided with a first data fan-out line extending along the first direction or a second data fan-out line extending along the second direction, the first data fan-out line or the second data fan-out line is connected with the data signal wire, the first direction intersects with the second direction; an orthographic projection of the first compensation line in a plane of the display substrate is at least partially overlapped with an orthographic projection of the initial signal wire in the plane of the display substrate.

In an exemplary implementation, the normal circuit unit further includes a first power supply line providing a power supply signal to the pixel drive circuit, a body portion of the first power supply line extends along the second direction, and the second compensation line is connected with the first power supply line through a via.

In an exemplary implementation, an orthographic projection of the second compensation line in the plane of the display substrate is at least partially overlapped with an orthographic projection of the first power supply line in the plane of the display substrate.

In an exemplary implementation, the normal circuit unit further includes a first power supply line providing a power supply signal to the pixel drive circuit, a body portion of the first power supply line extends along the second direction, and at least a portion of the second compensation line is disposed between the first power supply line and the data signal wire.

In an exemplary implementation, the initial signal wire includes a first initial signal wire and a second initial signal wire, body portions of the first initial signal wire and second initial signal wire extend along the first direction, and an orthographic projection of the first compensation line in the plane of the display substrate is at least partially overlapped with an orthographic projection of the first initial signal wire or second initial signal wire in the plane of the display substrate.

In an exemplary implementation, the initial signal wire further includes an initial signal connection line, a body portion of the initial signal connection line extends along the second direction, the initial signal connection line is connected with the first initial signal wire.

In an exemplary implementation, the second compensation line is connected with the initial signal connection line through a via.

In an exemplary implementation, an orthographic projection of the second compensation line in the plane of the display substrate is at least partially overlapped with an orthographic projection of the initial signal connection line in the plane of the display substrate.

In an exemplary implementation, the first compensation line and the second compensation line intersect with each other and are interconnected into an integrated structure.

In an exemplary implementation, two second compensation lines are connected at a side of the first compensation line in the second direction or at a side of the first compensation line in an opposite direction of the second direction, and the two second compensation lines are connected with each other by a connection strip extending along the first direction.

In an exemplary implementation, the tracing circuit unit includes a first circuit unit provided with the first data fan-out line and a second circuit unit provided with the second data fan-out line; the first circuit unit is further provided with any one or more of the following: a third compensation line, a fifth compensation line and a seventh compensation line; the second circuit unit is further provided with any one or more of the following: a fourth compensation line, a sixth compensation line and an eighth compensation line.

In an exemplary implementation, the third compensation line and fifth compensation line both extend along the second direction; at a side of the first data fan-out line in the second direction, the third compensation line is arranged at intervals from the first data fan-out line; at a side of the first data fan-out line in the second direction, the fifth compensation line and the first data fan-out line are connected with each other.

In an exemplary implementation, the seventh compensation line extends along the second direction; at a side of the first data fan-out line in the second direction, two seventh compensation lines are arranged at intervals from the first data fan-out line, and the two seventh compensation lines are connected with each other by a connection strip extending along the first direction.

In an exemplary implementation, the first circuit unit further includes a first power supply line providing a power supply signal to the pixel drive circuit, a body portion of the first power supply line extends along the second direction, and the third compensation line or the seventh compensation line is connected with the first power supply line through a via.

In an exemplary implementation, an orthographic projection of the third compensation line, or the fifth compensation line, or the seventh compensation line in the plane of the display substrate is at least partially overlapped with an orthographic projection of the first power supply line in the plane of the display substrate.

In an exemplary implementation, the first circuit unit further includes a first power supply line providing a power supply signal to the pixel drive circuit, a body portion of the first power supply line extends along the second direction, and at least a portion of the third compensation line, or the fifth compensation line, or the seventh compensation line is disposed between the first power supply line and the data signal wire.

In an exemplary implementation, the first circuit unit further includes an initial signal connection line, a body portion of the initial signal connection line extends along the second direction, and the third compensation line, or the fifth compensation line, or the seventh compensation line is connected with the initial signal connection line through a via.

In an exemplary implementation, an orthographic projection of the third compensation line, or the fifth compensation line, or the seventh compensation line in the plane of the display substrate is at least partially overlapped with an orthographic projection of the initial signal connection line in the plane of the display substrate.

In an exemplary implementation, the fourth compensation line and eighth compensation line both extend along the first direction; at a side or both sides of the second data fan-out line in the first direction, the fourth compensation line is arranged at intervals from the second data fan-out line; at both sides of the second data fan-out line in the first direction, the eighth compensation line and the second data fan-out line are connected with each other.

In an exemplary implementation, the sixth compensation line extends along the first direction; at a side of the second data fan-out line in the first direction or at a side of the second data fan-out line in the opposite direction of the first direction, the sixth compensation line and the second data fan-out line are connected with each other.

In an exemplary implementation, the second circuit unit further includes a first initial signal wire and a second initial signal wire, body portions of the first initial signal wire and the second initial signal wire extend along the first direction, orthographic projections of the fourth compensation line, the sixth compensation line and the eighth compensation line in the plane of the display substrate is at least partially overlapped with an orthographic projection of the first initial signal wire or the second initial signal wire in the plane of the display substrate.

In an exemplary implementation, the second circuit unit further includes an initial signal connection line, a body portion of the initial signal connection line extends along the second direction, and the fourth compensation line is connected with the initial signal connection line through a via.

In an exemplary implementation, the second circuit unit further includes a first power supply line providing a power supply signal to the pixel drive circuit, a body portion of the first power supply line extends along the second direction, and the fourth compensation line is connected with the first power supply line through a via.

In an exemplary implementation, the initial signal wire includes a first initial signal wire and a second initial signal wire, body portions of the first initial signal wire and second initial signal wire extend along the first direction, and an orthographic projection of the first data fan-out line in the plane of the display substrate is at least partially overlapped with an orthographic projection of the first initial signal wire or second initial signal wire in the plane of the display substrate.

In an exemplary implementation, the circuit unit further includes a first power supply line providing a power supply signal to the pixel drive circuit, a body portion of the first power supply line extends along the second direction, and an orthographic projection of the second data fan-out line in the plane of the display substrate is at least partially overlapped with an orthographic projection of the first power supply line in the plane of the display substrate.

In an exemplary implementation, the circuit unit further includes a first power supply line providing a power supply signal to the pixel drive circuit, a body portion of the first power supply line extends along the second direction, and at least a portion of the second data fan-out line is disposed between the first power supply line and the data signal wire.

In an exemplary implementation, the initial signal wire further includes an initial signal connection line, a body portion of the initial signal connection line extends along the second direction, and an orthographic projection of the second data fan-out line in the plane of the display substrate is at least partially overlapped with an orthographic projection of the initial signal connection line in the plane of the display substrate.

In an exemplary implementation, in a plane perpendicular to the display substrate, the drive circuit layer includes a first conductive layer, a second conductive layer, a third conductive layer and a fourth conductive layer arranged in sequence on the substrate, and insulating layers are arranged between the first conductive layer and the second conductive layer, between the second conductive layer and the third conductive layer, and between the third conductive layer and the fourth conductive layer; the first compensation line, the second compensation line, the first data fan-out line and the second data fan-out line are arranged on the same layer.

In an exemplary implementation, the data signal wire is disposed in a different conductive layer from the first data fan-out line and the second data fan-out line, and the first data fan-out line or the second data fan-out line is connected with the data signal wire through a via.

In an exemplary implementation, the data signal wire is disposed in the third conductive layer, and the first data fan-out line and the second data fan-out line are disposed in the fourth conductive layer.

In an exemplary implementation, the data signal wire is disposed in the fourth conductive layer, and the first data fan-out line and the second data fan-out line are disposed in the third conductive layer.

In an exemplary implementation, a first initial signal wire of the initial signal wire is disposed in the second conductive layer, and an initial signal connection line of the initial signal wire is disposed in the third conductive layer, the initial signal connection line is connected with the first initial signal wire through a via.

In an exemplary implementation, the data signal wire and the first power supply line are arranged on the same layer.

In another aspect, the present disclosure further provides a display apparatus, including the aforementioned display substrate.

In another aspect, the present disclosure further provides a preparation method for a display substrate, including:

forming a drive circuit layer on the substrate; the drive circuit layer includes a plurality of circuit units, the circuit units include a pixel drive circuit and a data signal wire providing a data signal to the pixel drive circuit and an initial signal wire providing an initial signal; the plurality of circuit units includes at least one normal circuit unit and at least one tracing circuit unit, the normal circuit unit is provided with a first compensation line extending along a first direction and a second compensation line extending along a second direction, the tracing circuit unit is provided with a first data fan-out line extending along the first direction or a second data fan-out line extending along the second direction, the first direction intersects with the second direction; an orthographic projection of the first compensation line in a plane of the display substrate is at least partially overlapped with an orthographic projection of the initial signal wire in the plane of the display substrate.

Other aspects will become apparent upon reading and understanding the drawings and detailed description.

BRIEF DESCRIPTION OF DRAWINGS

Accompany drawings are used to provide understanding of technical solutions of the present disclosure, and form a part of the description. They are used to explain the technical solutions of the present disclosure together with embodiments of the present disclosure, and do not form a limitation on the technical solutions of the present disclosure.

Figure 1:
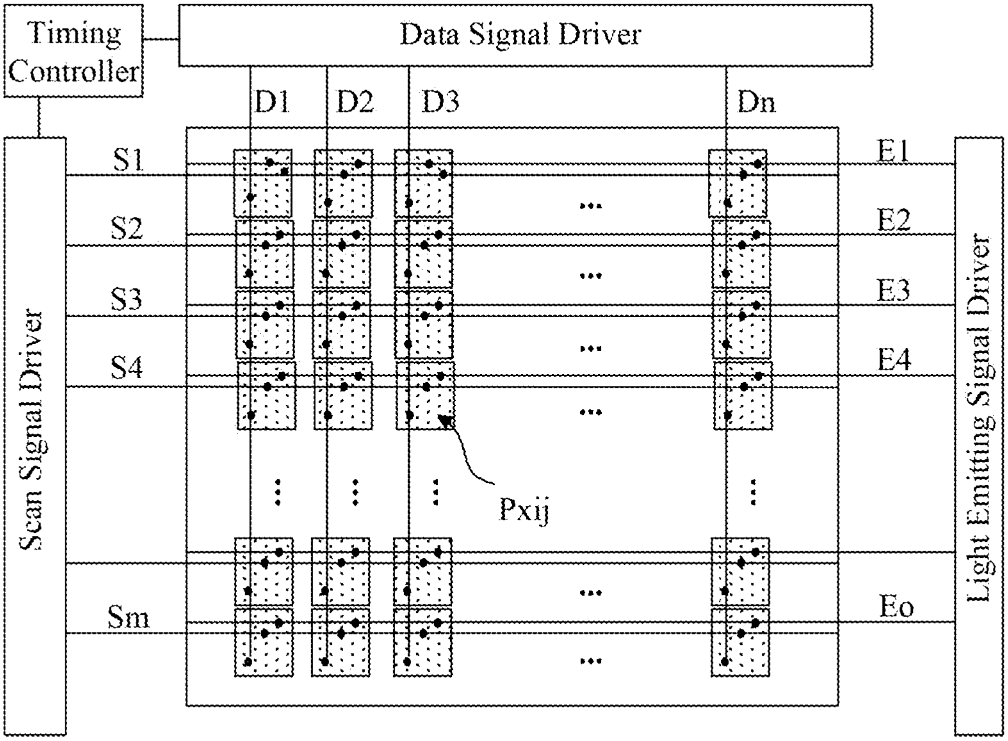
FIG. 1 is a schematic diagram of a structure of a display apparatus.

Description of reference signs:

| | | |
|---|---|---|
| 11-first active layer; | 12-second active layer; | 13-third active layer; |
| 14-fourth active layer; | 15-fifth active layer; | 16-sixth active layer; |
| 17-seventh active layer; | 21-first scan signal wire; | 21-1-gate block; |
| 22-second scan signal wire | 23- light emission control line; | 24-first plate; |
| 31-first initial signal wire; | 32-second initial signal wire; | 33-second plate; |
| 34-shield electrode; | 35-opening; | 41-first power supply line; |
| 42-data signal wire; | 43-initial signal connection line; | 44-first connection electrode; |
| 45-second connection electrode; | 46-third connection electrode; | 50-data fan-out line; |
| 51-first data fan-out line; | 52-second data fan-out line; | 53-first anode connection electrode; |
| 60-lead line; | 61-Second anode connection electrode; | 71-first compensation line; |
| 72-second compensation line; | 73-third compensation line; | 74-fourth compensation line; |
| 75-fifth compensation line; | 76-sixth compensation line; | 77-seventh compensation line; |
| 78-eighth compensation line; | 100-display region; | 101-substrate; |
| 102-drive circuit layer; | 103-light emitting structure layer; | 104-encapsulation layer; |
| 110-normal region; | 111-first wiring region; | 112-second wiring region; |
| 200-bonding region; | 201-lead region; | 202-bending region; |
| 210-transistor; | 211-storage capacitor; | 300-bezel region; |
| 301-anode; | 302-pixel define layer; | 303-organic light emitting layer; |
| 304-cathode; | 401-first encapsulation layer; | 402-second encapsulation layer; |
| 403-third encapsulation layer. | | |

DETAILED DESCRIPTION

In order to make the objects, technical solutions and advantages of the present disclosure more clear, the embodiments of the present disclosure will be described in detail below in combination with the drawings. It is to be noted that implementation modes may be implemented in multiple different forms. Those of ordinary skill in the art can easily understand such a fact that manners and contents may be transformed into various forms without departing from the purpose and scope of the present disclosure. Therefore, the present disclosure should not be construed as being only limited to the contents described in the following implementation modes. The embodiments in the present disclosure and features in the embodiments may be combined randomly with each other if there is no conflict.

The proportion of the drawings in the present disclosure can be used as a reference in the actual process, but is not limited thereto. For example, the width-length ratio of the channel, the thickness and spacing of each film layer, and the width and spacing of each signal wire can be adjusted according to the actual needs. The number of pixels in the display substrate and the number of sub-pixels in each pixel are not limited to the number shown in the drawings. The drawings described in the present disclosure are schematic structure diagrams only, and one implementation of the present disclosure is not limited to the shapes, numerical values or the like shown in the drawings.

Ordinal numerals “first”, “second”, “third”, etc., in the specification are set not to form limits in number but only to avoid confusion of constituent elements.

In the specification, for convenience, wordings indicating directional or positional relationships, such as “center”, “upper”, “lower”, “front”, “back”, “vertical”, “horizontal”, “top”, “bottom”, “inside”, and “outside”, are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The position relationships between the constituent elements change appropriately according to the direction in which the various constituent elements are described. Therefore, appropriate replacements may be made according to situations without being limited to the expressions described in the specification.

In the specification, unless otherwise specified and defined explicitly, terms “mount”, “mutually connect”, and “connect” should be understood in a broad sense. For example, it may be a fixed connection, or a detachable connection, or an integrated connection. It may be a mechanical connection or an electrical connection. It may be a direct mutual connection, or an indirect connection through middleware, or internal communication between two elements. Those of ordinary skill in the art may understand specific meanings of these terms in the present disclosure according to specific situations.

In the specification, a transistor refers to a component which at least comprises three terminals, i.e., a gate electrode, a drain electrode and a source electrode. The transistor has a channel region between the drain electrode (drain electrode terminal, drain region, or drain electrode) and the source electrode (source electrode terminal, source region, or source electrode), and a current may flow through the drain electrode, the channel region and the source electrode. It is to be noted that, in the specification, the channel region refers to a region that the current mainly flows through.

In the specification, a first electrode may be the drain electrode, and a second electrode may be the source electrode. Or, the first electrode may be the source electrode, and the second electrode may be the drain electrode. In a case that transistors with opposite polarities are used, or a direction of a current changes during work of a circuit, or the like, functions of the “source electrode” and the “drain electrode” are sometimes interchangeable. Therefore, the “source electrode” and the “drain electrode”, as well as the “source terminal” and the “drain terminal” are interchangeable in the specification.

In the specification, an “electrical connection” includes a case that constituent elements are connected together through an element with some electrical function. The “element with some electrical function” is not particularly limited as long as electrical signals may be sent and received between the connected constituent elements. Examples of the “element with a certain electric action” include not only an electrode and wiring, but also a switching element such as a transistor, a resistor, an inductor, a capacitor, other elements with various functions, etc.

In the specification, "parallel" refers to a state in which an angle formed by two straight lines is above −10° and below 10°, and thus also includes a state in which the angle is above −5° and below 5°. In addition, "perpendicular" refers to a state in which an angle formed by two straight lines is 80° or more and 100° or less, and thus also includes a state in which the angle is 85° or more and 95° or less.

In the specification, a "film" and a "layer" are interchangeable. For example, sometimes a "conductive layer" may be replaced with a "conducting film". Similarly, sometimes an "insulating film" may be replaced with an "insulating layer".

Triangle, rectangle, trapezoid, pentagon or hexagon in this specification are not strictly defined, but can be approximate triangle, rectangle, trapezoid, pentagon or hexagon, etc. There can be some small deformation caused by tolerance, and there may be a chamfer, arc edge and deformation, etc.

In the present disclosure, "about" refers to that a boundary is defined not so strictly and numerical values in process and measurement error ranges are allowed.

FIG. 1 is a schematic diagram of a structure of a display apparatus. As shown in FIG. 1, the display apparatus may include a timing controller, a data driver, a scan driver, a light emitting driver and a pixel array. The timing controller is connected with the data driver, the scan driver and the light emitting driver respectively, the data driver is connected with a plurality of data signal wires (D1 to Dn) respectively, the scan driver is connected with a plurality of scan signal wires (S1 to Sm) respectively, and the light emitting driver is connected with a plurality of light emitting signal wires (E1 to Eo) respectively. The pixel array may include a plurality of sub-pixels Pxij, i and j may be natural numbers, at least one sub-pixel Pxij may include a circuit unit and a light emitting device connected with the circuit unit, and the circuit unit may include at least one scan signal wire, at least one data signal wire, at least one light emitting signal wire and a pixel drive circuit. In an exemplary implementation, the timing controller may provide a gray value and a control signal, which are suitable for the specification of the data driver, to the data driver; provide a clock signal, a scan start signal, etc., which are suitable for the specification of the scan driver, to the scan driver; and provide a clock signal, a transmit stop signal, etc., which are suitable for the specification of the light emitting driver, to the light emitting driver. The data signal driver may generate a data voltage to be provided to the data signal wires D1, D2, D3, . . . , and Dn using the gray-scale value and the control signal that are received from the timing controller. For example, the data driver may sample the gray value using the clock signal and apply a data voltage corresponding to the gray value to the data signal wires D1 to Dn by taking a pixel row as a unit, wherein n may be a natural number. The scan signal driver may receive the clock signal, the scan starting signal, etc., from the timing controller to generate a scan signal to be provided to the scan signal wires S1, S2, S3, . . . , and Sm. For example, the scan driver may provide sequentially a scan signal with a turn-on level pulse to the scan signal wires S1 to Sm. For example, the scan driver may be constructed in a form of a shift register and may generate a scan signal in such a manner as to transmit sequentially the scan start signal provided in a form of a turn-on level pulse to a next-stage circuit under the control of the clock signal, wherein m may be a natural number. The light emitting signal driver may receive the clock signal, the emission stopping signal, etc., from the timing controller to generate an emission signal to be provided to the light emitting signal wires E1, E2, E3, . . . , and Eo. For example, the light emitting driver may provide sequentially a transmit signal with a turn-off level pulse to the light emitting signal wires E1 to Eo. For example, the light emitting driver may be constructed in a form of a shift register and may generate a transmit signal in such a manner as to transmit sequentially the transmit stop signal provided in a form of a turn-off level pulse to a next-stage circuit under the control of the clock signal, wherein o may be a natural number.

Figure 2:
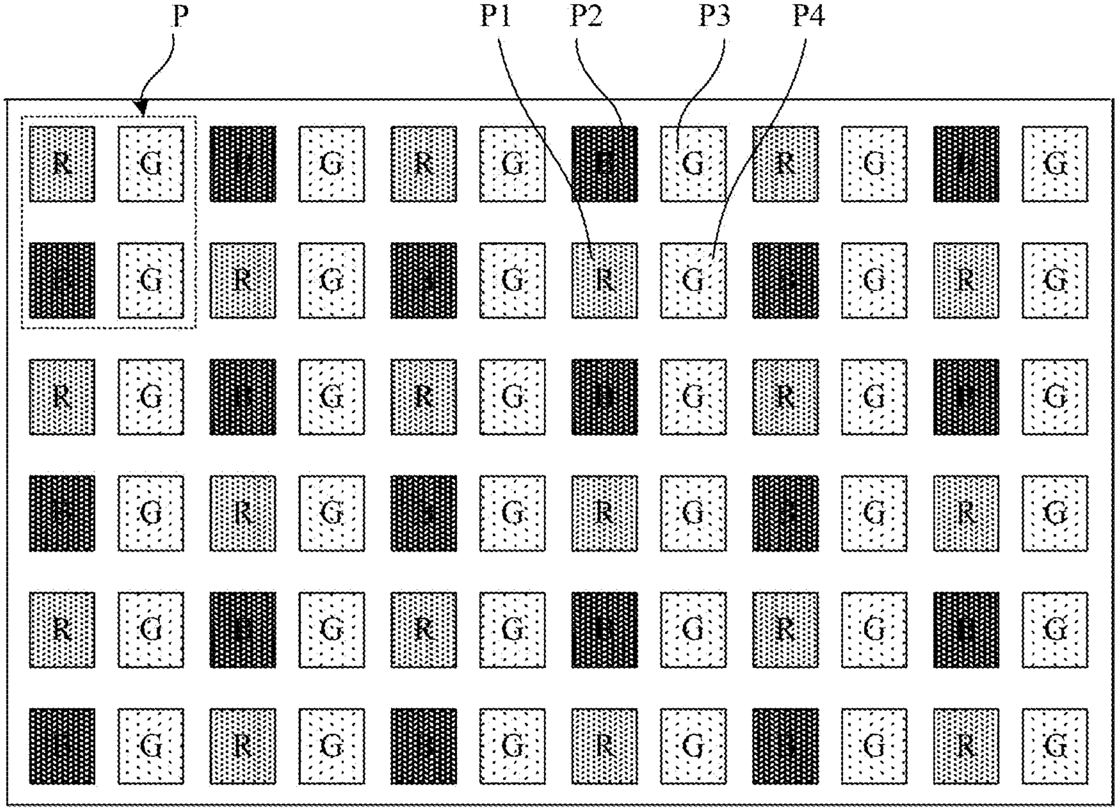
FIG. 2 is a schematic diagram of a planar structure of a display substrate.

FIG. 2 is a schematic diagram of a planar structure of a display substrate. In an exemplary implementation, the display substrate may include a plurality of pixel units P arranged in a matrix manner, at least one pixel unit P may include one first sub-pixel P1 emitting a first color light, one second sub-pixel P2 emitting a second color light, and one third sub-pixel P3 and one fourth sub-pixel P4 emitting a third color light, each of the four sub-pixels may include a circuit unit and a light emitting device, the circuit unit may include a scan signal wire, a data signal wire and a light emitting signal wire and a pixel drive circuit, the pixel drive circuit is respectively connected with the scan signal wire, the data signal wire, and the light emitting signal wire, the pixel drive circuit is configured to receive the data voltage transmitted by the data signal wire and output a corresponding current to the light emitting device under the control of the scan signal wire and the light emitting signal wire. The light emitting device in each sub-pixel is respectively connected with the pixel drive circuit of the sub-pixel where the light emitting device is located, and the light emitting device is configured to emit light with a corresponding luminance in response to a current output by the pixel drive circuit of the sub-pixel where the light emitting device is located.

In an exemplary implementation, the first sub-pixel P1 may be a red sub-pixel (R) emitting red light, the second sub-pixel P2 may be a blue sub-pixel (B) emitting blue light, and the third sub-pixel P3 and the fourth sub-pixel P4 may be green sub-pixels (G) emitting green light. In an exemplary implementation, a shape of the sub-pixel may be a rectangle, a rhombus, a pentagon, or a hexagon. In one exemplary implementation, four sub-pixels may be arranged in a Square manner to form a GGRB pixel arrangement. In other exemplary embodiments, the four sub-pixels may be arranged side by side horizontally, side by side vertically, or diamond-shaped manner, which is not limited in the present disclosure. In an exemplary implementation, the pixel unit P may include three sub-pixels, wherein the three sub-pixels may be arranged side by side horizontally, side by side vertically, or in a form of pyramid, which is not limited in the present disclosure.

In an exemplary implementation, a plurality of sub-pixels sequentially arranged in the horizontal direction are referred to as a pixel row, and a plurality of sub-pixels sequentially arranged in the vertical direction are referred to as a pixel column, and a plurality of pixel rows and a plurality of pixel columns constitute a pixel array arranged in an array.

Figure 3:
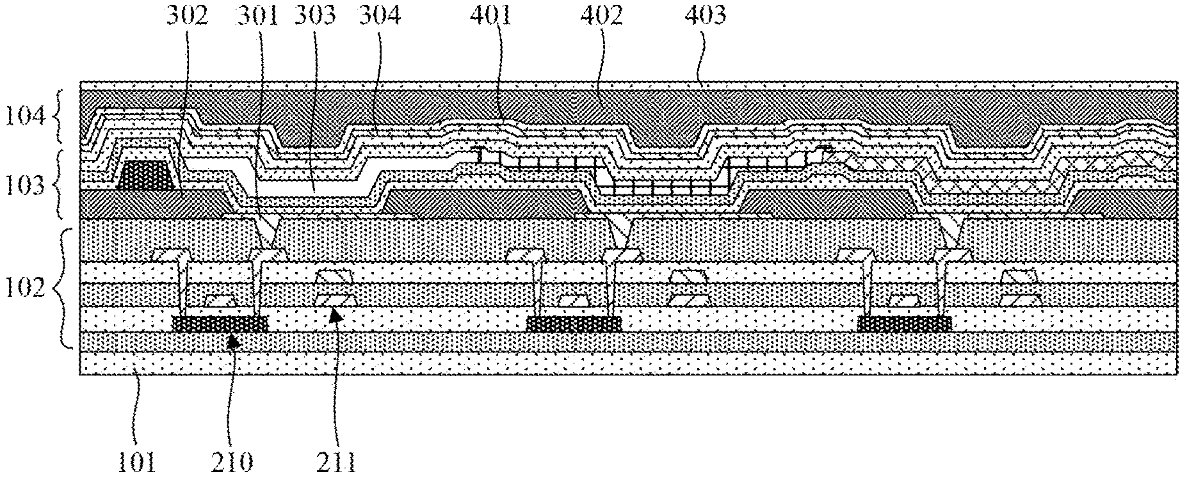
FIG. 3 is a schematic diagram of a sectional structure of a display substrate.

FIG. 3 is a schematic diagram of a sectional structure of a display substrate, and illustrates a structure of three sub-pixels of the display substrate. As shown in FIG. 3, on a plane perpendicular to the display substrate, the display substrate may include a drive circuit layer 102 arranged on a substrate 101, a light emitting structure layer 103 arranged at a side of the drive circuit layer 102 away from the substrate, and an encapsulation layer 104 arranged at a side of the light emitting structure layer 103 away from the substrate. In some possible implementation modes, the display substrate may include another film layer, such as spacer posts, which is not limited in the present disclosure.

In an exemplary implementation mode, the substrate 101 may be a flexible substrate, or a rigid substrate. The drive circuit layer 102 of each sub-pixel may include a plurality of signal wires and a pixel drive circuit, the pixel drive circuit may include a plurality of transistors and a storage capacitor. In FIG. 3, only one drive transistor 210 and one storage capacitor 211 are taken as an example for illustration. The light emitting structure layer 103 of each sub-pixel may include a plurality of film layers forming a light emitting device, the plurality of film layers may include an anode 301, a pixel define layer 302, an organic light emitting layer 303, and a cathode 304. The anode 301 is connected with a drain electrode of a drive transistor 210 through a via. The organic light emitting layer 303 is connected with the anode 301. The cathode 304 is connected with the organic light emitting layer 303. The organic light emitting layer 303 is driven by the anode 301 and the cathode 304 to emit light of a corresponding color. The encapsulation layer 104 may include a first encapsulation layer 401, a second encapsulation layer 402, and a third encapsulation layer 403 that are stacked, wherein the first encapsulation layer 401 and the third encapsulation layer 403 may be made of an inorganic material, the second encapsulation layer 402 may be made of an organic material, and the second encapsulation layer 402 is arranged between the first encapsulation layer 401 and the third encapsulation layer 403 so as to prevent external water vapor from entering the light emitting structure layer 103.

In an exemplary implementation, the organic light emitting layer 303 may include a hole injection layer (HIL), a hole transport layer (HTL), an electron block layer (EBL), a light emitting layer (EML), a hole block layer (HBL), an electron transport layer (ETL) and an electron injection layer (EIL) that are stacked. In an exemplary implementation, the hole injection layers and the electron injection layers of all the sub-pixels may be connected together as a common layer, the hole transport layers and the electron transport layers of all the sub-pixels may be connected together as a common layer, the hole block layers of all the sub-pixels may be connected together as a common layer, and the light emitting layers and the electron block layers of adjacent sub-pixels may be slightly overlapped with each other, or may be isolated from each other.

Figure 4:
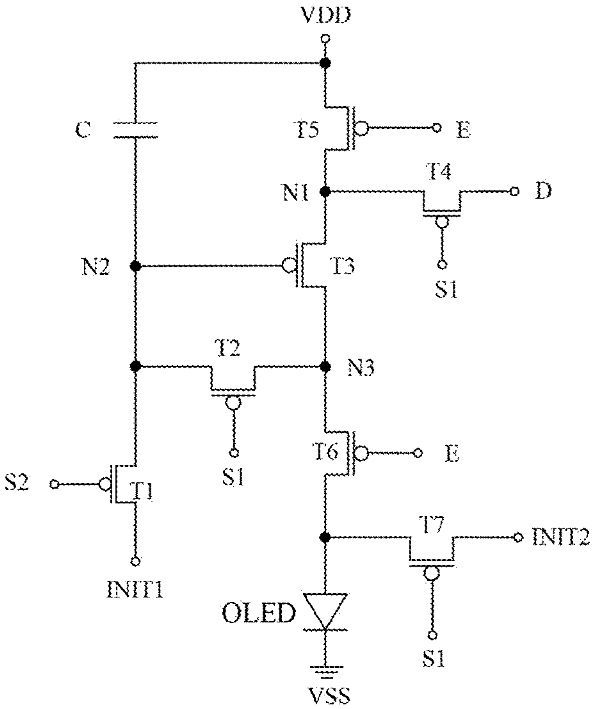
FIG. 4 is a schematic diagram of an equivalent circuit of a pixel drive circuit.

In an exemplary implementation, the pixel drive circuit may be of a 3T1C, 4T1C, 5T1C, 5T2C, 6T1C, 7T1C or 8T1C structure. FIG. 4 is a schematic diagram of an equivalent circuit of a pixel drive circuit. As shown in FIG. 4, the pixel drive circuit may include seven transistors (a first transistor T1 to a seventh transistor T7), one storage capacitor C, and the pixel drive circuit is respectively connected with eight signal wires (a data signal wire D, a first scan signal wire S1, a first scan signal wire S2, a light emitting signal wire E, a first initial signal wire INIT1, a second initial signal wire INIT2, a first power supply line VDD, and a second power supply line VSS).

In an exemplary implementation, the pixel drive circuit may include a first node N1, a second node N2, and a third Node N3. The first node N1 is respectively connected with a first electrode of the third transistor T3, a second electrode of the fourth transistor T4 and a second electrode of the fifth transistor T5, the second node N2 is respectively connected with a second electrode of the first transistor, a first electrode of the second transistor T2, a control electrode of the third transistor T3 and the second terminal of the storage capacitor C, and the third node N3 is respectively connected with a second electrode of the second transistor T2, a second electrode of the third transistor T3 and a first electrode of the sixth transistor T6.

In an exemplary implementation mode, a first terminal of the storage capacitor C is connected with the first power supply line VDD, and a second terminal of the storage capacitor C is connected with a second node N2, namely the second terminal of the storage capacitor C is connected with a control electrode of the third transistor T3.

A control electrode of the first transistor T1 is connected with the second scan signal wire S2, a first electrode of the first transistor T1 is connected with the first initial signal wire INIT1, and a second electrode of the first transistor is connected with the second node N2. When a scan signal with an on-level is applied to the second scan signal wire S2, the first transistor T1 transmits a first initial voltage to the control electrode of the third transistor T3 so as to initialize a charge amount of the control electrode of the third transistor T3.

A control electrode of the second transistor T2 is connected with the first scan signal wire S1, a first electrode of the second transistor T2 is connected with the second node N2, and a second electrode of the second transistor T2 is connected with a third node N3. When a scan signal with an on-level is applied to the first scan signal wire S1, the second transistor T2 enables the control electrode of the third transistor T3 to be connected with the second electrode thereof.

The control electrode of the third transistor T3 is connected with the second node N2, namely the control electrode of the third transistor T3 is connected with the second terminal of the storage capacitor C, a first electrode of the third transistor T3 is connected with a first node N1, and a second electrode of the third transistor T3 is connected with the third node N3. The third transistor T3 may be referred to as a drive transistor, and the third transistor T3 determines an amount of a drive current flowing between the first power supply line VDD and the second power supply line VSS according to a potential difference between the control electrode and the first electrode of the third transistor T3.

A control electrode of the fourth transistor T4 is connected with the first scan signal wire S1, a first electrode of the fourth transistor T4 is connected with the data signal wire D, and a second electrode of the fourth transistor T4 is connected with the first node N1. The fourth transistor T4 may be referred to as a switch transistor, a scanning transistor, etc., and when a scan signal with an on-level is applied to the first scan signal wire S1, the fourth transistor T4 enables a data voltage of the data signal wire D to be input to the pixel drive circuit.

A control electrode of the fifth transistor T5 is connected with the light emitting signal wire E, a first electrode of the fifth transistor T5 is connected with the first power supply line VDD, and a second electrode of the fifth transistor T5 is connected with the first node N1. A control electrode of the sixth transistor T6 is connected with the light emitting signal wire E, a first electrode of the sixth transistor T6 is connected with the third node N3, and a second electrode of the sixth transistor T6 is connected with a first electrode of the light emitting device. The fifth transistor T5 and the sixth transistor T6 may be referred to as light emitting transistors. When a light emitting signal with an on-level is applied to the light emitting signal wire E, the fifth transistor T5 and the sixth transistor T6 form a drive current path between the first power supply line VDD and the second power supply line VSS to enable the light emitting device to emit light.

A control electrode of the seventh transistor T7 is connected with the first scan signal wire S1, a first electrode of the seventh transistor T7 is connected with the second initial signal wire INIT2, and a second electrode of the seventh transistor T7 is connected with a first electrode of the light emitting device. When a scan signal with an on-level is applied to the first scan signal wire S1, the seventh transistor T7 transmits a second initial voltage to the first electrode of the light emitting device so as to initialize a charge amount accumulated in the first electrode of the light emitting device or release a charge amount accumulated in the first electrode of the light emitting device.

In an exemplary implementation, the light emitting device may be an OLED including a first electrode (anode), an organic light emitting layer, and a second electrode (cathode), which are stacked, or may be a QLED including a first electrode (anode), a quantum dot light emitting layer, and a second electrode (cathode), which are stacked.

In an exemplary implementation mode, a second electrode of the light emitting device is connected with the second power supply line VSS, a signal of the second power supply line VSS is a low-level signal, and a signal of the first power supply line VDD is a high-level signal continuously provided. The first scan signal wire S1 is a scan signal wire in the pixel drive circuit of a present display row, and the second scan signal wire S2 is a scan signal wire in the pixel drive circuit of a previous display row. That is, for an N-th display row, the first scan signal wire S1 is S(n), and the second scan signal wire S2 is S(n−1). The second scan signal wire S2 of the present display row and the first scan signal wire S1 in the pixel drive circuit of the previous display row are the same signal wire. Signal wires of the display panel may be reduced, so that the display panel has a narrow bezel.

In an exemplary implementation mode, the first transistor T1 to the seventh transistor T7 may be P-type transistors or N-type transistors. Use of the same type of transistors in a pixel drive circuit may simplify a process flow, reduce process difficulties of a display panel, and improve a yield of a product. In some possible implementation modes, the first transistor T1 to the seventh transistor T7 may include P-type transistors and N-type transistors.

In an exemplary implementation mode, the first transistor T1 to the seventh transistor T7 may be low temperature poly-silicon thin film transistors, or may be oxide thin film transistors, or may be low temperature poly-silicon thin film transistors and oxide thin film transistors. An active layer of the low temperature poly-silicon thin film transistor may be Low Temperature Poly-Silicon (LTPS for short), and an active layer of the oxide thin film transistor may be an Oxide semiconductor. The low temperature poly-silicon thin film transistor has advantages such as high migration rate and fast charging. The oxide thin film transistor has advantages such as low leakage current. The low temperature poly-silicon thin film transistor and the oxide thin film transistor are integrated on one display substrate to form a Low Temperature Polycrystalline Oxide (LTPO for short) display substrate, so that advantages of the low temperature poly-silicon thin film transistor and the oxide thin film transistor can be utilized, low-frequency drive can be realized, power consumption can be reduced, and display quality can be improved.

Figure 5:
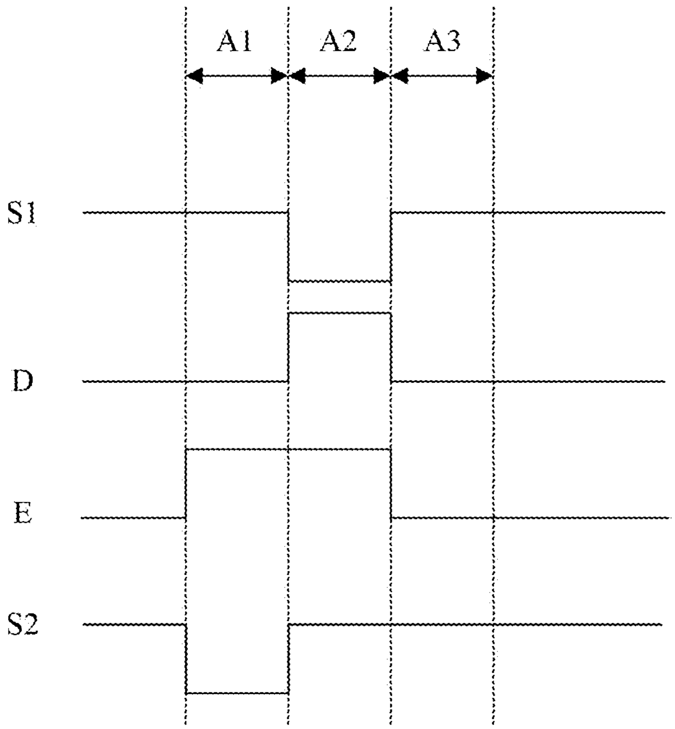
FIG. 5 is an operation timing diagram of a pixel drive circuit.

FIG. 5 is an operation timing diagram of a pixel drive circuit. The exemplary implementation of the present disclosure will be described below through a working process of the pixel drive circuit shown in FIG. 4. In FIG. 4, the pixel drive circuit includes seven thin film transistors (a first transistor T1 to a seventh transistor T7), one storage capacitor C, and eight signal wires (a data signal wire D, a first scan signal wire S1, a first scan signal wire S2, a light emitting signal wire E, a first initial signal wire INIT1, a second initial signal wire INIT2, a first power supply line VDD, and a second power supply line VSS). All the seven transistors are P-type transistors.

In an exemplary implementation, taking an OLED as example, the working process of the pixel drive circuit may include the following stages.

In a first stage A1, referred to as a reset stage, a signal of the second scan signal wire S2 is a low-level signal, and signals of the first scan signal wire S1 and the light emitting signal wire E are high-level signals. The signal of the second scan signal wire S2 is the low-level signal, so that the first transistor T1 is turned on, a first initial voltage of the first initial signal wire INIT1 is provided to the second node N2 to initialize the storage capacitor C, thereby clearing an original data voltage in the storage capacitor. The signals of the first scan signal wire S1 and the light emitting signal wire E are high-level signals, so that the second transistor T2, the fourth transistor T4, the fifth transistor T5, the sixth transistor T6, and the seventh transistor T7 are turned off. The OLED does not emit light in this stage.

In a second stage A2, referred to as a data writing stage or a threshold compensation stage, the signal of the first scan signal wire S1 is a low-level signal, the signals of the second scan signal wire S2 and the light emitting signal wire E are high-level signals, and the data signal wire D outputs a data voltage. In this stage, the second terminal of the storage capacitor C is at a low level, so that the third transistor T3 is turned on. The signal of the first scan signal wire S1 is the low-level signal, so that the second transistor T2, the fourth transistor T4, and the seventh transistor T7 are turned on. The second transistor T2 and the fourth transistor T4 are turned on, so that the data voltage output by the data signal wire D is provided to the second node N2 through the first node N1, the turned-on third transistor T3, the third node N3, and the turned-on second transistor T2, and the storage capacitor C is charged with a difference between the data voltage output by the data signal wire D and a threshold voltage of the third transistor T3. A voltage at a second terminal (the second node N2) of the storage capacitor C is $Vd-|Vth|$, wherein Vd is the data voltage output by the data signal wire D, and Vth is the threshold voltage of the third transistor T3. The seventh transistor T7 is turned on, so that the second initial voltage of the second initial signal wire INIT2 is provided to a first electrode of the OLED to initialize (reset) the first electrode of the OLED and clear its internal pre-stored voltage, thereby completing initialization and ensuring that the OLED does not emit light. The signal of the second scan signal wire S2 is the high-level signal, so that the first transistor T1 is turned off. The signal of the light emitting signal wire E is a high-level signal, so that the fifth transistor T5 and the sixth transistor T6 are turned off.

In a third stage A3, referred to as a light emitting stage, the signal of the light emitting signal wire E is a low-level signal, and the signals of the first scan signal wire S1 and the second scan signal wire S2 are high-level signals. The signal of the light emitting signal wire E is the low-level signal, so that the fifth transistor T5 and the sixth transistor T6 are turned on, and a power voltage output by the first power supply line VDD provides a drive voltage to the first electrode of the OLED through the turned-on fifth transistor T5, the third transistor T3, and the sixth transistor T6 to drive the OLED to emit light.

In a drive process of the pixel drive circuit, a drive current flowing through the third transistor T3 (drive transistor) is determined by a voltage difference between a gate electrode and a first electrode of the third transistor T3. A voltage of the second node N2 is Vdata−|Vth|, so that the drive current of the third transistor T3 is as follows.

$$I=K^*(Vgs-Vth)^2=K^*[(Vdd-Vd+|Vth|)-Vth]^2=K^*[(Vdd-Vd]^2$$

I is the drive current flowing through the third transistor T3, i.e., a drive current for driving the OLED, K is a constant, Vgs is the voltage difference between the gate electrode and first electrode of the third transistor T3, Vth is the threshold voltage of the third transistor T3, Vd is the data voltage output by the data signal wire D, and Vdd is the power voltage output by the first power supply line VDD.

With the development of OLED display technologies, consumers have higher requirements for the display effect of display products. Super-narrow bezels have become a new trend in the development of display products. Therefore, bezel narrowing or even a border-less design has received more attention in the design of OLED display products. A display substrate generally includes a display region and a bonding region located at a side of the display region. The bonding region may at least include a first fan-out region, a bending region, a drive chip region and a bonding pin region along the direction away from the display region. The first fan-out region at least includes a data fan-out line. A plurality of data fan-out lines are configured to be connected with data signal wires of the display region in a fan-out wiring manner. The bending region may include a composite insulating layer provided with a groove, and is configured to bend the bonding region to the back of the display region The drive chip region may include an Integrated Circuit (IC for short) and is configured to be connected with the plurality of data fan-out lines. The bonding pin region may include Bonding Pads, and is configured to be bonded to an external Flexible Printed Circuit (FPC for short). Generally, a width of the bonding region is smaller than a width of the display region, the signal wires of the integrated circuit and the bonding pad in the bonding region need to be fanned out through the first fan-out region to be lead into the wider display region, the greater the width difference between the display region and the bonding region, the more oblique fan-out lines in the fan region, the longer the distance between the drive chip region and the display region, so the fan region occupies a large space, which makes it difficult to narrow the lower bezel, and the lower bezel is always maintained at about 2.0 mm.

Figure 6:
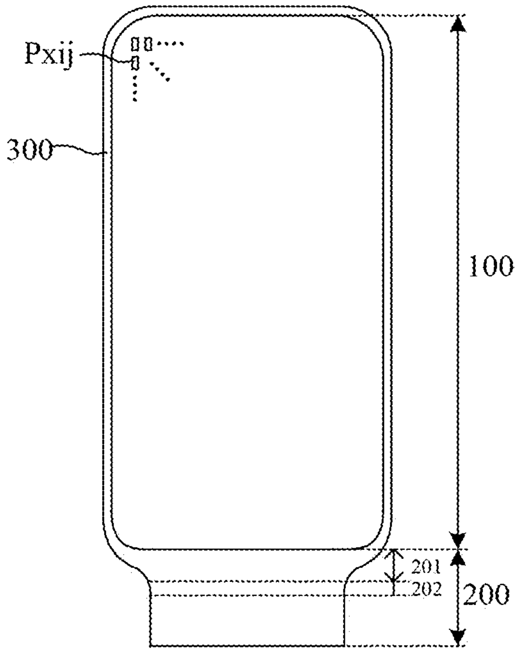
FIG. 6 is a schematic diagram of a planar structure of a display substrate according to an exemplary embodiment of the present disclosure.

FIG. 6 is a schematic diagram of a planar structure of a display substrate according to an exemplary implementation of the present disclosure. As shown in FIG. 6, the display substrate 10 may include a display region 100, a bonding region 200 at a side of the display region 100, and a bezel region 300 at other sides of the display region 100. In an exemplary implementation, the display region 100 may be a planar region, including a plurality of sub-pixels Pxij forming a pixel array, a plurality of data signal wires, and a plurality of data fan-out lines. The plurality of sub-pixels are configured to display a dynamic picture or a static image; the plurality of data signal wires are configured to provide data signals to the plurality of sub-pixels Pxij; the plurality of data fan-out lines are correspondingly connected with the plurality of data lines, and are configured to make the plurality of data signal wires to be connected with a plurality of lead lines in the bonding region 200 through the plurality of data fan-out lines. In an exemplary implementation, the display substrate may be a flexible substrate, and accordingly the display substrate may be deformable, for example, may be crimped, bent, folded, or curled.

In an exemplary implementation, the display region 100 may include a plurality of pixel units arranged in a matrix manner, and at least one pixel unit may include a red sub-pixel R that emits red light, a blue sub-pixel B that emits blue light, a first green sub-pixel G1 that emits green light, and a second green sub-pixel G2 that emits green light. In an exemplary implementation, the red sub-pixel R may include a red light emitting device emitting red light and a red circuit unit connected with the red light emitting device, the blue sub-pixel B may include a blue light emitting device emitting blue light and a blue circuit unit connected with the blue light emitting device, the first green sub-pixel G1 may include a first green light emitting device emitting green light and a first green circuit unit connected with the first green light emitting device, the second green sub-pixel G2 may include a second green light emitting device emitting green light and a second green circuit unit connected with the second green light emitting device, the red circuit unit, the blue circuit unit, the first green circuit unit and the second green circuit unit constitute one circuit unit group, and four circuit units in at least one circuit unit group may be arranged in a square manner. In an exemplary implementation, a plurality of sub-pixels may form a plurality of pixel rows and a plurality of pixel columns, and a plurality of circuit units may form a plurality of circuit unit rows and a plurality of circuit unit columns. A sub-pixel in the present disclosure refers to a region divided according to a light emitting device, and a circuit unit in the present disclosure refers to a region divided according to a pixel drive circuit. In an exemplary implementation, positions of both the sub-pixels and the circuit units may be corresponding or the positions of both the sub-pixels and the circuit units may be not corresponding.

In an exemplary implementation, the bonding region 200 may include a lead region 20, a bending region 202, a drive chip region, and a bonding pin region which are sequentially disposed along a direction away from the display region, and the lead region 201 is connected with the display region 100, the bending region 202 is connected with the lead region 201

In an exemplary implementation, the lead region 201 may be provided with a plurality of lead lines which are mutually parallel. The plurality of lead lines extend along the direction away from the display region, and ends of the plurality of lead lines are correspondingly connected with the plurality of data fan-out lines in the display region 100, and the other ends of the plurality of lead lines go cross the bending region 202 to be connected with an integrated circuit of the drive chip region, so that the integrated circuit applies data signals to the data signal wires through the lead lines and the data fan-out lines. Since there is no need to dispose fan-shaped oblique lines in the lead region, a length of the lead region in the vertical direction is effectively reduced, and a width of the lower bezel is greatly reduced, so that widths of the upper bezel, the lower bezel, the left bezel and the right bezel of the display apparatus are similar and all below 1.0 mm, which increases a screen-to-body ratio and is beneficial to realizing bezel-less display.

Figure 7:
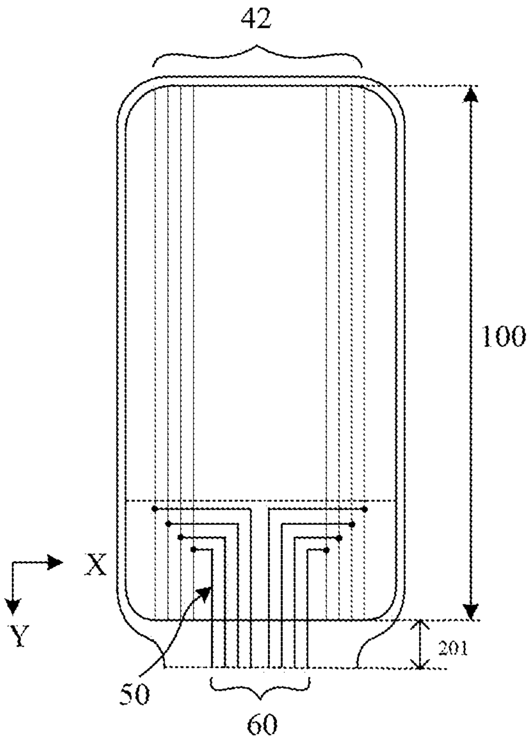
FIG. 7 is a schematic diagram of a structure of a data signal wire and a data fan-out line according to an exemplary embodiment of the present disclosure.

FIG. 7 is a schematic diagram of a structure of data signal wires and data fan-out lines according to an exemplary implementation of the present disclosure. In a plane parallel to the display substrate, the drive circuit layer may include a plurality of circuit units, a plurality of circuit units sequentially arranged along a first direction X are referred to as a circuit unit row, and a plurality of circuit units sequentially arranged along a second direction Y are referred to as a circuit unit column. A plurality of circuit unit rows and a plurality of circuit unit columns constitute an array of circuit units arranged in an array, with the first direction X intersecting with the second direction Y. In an exemplary implementation, the first direction X may be an extension direction of the scan signal wire (horizontal direction), the second direction Y may be an extension direction of the data signal wire (vertical direction), and the first direction X and the second direction Y may be perpendicular to each other. As shown in FIG. 7, the display region 100 may include a plurality of data signal wires 42 and a plurality of data fan-out lines 50. The lead region 201 of the bonding region may include a plurality of lead lines 60. In an exemplary implementation, the plurality of data signal wires 42 may extend in a direction of a circuit unit column and be sequentially arranged at a set interval along a direction of a circuit unit row, each of the data signal wire 42 is connected with pixel drive circuits of all circuit units in one circuit unit column in the display region 100. First ends of the plurality of data fan-out lines 50 are correspondingly connected with the plurality of data signal wires 42, and second ends of the plurality of data fan-out lines 50 are correspondingly connected with the plurality of lead lines 60 of the lead region 201, so that the plurality of data signal wires 42 in the display region 100 are correspondingly connected with the plurality of lead lines 60 in the bonding region 200 through the plurality of data fan-out lines 50 in the display region 100.

In an exemplary implementation, the number of data fan-out lines in the display region may be the same as the number of data signal wires, each of the data signal wire is correspondingly connected with one of the lead lines through one of the data fan-out lines. Alternatively, the number of data fan-out lines in the display region may be smaller than the number of data signal wires, and a part of the data signal wires in the display region is connected with the lead lines correspondingly through the data fan-out lines, and the other part of the data signal wires is directly connected with the lead lines, which is not limited in the present disclosure.

A display substrate provided by the present disclosure includes a drive circuit layer disposed on the substrate, the drive circuit layer includes a plurality of circuit units the circuit unit includes a pixel drive circuit and a data signal wire providing a data signal to the pixel drive circuit and an initial signal wire providing an initial signal. The plurality of circuit units includes at least one normal circuit unit and at least one tracing circuit unit, the normal circuit unit is provided with a first compensation line extending along a first direction and a second compensation line extending along a second direction, the tracing circuit unit is provided with a first data fan-out line extending along the first direction or a second data fan-out line extending along the second direction, the first data fan-out line or the second data fan-out line is connected with the data signal wire, the first direction intersects with the second direction. An orthographic projection of the first compensation line in a plane of the display substrate is at least partially overlapped with an orthographic projection of the initial signal wire in the plane of the display substrate.

In an exemplary implementation, the initial signal wire includes a first initial signal wire and a second initial signal wire, body portions of the first initial signal wire and the second initial signal wire extend along the first direction, the orthographic projection of the first compensation line in the plane of the display substrate being at least partially overlapped with the orthographic projection of the initial signal wire in the plane of the display substrate may include: the orthographic projection of the first compensation line in the plane of the display substrate is at least partially overlapped with an orthographic projection of the first initial signal wire in the plane of the display substrate, alternatively, the orthographic projection of the first compensation line in the plane of the display substrate is at least partially overlapped with an orthographic projection of the second initial signal wire in the plane of the display substrate.

In an exemplary implementation, the initial signal wire further includes an initial signal connection line, a body portion of the initial signal connection line extends along the second direction, the initial signal connection line is connected with the first initial signal wire.

In an exemplary implementation, an orthographic projection of the first data fan-out line in the plane of the display substrate is at least partially overlapped with an orthographic projection of the first initial signal wire in the plane of the display substrate, alternatively, the orthographic projection of the first data fan-out line in the plane of the display substrate is at least partially overlapped with an orthographic projection of the second initial signal wire in the plane of the display substrate.

In an exemplary implementation, the circuit unit further includes a first power supply line providing a power supply signal to the pixel drive circuit, and a body portion of the first power supply line extends along the first direction. In an exemplary implementation, an orthographic projection of the second data fan-out line in the plane of the display substrate is at least partially overlapped with an orthographic projection of the first power supply line in the plane of the display substrate, or at least a part of the second data fan-out line is disposed between the first power supply line and the data signal wire.

In an exemplary implementation, the orthographic projection of the second data fan-out line in the plane of the display substrate is at least partially overlapped with an orthographic projection of the initial signal connection line in the plane of the display substrate.

In an exemplary implementation, in a plane perpendicular to the display substrate, the drive circuit layer includes a first conductive layer, a second conductive layer, a third conductive layer and a fourth conductive layer arranged in sequence on the substrate, and insulating layers are arranged between the first conductive layer and the second conductive layer, between the second conductive layer and the third conductive layer, and between the third conductive layer and the fourth conductive layer; the first compensation line, the second compensation line, the first data fan-out line and the second data fan-out line are arranged on the same layer.

In an exemplary implementation, the data signal wire is disposed in different conductive layers from the first data fan-out line and the second data fan-out line, and the first data fan-out line or the second data fan-out line is connected with the data signal wire through a via.

In an exemplary implementation, the data signal wire is disposed in the third conductive layer, the first data fan-out line and the second data fan-out line are disposed in the fourth conductive layer, alternatively, the data signal wire is disposed in the fourth conductive layer, the first data fan-out line and the second data fan-out line are disposed in the third conductive layer.

In an exemplary implementation, the first initial signal wire is disposed in the second conductive layer, and the initial signal connection line is disposed in the third conductive layer, and the initial signal connection line is connected with the first initial signal wire through a via.

In an exemplary implementation, the data signal wire and the first power supply line are arranged on the same layer.

Figure 8A:
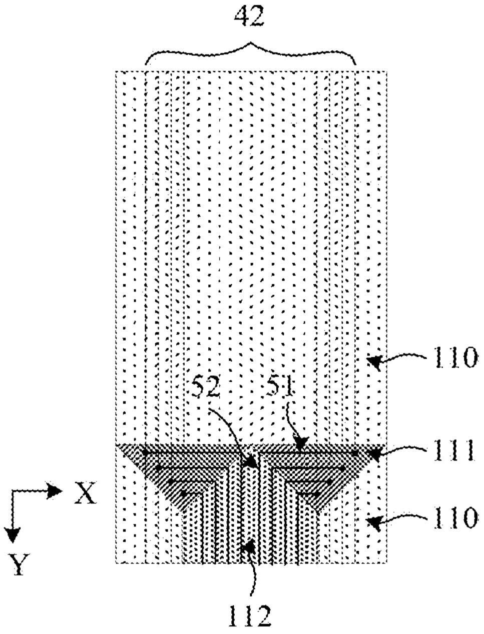
FIGS. 8*a* and 8*b* are schematic diagrams of a normal region and a wiring region of two types according to exemplary embodiments of the present disclosure.
Figure 8B:
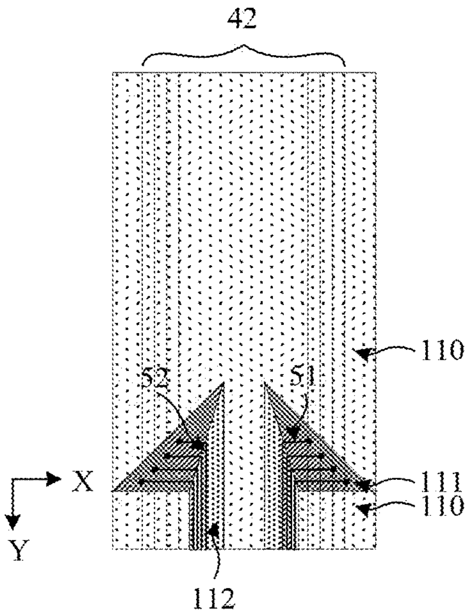

FIG. 8*a* and FIG. 8*b* are schematic diagrams of a normal region and a wiring region of two types according to exemplary embodiments of the present disclosure. As shown in FIG. 8*a* and FIG. 8*b*, since a plurality of data fan-out lines 50 are disposed in a partial region of the display region, the display region can be divided into a normal region 110 and a wiring region according to the presence or absence of the data fan-out lines 50. The normal region 110 may be a region in which the data fan-out lines 50 are not provided, and the wiring region may be a region in which the data fan-out lines 50 are provided.

In an exemplary implementation the normal region 110 may include a plurality of normal circuit units, an orthographic projection of the data fan-out line 50 on the plane of the display substrate does not have an overlapped region with an orthographic projection of the pixel drive circuit in the normal circuit unit on the plane of the display substrate in the normal circuit units. The wiring region may include a plurality of tracing circuit units, the orthographic projection of the data fan-out line 50 on the plane of the display substrate is at least partially overlapped with an orthographic projection of the pixel drive circuit in the tracing circuit unit on the plane of the display substrate.

In an exemplary implementation, at least one data fan-out line 50 may include a first data fan-out line 51 extending along a direction of a circuit unit row (the first direction X) and a second data fan-out line 52 extending along a direction of a circuit unit column (the second direction Y), a first end of the first data fan-out line 51 is connected with the data signal wire, a second end of the first data fan-out line 51 is connected with a first end of the second data fan-out line 52 after extending along the first direction X or an opposite direction of the first direction X, and a second end of the second data fan-out line 52 is connected with the lead line of the bonding region after extending along the second direction Y.

Since the data fan-out lines include the first data fan-out line 51 and the second data fan-out line 52 which extend in different directions. Thus, the wiring region can be divided into a first wiring region 111 in which the first data fan-out line 51 is disposed, and a second wiring region 112 in which the second data fan-out line 52 is disposed, according to an extension direction of the data fan-out lines.

In an exemplary implementation, the first wiring region 111 may include a plurality of first circuit units, and an orthographic projection of the first data fan-out line 51 on the plane of the display substrate is at least partially overlapped with an orthographic projection of the pixel drive circuit in the first circuit unit on the plane of the display substrate. In some possible exemplary implementations, the orthographic projection of the pixel drive circuit in the first circuit unit on the plane of the display substrate does not have an overlapped region with an orthographic projection of the second data fan-out line 52 on the plane of the display substrate.

In an exemplary implementation, the second wiring region 112 may include a plurality of second circuit units, and an orthographic projection of the second data fan-out line 52 on the plane of the display substrate is at least partially overlapped with an orthographic projection of the pixel drive circuit in the second circuit unit on the plane of the display substrate. In some possible exemplary implementations, the orthographic projection of the pixel drive circuit in the second circuit unit on the plane of the display substrate does not have an overlapped region with an orthographic projection of the first data fan-out line 51 on the plane of the display substrate.

In an exemplary implementation, the division of the respective regions shown in FIG. 8*a* and FIG. 8*b* is only an exemplary illustration. Since the normal region 110, the first wiring region 111 and the second wiring region 112 are divided according to the presence or absence of data fan-out lines and the extension direction of the data fan-out lines, shapes of the normal region 110, the first wiring region 111, and the second wiring region 112 may be regular polygons or irregular polygons, and the display region may be divided into one or more normal regions 110, one or more first wiring regions 111, and one or more second wiring regions 112, which are not limited in the present disclosure.

Figure 8C:
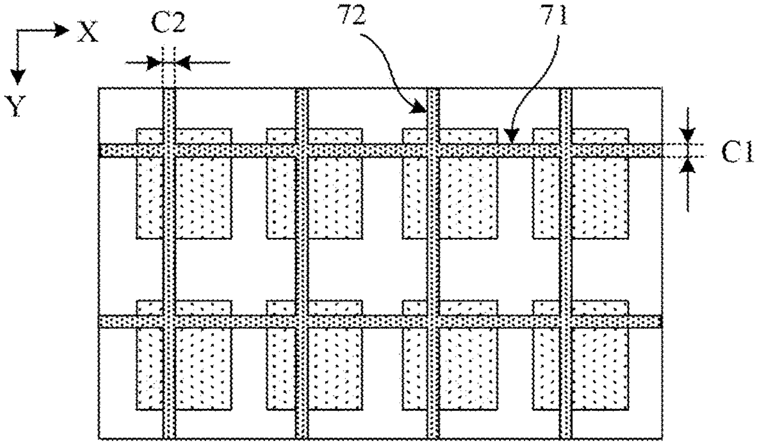
FIG. 8*c* to FIG. 8*j* are schematic diagrams of a compensation line of several types according to exemplary embodiments of the present disclosure.

FIG. 8C is a schematic diagram of a compensation line in a normal region of an exemplary embodiment of the present disclosure. The normal region may include a plurality of normal circuit units in which no data fan-out line is provided, but the compensation line is provided. As shown in FIG. 8C, in an exemplary implementation, the compensation line in at least one normal circuit unit may include a first compensation line 71 extending along the first direction X and a second compensation line 72 extending along the second direction Y, the first compensation line 71 and the second compensation line 72 intersect with each other and form an integrated structure connected with each other.

In an exemplary implementation, the first compensation lines 71 may be arranged continuously in one circuit unit row, and the first compensation lines 71 in adjacent normal circuit units in the first direction X are connected with each other. The second compensation lines 72 may be arranged continuously in one circuit unit column, and the second compensation lines 72 in adjacent normal circuit units in the second direction Y are connected with each other.

In an exemplary implementation, a first power supply line providing a power supply signal to the pixel drive circuit is also disposed in the normal circuit unit, and a body portion of the first power supply line may extend along the second direction Y. An orthographic projection of the second compensation line 72 in the plane of the display substrate may be at least partially overlapped with an orthographic projection of the first power supply line in the plane of the display substrate. In a possible exemplary implementation, the second compensation line 72 may be connected with the first power supply line through a via.

In another exemplary implementation, the orthographic projection of the second compensation line 72 in the plane of the display substrate may be located between the orthographic projection of the first power supply line in the plane of the display substrate and an orthographic projection of the data signal wire in the plane of the display substrate, i.e. the orthographic projection of the second compensation line 72 in the plane of the display substrate is not overlapped with the orthographic projection of the first power supply line in the plane of the display substrate.

In yet another exemplary implementation, the normal circuit unit is also provided with an initial signal wire providing an initial signal to the pixel drive circuit, the initial signal wire may include a first initial signal wire, a second initial signal wire, and an initial signal connection line, body portions of the first initial signal wire and the second initial signal wire may extend along the first direction X, body portions of the initial signal connection line may extend along the second direction Y, and the initial signal connection line may be connected with the first initial signal wire through a via. The orthographic projection of the first compensation line 71 in the plane of the display substrate may be at least partially overlapped with an orthographic projection of the first initial signal wire or the second initial signal wire in the plane of the display substrate, and the orthographic projection of the second compensation line 72 in the plane of the display substrate may be at least partially overlapped with an orthographic projection of the initial signal connection line in the plane of the display substrate. In a possible exemplary implementation, the second compensation line 72 may be connected with the initial signal connection line through a via.

Figure 8D:
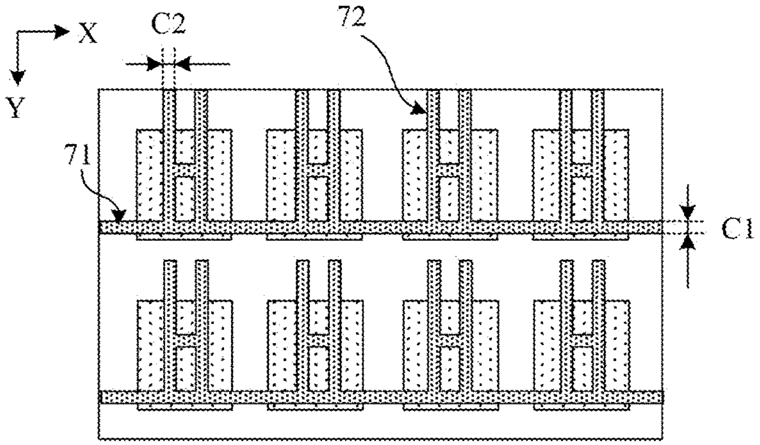

FIG. 8*d* is a schematic diagram of a compensation line in a normal region of an exemplary embodiment of the present disclosure. As shown in FIG. 8*d*, in an exemplary implementation, the compensation line in at least one normal circuit unit may include a first compensation line 71 extending along the first direction X and a second compensation line 72 extending along the second direction Y, two second compensation lines 72 may be disposed at a side of the first compensation line 71 in the second direction Y or an opposite direction of the second direction Y, and the two second compensation lines 72 and the first compensation line 71 form an integrated structure connected with each other. In a possible exemplary implementation, the two second compensation lines 72 may be connected with each other by a connection strip extending along the first direction X.

In an exemplary implementation, the first compensation line 71 may be arranged continuously in one circuit unit row, and the first compensation lines 71 in adjacent normal circuit units in the first direction X are connected with each other. The second compensation lines 72 may be arranged at intervals in one circuit unit column.

In an exemplary implementation, the orthographic projection of the first compensation line 71 in the plane of the display substrate may be at least partially overlapped with the orthographic projection of the second initial signal wire in the plane of the display substrate, and an orthographic projection of the connection strip in the plane of the display substrate may be at least partially overlapped with the orthographic projection of the first initial signal wire in the plane of the display substrate. Alternatively, the orthographic projection of the first compensation line 71 in the plane of the display substrate may be at least partially overlapped with the orthographic projection of the first initial signal wire in the plane of the display substrate, and the orthographic projection of the connection strip in the plane of the display substrate may be at least partially overlapped with the orthographic projection of the second initial signal wire in the plane of the display substrate.

In an exemplary implementation, an orthographic projection of at least one second compensation line 72 in the plane of the display substrate may be at least partially overlapped with an orthographic projection of the first power supply line in the plane of the display substrate, and the at least one second compensation line 72 may be connected with the first power supply line through a via.

In another exemplary implementation, the orthographic projection of the at least one second compensation line 72 in the plane of the display substrate may be located between the orthographic projection of the first power supply line in the plane of the display substrate and the orthographic projection of the data signal wire in the plane of the display substrate.

In yet another exemplary implementation, the orthographic projection of the at least one second compensation line 72 in the plane of the display substrate may be at least partially overlapped with the orthographic projection of the initial signal connection line in the plane of the display substrate, and the at least one second compensation line 72 may be connected with the initial signal connection line through a via.

Figure 8E:
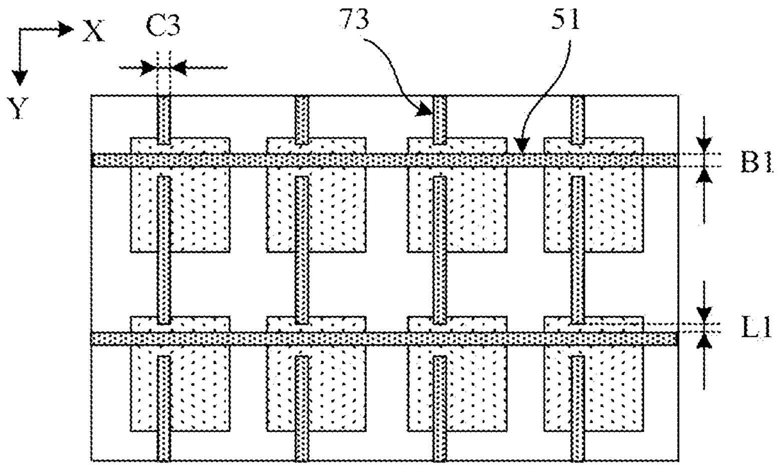

FIG. 8*e* is a schematic diagram of a compensation line in a first wiring region of an exemplary embodiment of the present disclosure. As shown in FIG. 8E, the first wiring region may include a plurality of first circuit units, at least one first circuit unit is provided with a first data fan-out line 51 and a third compensation line 73. In an exemplary implementation, the first data fan-out line 51 extends along the first direction X, and the third compensation line 73 extends along the second direction Y.

In an exemplary implementation, the first data fan-out lines 51 may be arranged continuously in one circuit unit row, and the first data fan-out lines 51 in adjacent first circuit units in the first direction X are connected with each other.

In an exemplary implementation the third compensation lines 73 may be arranged at intervals in one circuit unit column and may be arranged at a side or both sides of the first data fan-out line 51. There is a first spacing L1 between an edge of the first data fan-out line 51 at a side close to the third compensation line 73 and an end face of the third compensation line 73 at a side close to the first data fan-out line 51.

In an exemplary implementation, the orthographic projection of the first data fan-out line 51 in the plane of the display substrate may be at least partially overlapped with the orthographic projection of the first initial signal wire or the second initial signal wire in the plane of the display substrate.

In an exemplary implementation, an orthographic projection of the third compensation line 73 in the plane of the display substrate may be at least partially overlapped with the orthographic projection of the first power supply line in the plane of the display substrate, alternatively, the orthographic projection of the third compensation line 73 in the plane of the display substrate may be located between the orthographic projection of the first power supply line in the plane of the display substrate and the orthographic projection of the data signal wire in the plane of the display substrate, alternatively, the orthographic projection of the third compensation line 73 in the plane of the display substrate may be at least partially overlapped with the orthographic projection of the initial signal connection line in the plane of the display substrate.

Figure 8F:
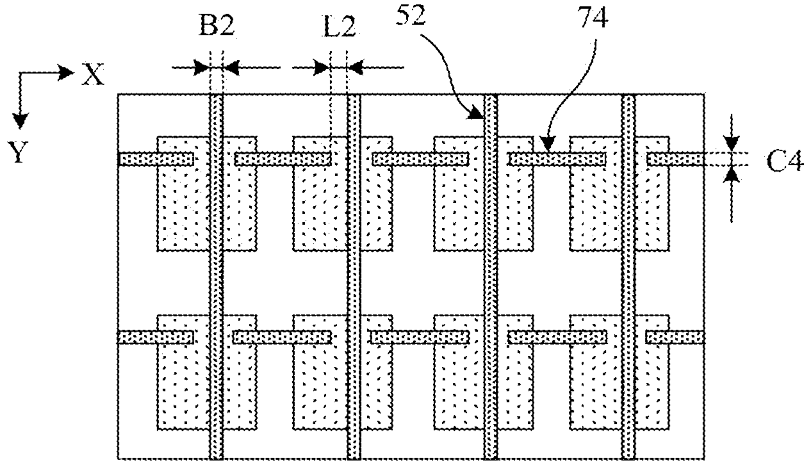

FIG. 8*f* is a schematic diagram of a compensation line in a second wiring region of an exemplary embodiment of the present disclosure. As shown in FIG. 8*f*, the second wiring region may include a plurality of second circuit units, at least one second circuit unit is provided with a second data fan-out line 52 and a fourth compensation line 74. In an exemplary implementation, the second data fan-out line 52 extends along the second direction Y, and the fourth compensation line 74 extends along the first direction X.

In an exemplary implementation, the second data fan-out line 52 may be arranged continuously in one circuit unit column, and the second data fan-out lines 52 in adjacent second circuit units in the second direction Y are connected with each other.

In an exemplary implementation, the fourth compensation lines 74 may be arranged at intervals in one circuit unit row and may be disposed at a side or both sides of the second data fan-out line 52. There is a second spacing L2 between an edge of the second data fan-out line 52 at a side close to the fourth compensation line 74 and an end face of the fourth compensation line 74 at a side close to the second data fan-out line 52.

In an exemplary implementation, an orthographic projection of the second data fan-out line 52 in the plane of the display substrate may be at least partially overlapped with the orthographic projection of the first power supply line in the plane of the display substrate, alternatively, the orthographic projection of the second data fan-out line 52 in the plane of the display substrate may be located between the orthographic projection of the first power supply line in the plane of the display substrate and the orthographic projection of the data signal wire in the plane of the display substrate, alternatively the orthographic projection of the second data fan-out line 52 in the plane of the display substrate may be at least partially overlapped with the orthographic projection of the initial signal connection line in the plane of the display substrate.

In an exemplary implementation, an orthographic projection of the fourth compensation line 74 in the plane of the display substrate may be at least partially overlapped with the orthographic projection of the first initial signal wire or second initial signal wire in the plane of the display substrate. In a possible exemplary implementation, the fourth compensation line 74 may be connected with the first initial signal wire, or the second initial signal wire, or the initial signal connection line through a via.

Figure 8G:
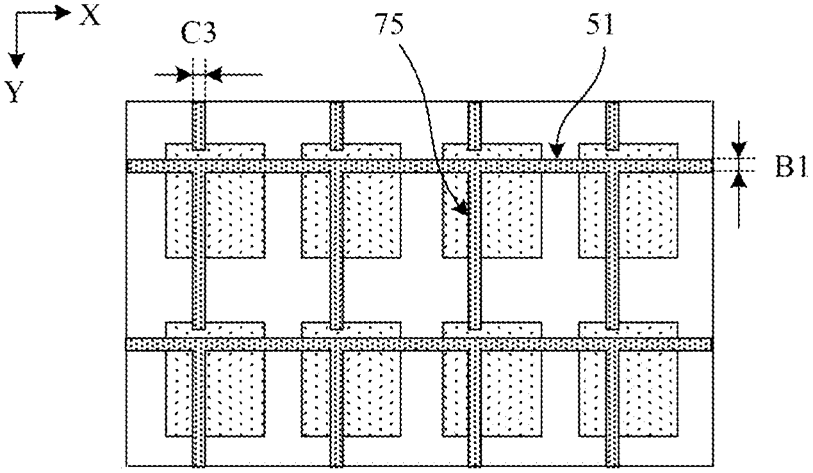

FIG. 8*g* is a schematic diagram of another compensation line in a first wiring region of an exemplary implementation of the present disclosure. As shown in FIG. 8*g*, the first wiring region may include a plurality of first circuit units, at least one first circuit unit is provided with the first data fan-out line 51 and a fifth compensation line 75. In the exemplary implementation, the first data fan-out line 51 extends along the first direction X, and the fifth compensation line 75 extends along the second direction Y, the fifth compensation line 75 and the first data fan-out line 51 intersect with each other and form an integrated structure connected with each other.

In an exemplary implementation, the first data fan-out line 51 may be continuously arranged in one circuit unit row, the first data fan-out lines 51 in adjacent first circuit units in the first direction X are connected with each other, and the fifth compensation line 75 may be disposed in each of the first circuit units, and may be located at a side or both sides of the first data fan-out lines 51 in the second direction Y.

In an exemplary implementation, the orthographic projection of the first data fan-out line 51 in the plane of the display substrate may be at least partially overlapped with the orthographic projection of the first initial signal wire or the second initial signal wire in the plane of the display substrate.

In an exemplary implementation, an orthographic projection of the fifth compensation line 75 in the plane of the display substrate may be at least partially overlapped with the orthographic projection of the first power supply line in the plane of the display substrate, alternatively, the orthographic projection of the fifth compensation line 75 in the plane of the display substrate may be located between the orthographic projection of the first power supply line in the plane of the display substrate and the orthographic projection of the data signal wire in the plane of the display substrate, alternatively, the orthographic projection of the fifth compensation line 75 in the plane of the display substrate may be at least partially overlapped with the orthographic projection of the initial signal connection line in the plane of the display substrate.

Figure 8H:
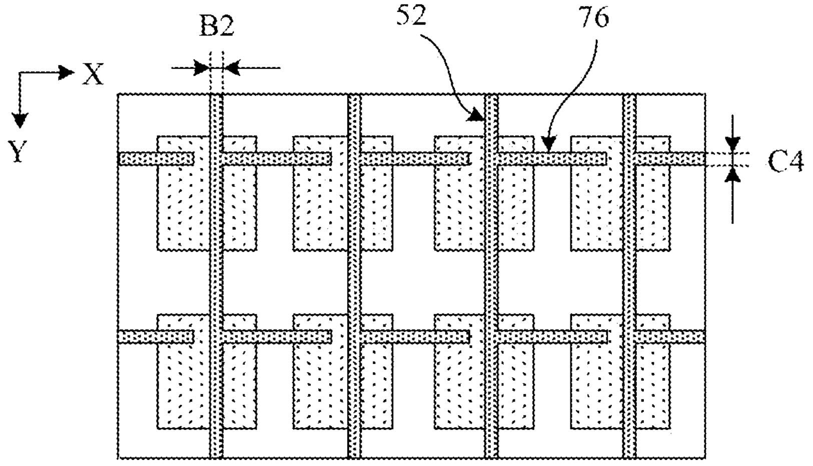

FIG. 8*h* is a schematic diagram of another compensation line in a second wiring region of an exemplary embodiment of the present disclosure. As shown in FIG. 8*h*, the second wiring region may include a plurality of second circuit units, at least one second circuit unit is provided with a second data fan-out line 52 and a sixth compensation line 76. In an exemplary implementation, the second data fan-out line 52 extends along the second direction Y, and the sixth compensation line 76 extends along the first direction X, the sixth compensation line 76 and the second data fan-out line 52 intersect with each other and form an integrated structure connected with each other.

In an exemplary implementation, the second data fan-out lines 52 may be arranged continuously in one circuit unit column, the second data fan-out lines 52 in adjacent second circuit units in the second direction Y are connected with each other, and the sixth compensation line 76 may be arranged in each second circuit unit, and the sixth compensation line 76 may be located at a side of the second data fan-out line 52 in the first direction X or an opposite direction of the first direction X.

In an exemplary implementation, an orthographic projection of the second data fan-out line 52 in the plane of the display substrate may be at least partially overlapped with the orthographic projection of the first power supply line in the plane of the display substrate, alternatively, the orthographic projection of the second data fan-out line 52 in the plane of the display substrate may be located between the orthographic projection of the first power supply line in the plane of the display substrate and the orthographic projection of the data signal wire in the plane of the display substrate, alternatively the orthographic projection of the second data fan-out line 52 in the plane of the display substrate may be at least partially overlapped with the orthographic projection of the initial signal connection line in the plane of the display substrate.

In an exemplary implementation, an orthographic projection of the sixth compensation line 76 in the plane of the display substrate may be at least partially overlapped with the orthographic projection of the first initial signal wire or second initial signal wire in the plane of the display substrate.

Figure 8I:
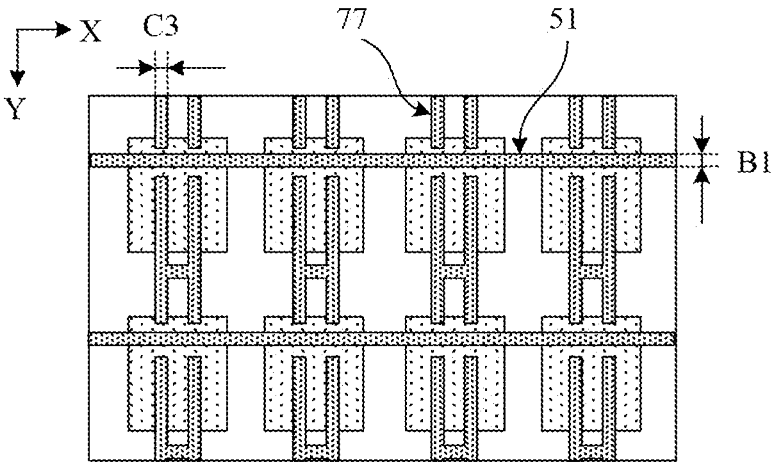

FIG. 8*i* is a schematic diagram of another compensation line in a first wiring region of an exemplary embodiment of the present disclosure. As shown in FIG. 8*i*, the first wiring region may include a plurality of first circuit units, at least one first circuit unit is provided with a first data fan-out line 51 and two seventh compensation lines 77, the two seventh compensation lines 77 may be disposed at a side of the first data fan-out line 51 in the second direction Y or an opposite direction of the second direction Y. In an exemplary implementation, the two seventh compensation lines 77 may be connected with each other by a connection strip extending along the first direction X to form an "H" shaped structure.

In an exemplary implementation, the orthographic projection of the first data fan-out line 51 in the plane of the display substrate may be at least partially overlapped with the orthographic projection of the first initial signal wire or the second initial signal wire in the plane of the display substrate.

In an exemplary implementation, an orthographic projection of at least one seventh compensation line 77 in the plane of the display substrate may be at least partially overlapped with the orthographic projection of the first power supply line in the plane of the display substrate, alternatively, the orthographic projection of the at least one seventh compensation line 77 in the plane of the display substrate may be located between the orthographic projection of the first power supply line in the plane of the display substrate and the orthographic projection of the data signal wire in the plane of the display substrate, alternatively, the orthographic projection of the at least one seventh compensation line 77 in the plane of the display substrate may be at least partially overlapped with the orthographic projection of the initial signal connection line in the plane of the display substrate. In an exemplary implementation, an orthographic projection of the connection strip connecting the two seventh compensation lines 77 in the plane of the display substrate may be at least partially overlapped with the orthographic projection of the first initial signal wire or the second initial signal wire in the plane of the display substrate.

In an exemplary implementation, at least one seventh compensation line 77 may be connected with the first power supply line through a via, alternatively, at least one seventh compensation line 77 may be connected with the initial signal connection line through a via.

Figure 8J:
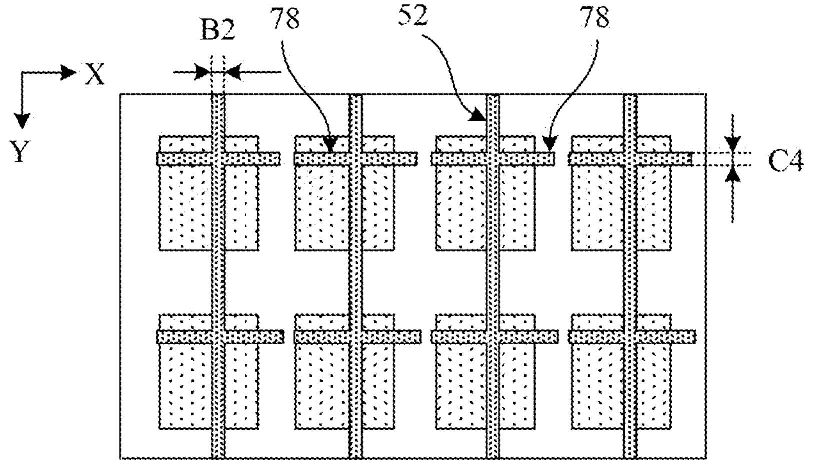

FIG. 8*j* is a schematic diagram of yet another compensation line in a second wiring region of an exemplary embodiment of the present disclosure. As shown in FIG. 8*j*, the second wiring region may include a plurality of second circuit units, at least one second circuit unit is provided with a second data fan-out line 52 and an eighth compensation line 78. In an exemplary implementation, the second data fan-out line 52 extends along the second direction Y, and the eighth compensation line 78 extends along the first direction X, the eighth compensation line 78 and the second data fan-out line 52 intersect with each other and form an integrated structure connected with each other.

In an exemplary implementation, the second data fan-out lines 52 may be arranged continuously in one circuit unit column, the second data fan-out lines 52 in adjacent second circuit units in the second direction Y are connected with each other, and the eighth compensation line 78 may be disposed in each second circuit unit, and the eighth compensation line 78 may be located at a side of the second data fan-out line 52 in the first direction X and at a side of the second data fan-out line 52 in an opposite direction of the first direction X.

In an exemplary implementation, an orthographic projection of the second data fan-out line 52 in the plane of the display substrate may be at least partially overlapped with the orthographic projection of the first power supply line in the plane of the display substrate, alternatively, the orthographic projection of the second data fan-out line 52 in the plane of the display substrate may be located between the orthographic projection of the first power supply line in the plane of the display substrate and the orthographic projection of the data signal wire in the plane of the display substrate, alternatively the orthographic projection of the second data fan-out line 52 in the plane of the display substrate may be at least partially overlapped with the orthographic projection of the initial signal connection line in the plane of the display substrate.

In an exemplary implementation, an orthographic projection of the eighth compensation line 78 in the plane of the display substrate may be at least partially overlapped with the orthographic projection of the first initial signal wire or second initial signal wire in the plane of the display substrate.

As shown in FIG. 8*a* to FIG. 8*j*, in the normal circuit unit, the first compensation line 71 has a first compensation width C1, and the second compensation line 72 has a second compensation width C2. In the first circuit unit, the first data fan-out line 51 may have a first fan-out width B1, and the third compensation line 73, the fifth compensation line 75, and the seventh compensation line 77 may each have a third compensation width C3. In the second circuit unit, the second data fan-out line 52 may have a second fan-out width B2, and the fourth compensation line 74, the sixth compensation line 76, and the eighth compensation line 78 may have a fourth compensation width C4. The first compensation width C1, the first fan-out width B1, and the fourth compensation width C4 may be dimensions in the second direction Y, and the second compensation width C2, the third compensation width C3, and the second fan-out width B2 may be dimensions in the first direction X.

In an exemplary implementation, the first compensation width C1 and the first fan-out width B1 may be the same, and the fourth compensation width C4 and the first fan-out width B1 may be the same.

In an exemplary implementation, the second compensation width C2 and the second fan-out width B2 may be the same, and the third compensation width C3 and the second fan-out width B2 may be the same.

In an exemplary implementation, the first spacing L1 and the first fan-out width B1 may be the same, and the second spacing L2 and the second fan-out width B2 may be the same.

Figure 9:
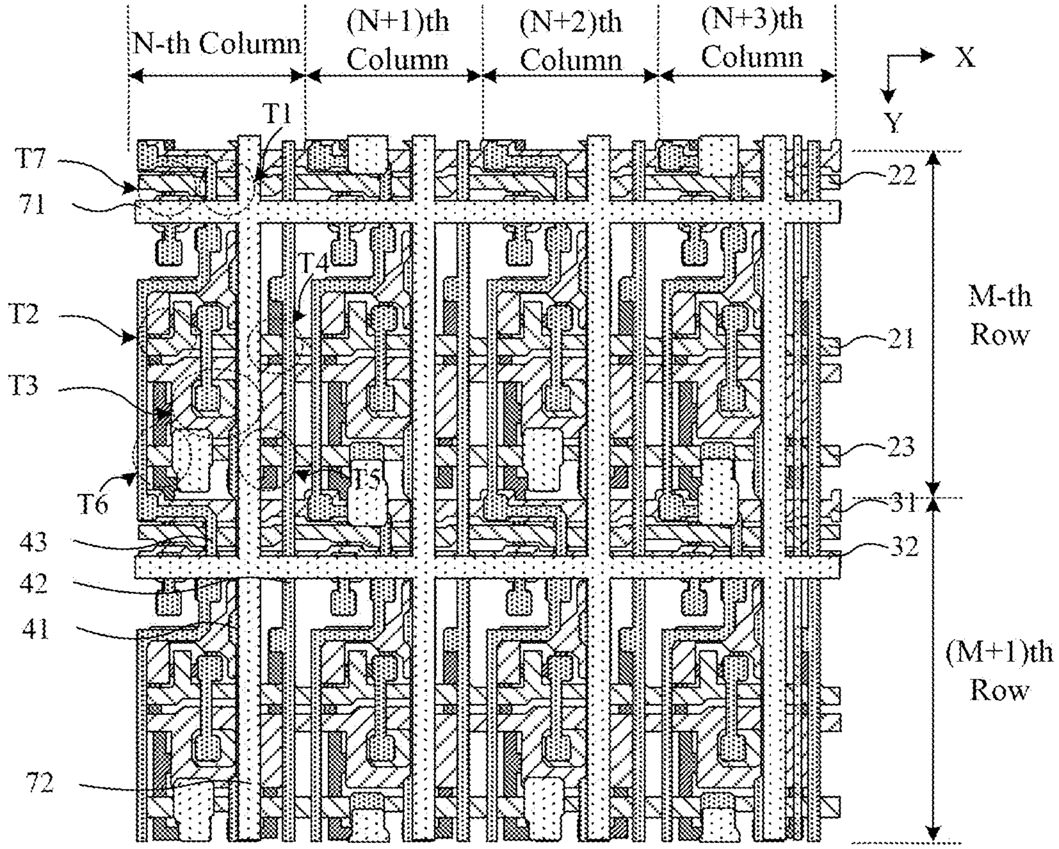
FIG. 9 is a schematic diagram of a structure of a drive circuit layer according to an exemplary embodiment of the present disclosure.

FIG. 9 is a schematic diagram of a structure of a drive circuit layer of an exemplary embodiment of the present disclosure, illustrating a planar structure of eight circuit units (two circuit unit rows and four circuit unit columns) in a normal region. As shown in FIG. 9, in a plane parallel to the display substrate, at least one circuit unit may include: a first scan signal wire 21, a second scan signal wire 22, a light emitting signal wire 23, a first initial signal wire 31, a second initial signal wire 32, a first power supply line 41, a data signal wire 42, an initial signal connection line 43, a first compensation line 71, a second compensation line 72, and a pixel drive circuit, the pixel drive circuit may include a storage capacitor and seven transistors including a first transistor T1, a second transistor T2, a third transistor T3, a fourth transistor T4, a fifth transistor T5, a sixth transistor T6, and a seventh transistor T7, and the third transistor may be a drive transistor.

In an exemplary implementation, body portions of the first scan signal wire 21, the second scan signal wire 22, the light emitting signal wire 23, the first initial signal wire 31, the second initial signal wire 32 and the first compensation line 71 may extend along the first direction X, and body portions of the first power supply line 41, the data signal wire 42, the initial signal connection line 43 and the second compensation line 72 may extend along the second direction Y.

In some exemplary implementations, in a plane perpendicular to the display substrate, the drive circuit layer may at least include a semiconductor layer, a first conductive layer, a second conductive layer, and a third conductive layer, and a fourth conductive layer that are sequentially disposed on the substrate. In an exemplary implementation, the semiconductor layer may include active layers of a plurality of transistors, the first conductive layer may include a first scan signal wire 21, a second scan signal wire 22, gate electrodes of the plurality of transistors, and a first plate of a storage capacitor, the second conductive layer may include a first initial signal wire 31, a second initial signal wire 32, and a second plate of the storage capacitor, the third conductive layer may include a first power supply line 41, a data signal wire 42, an initial signal connection line 43, and first electrode and second electrode of the plurality of transistors, and the fourth conductive layer may include a first compensation line 71 and a second compensation line 72.

In an exemplary implementation, the initial signal connection line 43 located in the third conductive layer may be connected with the first initial signal wire 31 located in the second conductive layer through a via, so that the first initial signal wire of which a body portion extends along the first direction X and the initial signal connection line 43 of which a body portion extends along the second direction Y constitute a grid shape, and the first initial signal wires 31 in a plurality of circuit unit rows and a plurality of circuit unit columns have the same potential.

In an exemplary implementation, the drive circuit layer may include a first insulating layer, a second insulating layer, a third insulating layer, a fourth insulating layer and a fifth insulating layer. The first insulating layer is arranged between the substrate and the semiconductor layer, the second insulating layer is arranged between the semiconductor layer and the first conductive layer, the third insulating layer is arranged between the first conductive layer and the second conductive layer, the fourth insulating layer is arranged between the second conductive layer and the third conductive layer, and the fifth insulating layer is arranged between the third conductive layer and the fourth conductive layer.

In an exemplary implementation, an orthographic projection of the first compensation line 71 in the plane of the display substrate may be at least partially overlapped with an orthographic projection of the first initial signal wire 31 or second initial signal wire 32 in the plane of the display substrate.

In an exemplary implementation, an orthographic projection of the second compensation line 72 in the plane of the display substrate is at least partially overlapped with an orthographic projection of the first power supply line 41 in the plane of the display substrate, and the second compensation line 72 may be connected with the first power supply line 41 through a via.

In another exemplary implementation, an orthographic projection of the second compensation line 72 in the plane of the display substrate may be located between an orthographic projection of the first power supply line 41 in the plane of the display substrate and an orthographic projection of the data signal wire 42 in the plane of the display substrate.

In yet another exemplary implementation, an orthographic projection of the second compensation line 72 in the plane of the display substrate is at least partially overlapped with an orthographic projection of the initial signal connection line 43 in the plane of the display substrate, and the second compensation line 72 may be connected with the initial signal connection line 43 through a via.

Exemplary description is made below through a process of manufacturing a display substrate. A "patterning process" mentioned in the present disclosure includes coating with a photoresist, mask exposure, development, etching, photoresist stripping, and other treatments for a metal material, an inorganic material, or a transparent conductive material, and includes coating with an organic material, mask exposure, development, and other treatments for an organic material. Deposition may be any one or more of sputtering, evaporation, and chemical vapor deposition. Coating may be any one or more of spray coating, spin coating, and ink-jet printing. Etching may be any one or more of dry etching and wet etching, which is not limited in present disclosure. A "thin film" refers to a layer of thin film made of a material on a substrate through a process such as depositing, coating, or the like. If the "thin film" does not need a patterning process in an entire preparation process, the "thin film" may also be referred to as a "layer". If the "thin film" needs the patterning process in the entire preparation process, it is referred to as a "thin film" before the patterning process, and referred to as a "layer" after the patterning process. The "layer" which has experienced the patterning process includes at least one "pattern". "A and B being arranged on the same layer" in the present disclosure means that A and B are formed simultaneously through a single patterning process, and the "thickness" of a film layer is the dimension of the film layer in a direction perpendicular to the display substrate. In an exemplary embodiment of the present disclosure, "an orthographic projection of B is within the range of an orthographic projection of A" or "an orthographic projection of A contains an orthographic projection of B" refers to a boundary of the orthographic projection of B falling within a boundary range of the orthographic projection of A, or the boundary of the orthographic projection of A is overlapped with the boundary of the orthographic projection of B.

FIG. 10 to FIG. 20B show a preparation process of a normal region in a display substrate by taking eight circuit units (two circuit unit rows and four circuit unit columns) as an example. In an exemplary implementation, the preparation process of the display substrate may include the following operations.

Figure 10:
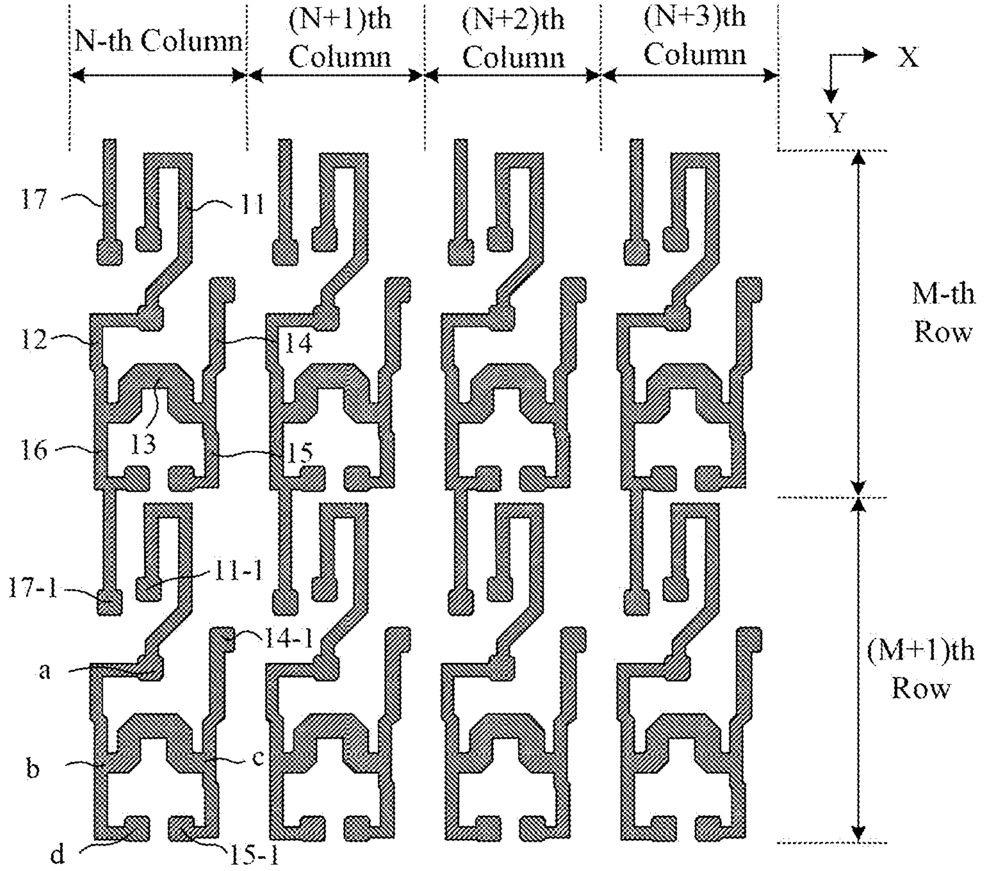
FIG. 10 is a schematic diagram obtained after a semiconductor layer pattern of a display substrate is formed according to the present disclosure.

(11) Forming a pattern of a semiconductor layer. In an exemplary embodiment, forming a pattern of a semiconductor layer may include: depositing sequentially a first insulating thin film and a semiconductor thin film on a substrate, and patterning the semiconductor thin film through a patterning process to form a first insulating layer covering the substrate and a semiconductor layer disposed on the first insulating layer, as shown in FIG. 10.

In an exemplary embodiment, the semiconductor layer of each circuit unit may include a first active layer 11 of a first transistor T1 to a seventh active layer 17 of a seventh transistor T7, and the first active layer 11 to the seventh active layer 17 form an integrated structure connected with each other, the sixth active layer 16 of a M-th circuit unit row in each circuit unit column and the seventh active layer 17 of a (M+1)th circuit unit row are connected with each other, that is, the semiconductor layers of adjacent circuit units in each circuit unit column form an integrated structure connected with each other.

In an exemplary embodiment, the first active layer 11, the second active layer 12, the fourth active layer 14 and the seventh active layer 17 in the M-th circuit unit row are located at a side of the third active layer 13 of the circuit unit away from the (M+1)th circuit unit row, the first active layer 11 and the seventh active layer 17 are located at a side of the second active layer 12 and the fourth active layer 14 away from the third active layer 13, and the fifth active layer 15 and the sixth active layer 16 in the M-th circuit unit row are located at a side of the third active layer 13 close to the (M+1)th circuit unit row.

In an exemplary embodiment, the first active layer 11 may be shaped like "n", the second active layer 12 may be shaped like "7", the third active layer 13 may be shaped like a Chinese character "几", the fourth active layer 14 and the seventh active layer 17 may be shaped like "1", and the fifth active layer 15 and the sixth active layer 16 may be shaped like "L".

In an exemplary embodiment, the active layer of each transistor may include a first region, a second region, and a channel region located between the first region and the second region. In an exemplary embodiment, a first region 11-1 of the first active layer 11, a first region 14-1 of the fourth active layer 14, a first region 15-1 of the fifth active layer 15 and a first region 17-1 of the seventh active layer 17 may be individually provided. A second region of the first active layer 11 simultaneously serves as a first region of the second active layer 12, and both are connected with point a (second node N2). A first region of the third active layer 13 serves simultaneously as a second region of the fourth active layer 14 and a second region of the fifth active layer 15, all of them are connected with point b (first node N1). A second region of the third active layer 13 simultaneously serves as a second region of the second active layer 12 and a first region of the sixth active layer 16, all of them are connected with point c (third node N3). And a second region of the sixth active layer 16 simultaneously serves as a second region of the seventh active layer 17, both are connected with point d.

Figure 11A:
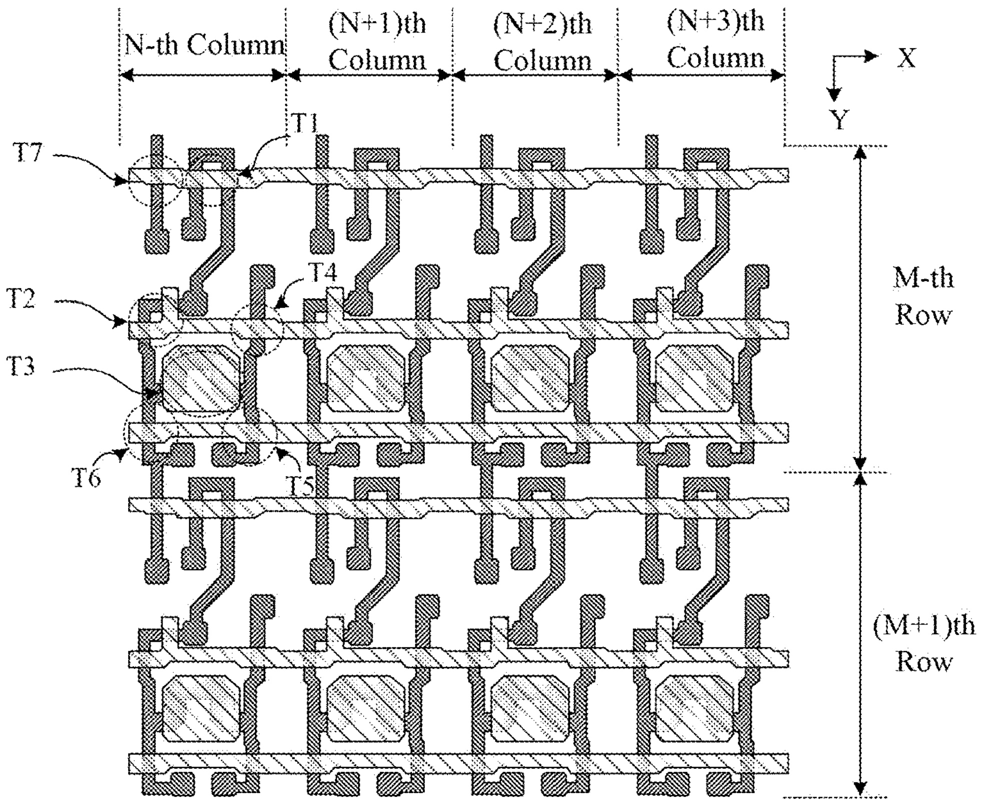
FIG. 11*a* is a schematic diagram of a display substrate after a pattern of a first conductive layer is formed according to the present disclosure.
Figure 11B:
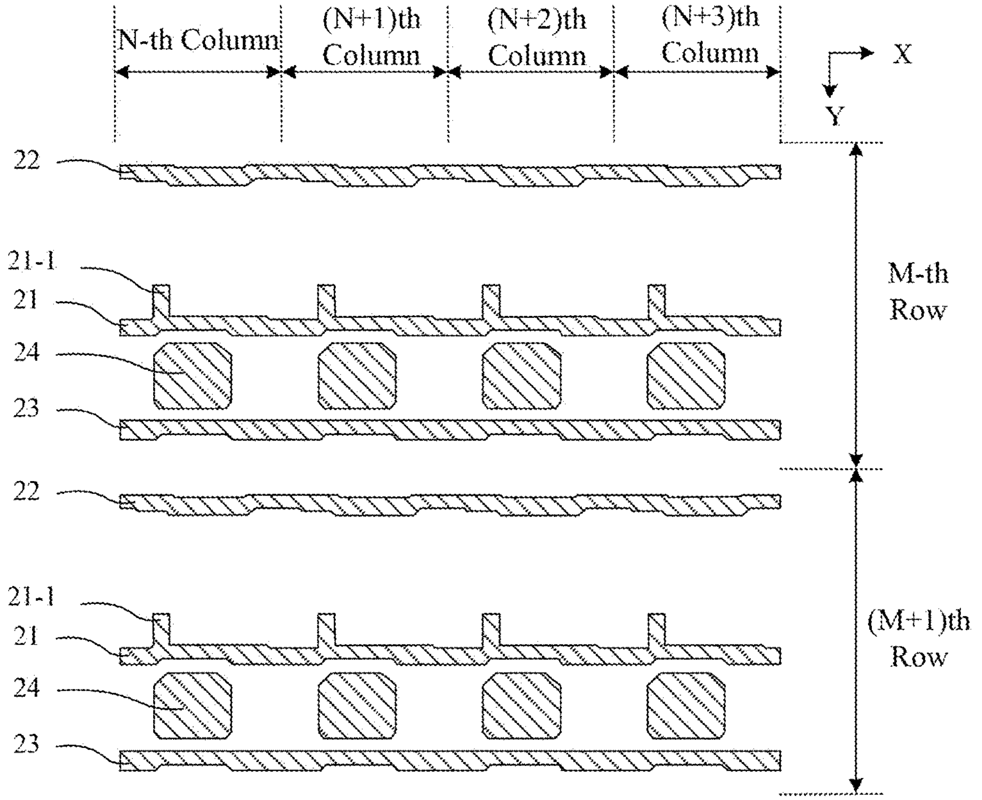
FIG. 11*b* is a schematic planar view of the first conductive layer in FIG. 11*a*.

(12) Forming a pattern of a first conductive layer. In an exemplary embodiment, forming a pattern of a first conductive layer may include: sequentially depositing a second insulating thin film and a first conductive thin film on the substrate on which the above-mentioned pattern is formed, and patterning the first conductive thin film through a patterning process to form a second insulating layer that covers a pattern of the semiconductor layer and form a pattern of the first conductive layer disposed on the second insulating layer; wherein the pattern of the first conductive layer at least includes the first scan signal wire 21, the second scan signal wire 22, the light emission control line 23, and the first plate 24, as shown in FIG. 11*a* and FIG. 11*b*, and FIG. 11*b* is a planar schematic diagram of the first conductive layer in FIG. 11*a*. In an exemplary embodiment, the first conductive layer may be referred to as a first metal gate layer (GATE1).

In an exemplary embodiment, body portions of the first scan signal wire 21, the second scan signal wire 22, and the light emission control line 23 extend along the first direction X. The first scan signal wire 21 and the second scan signal wire 22 in the M-th circuit unit row may be located at a side of the first plate 24 of the present circuit unit away from the (M+1)th circuit unit row, the second scan signal wire 22 is located at a side of the first scan signal wire 21 of the present circuit unit away from the first plate 24, and the light emission control line 23 may be located at a side of the first plate 24 of the present circuit unit close to the (M+1)th circuit unit row.

In an exemplary embodiment, the first plate 24 may be rectangular, and rectangle corners may be set with chamfer. There is an overlapped region between an orthographic projection of the first plate 24 on the substrate and an orthographic projection of the third active layer 13 of the third transistor T3 on the substrate. In an exemplary embodiment, the first plate 24 may simultaneously serve as a plate of the storage capacitor and a gate electrode of the third transistor T3.

In an exemplary embodiment, a region where the first scan signal wire 21 and the second active layer 12 are overlapped serves as a gate electrode of the second transistor, the first scan signal wire 21 is provided with a gate block 21-1 protruding toward a side of the second scan signal wire 22, and there is an overlapped region between an orthographic projection of the gate block 21-1 on the substrate and an orthographic projection of the second active layer 12 on the substrate to form the second transistor T2 with a double gate structure. A region where the first scan signal wire 21 and the fourth active layer 14 are overlapped serves as a gate electrode of the fourth transistor T4. A region where the second scan signal wire 22 and the first active layer 11 are overlapped serves as a gate electrode of the first transistor T1 with a double gate structure; a region where the second scan signal wire 22 and the seventh active layer 17 are overlapped serves as a gate electrode of the seventh transistor T7; a region where the light emission control line 23 and the fifth active layer 15 are overlapped serves as a gate electrode of the fifth transistor T5; and a region where the light emission control line 23 and the sixth active layer 16 are overlapped serves as a gate electrode of the sixth transistor T6.

In an exemplary embodiment, after the pattern of the first conductive layer is formed, the semiconductor layer may be subjected to a conductive treatment by using the first conductive layer as a shield. A region of the semiconductor layer, which is shielded by the first conductive layer, forms channel regions of the first transistor T1 to the seventh transistor T7, and a region of the semiconductor layer, which is not shielded by the first conductive layer, is treated to be conductive, that is, first regions and second regions of the first active layer to the seventh active layer are all treated to be conductive.

Figure 12A:
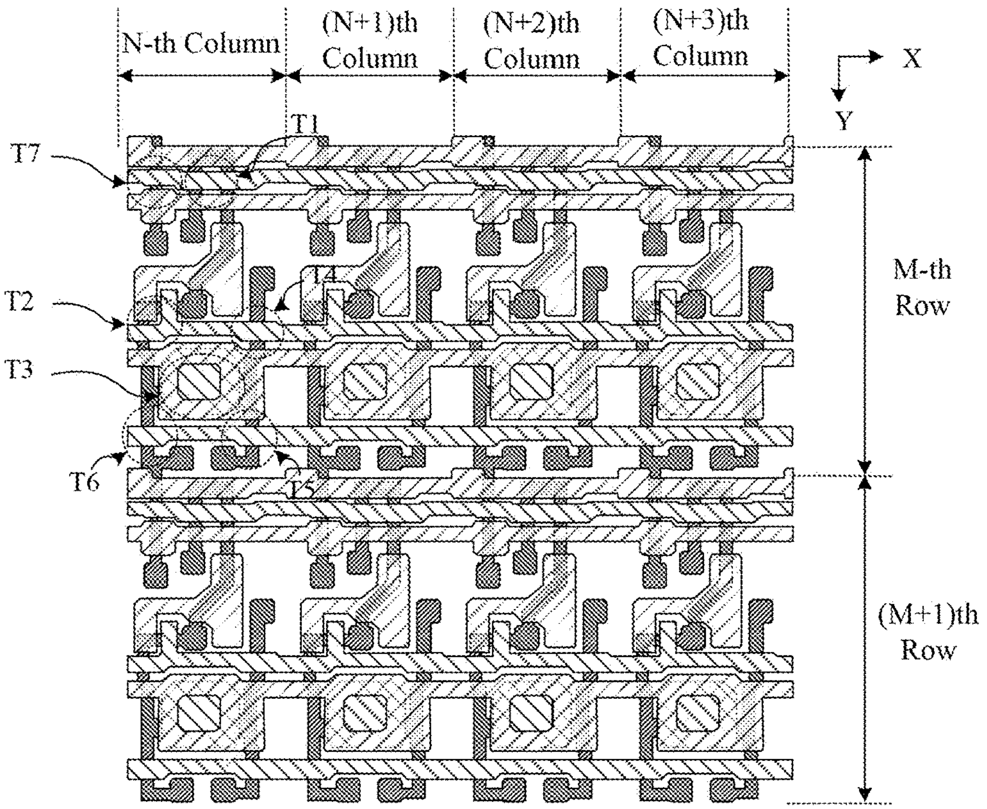
FIG. 12*a* is a schematic diagram of a display substrate after a pattern of a second conductive layer is formed according to the present disclosure.
Figure 12B:
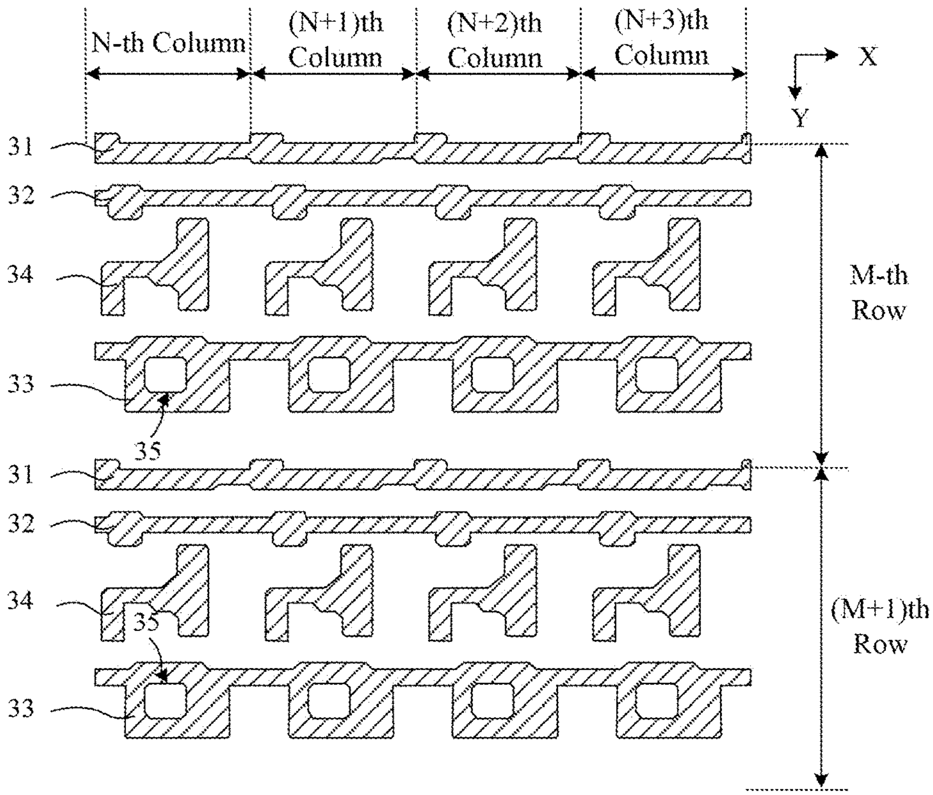
FIG. 12*b* is a schematic planar view of the second conductive layer in FIG. 12*a*.

(13) Forming a pattern of a second conductive layer pattern. In an exemplary embodiment, forming a pattern of a second conductive layer may include: sequentially depositing a third insulating thin film and a second conductive thin film on the substrate on which the above-mentioned patterns are formed, and patterning the second metal thin film through a patterning process to form a third insulating layer that covers the first conductive layer and form a pattern of a second conductive layer disposed on the third insulating layer, wherein the pattern of the second conductive layer at least includes: a first initial signal wire 31, a second initial signal wire 32, a second plate 33 and a shield electrode 34, as shown in FIG. 12*a* and FIG. 12*b*, and FIG. 12*b* is a planar schematic diagram of the second conductive layer in FIG. 12*a*. In an exemplary embodiment, the second conductive layer may be referred to as a second metal gate layer (GATE 2).

As shown in FIG. 10 to FIG. 12*b*, body portions of the first initial signal wire 31 and second initial signal wire 32 may extend along the first direction X, the first initial signal wire 31 in the M-th circuit unit row may be located between the first scan signal wire 21 and the second scan signal wire 22 of the present circuit unit, and the second initial signal wire 32 may be located at a side of the second scan signal wire 22 of the present circuit unit away from the first scan signal wire 21. The second plate 33 serves as the other plate of the storage capacitor and is located between the first scan signal wire 21 and the light emission control line 23 of the present circuit unit. A shield electrode 34 is located between the first scan signal wire 21 (excluding a body portion of the gate block 21-1) and the second initial signal wire 32 of present the circuit unit. The shield electrode 34 is configured to shield an influence of a data voltage jump on a key node, prevent the data voltage jump from affecting a potential of the key node of the pixel drive circuit, and improve a display effect.

In an exemplary embodiment, a profile of second plate 33 may be in the shape of a rectangle, corners of which may be provided with a chamfer. There is an overlapped region between an orthographic projection of the second plate 33 on the substrate and an orthographic projection of the first plate 24 on the substrate, the first plate 24 and the second plate 33 constitute the storage capacitor of the pixel drive circuit. The second plate 33 is provided with an opening 35, and the opening 35 may be located in the middle of the second plate 33. The opening 35 may be rectangular, and the second plate 33 forms an annular structure. The opening 35 exposes the third insulating layer covering the first plate 24, and the orthographic projection of the first plate 24 on the substrate contains an orthographic projection of the opening 35 on the substrate. In an exemplary embodiment, the opening 35 is configured to accommodate a first via subsequently formed, which is located in the opening 35 and exposes the first plate 24, so that a second electrode of the first transistor T1 subsequently formed is connected with the first plate 24.

In an exemplary embodiment, the second plates 33 of adjacent circuit units in the first direction X or the opposite direction of the first direction X may be connected through a plate connection line, a first end of the plate connection line is connected with the second plate 33 of the present sub-pixel, and a second end of the plate connection line extends along the first direction X or the opposite direction of the first direction X and is connected with the second plate 33 of the adjacent sub-pixel, that is, the plate connection line is configured to allow the second plates 33 of the adjacent circuit units in one circuit unit row to be connected with each other. In an exemplary embodiment, the second plates of a plurality of circuit units in one circuit unit row form an integrated structure connected with each other through the plate connection line, and the second plates with the integrated structure may be reused as a power supply signal wire, thus ensuring that a plurality of second plates in one circuit unit row have a same potential, which is beneficial to improving uniformity of the panel, avoiding a poor display of the display substrate and ensuring a display effect of the display substrate.

Figure 13A:
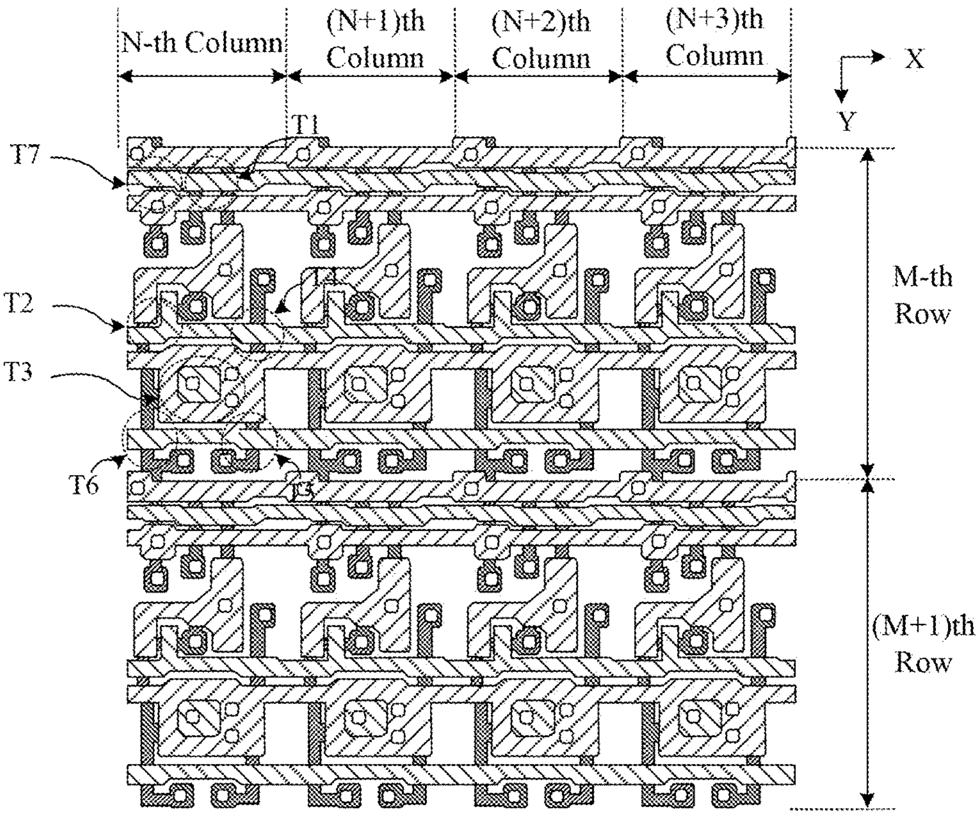
FIG. 13*a* is a schematic diagram of a display substrate after a pattern of a fourth insulating layer is formed according to the present disclosure.
Figure 13B:
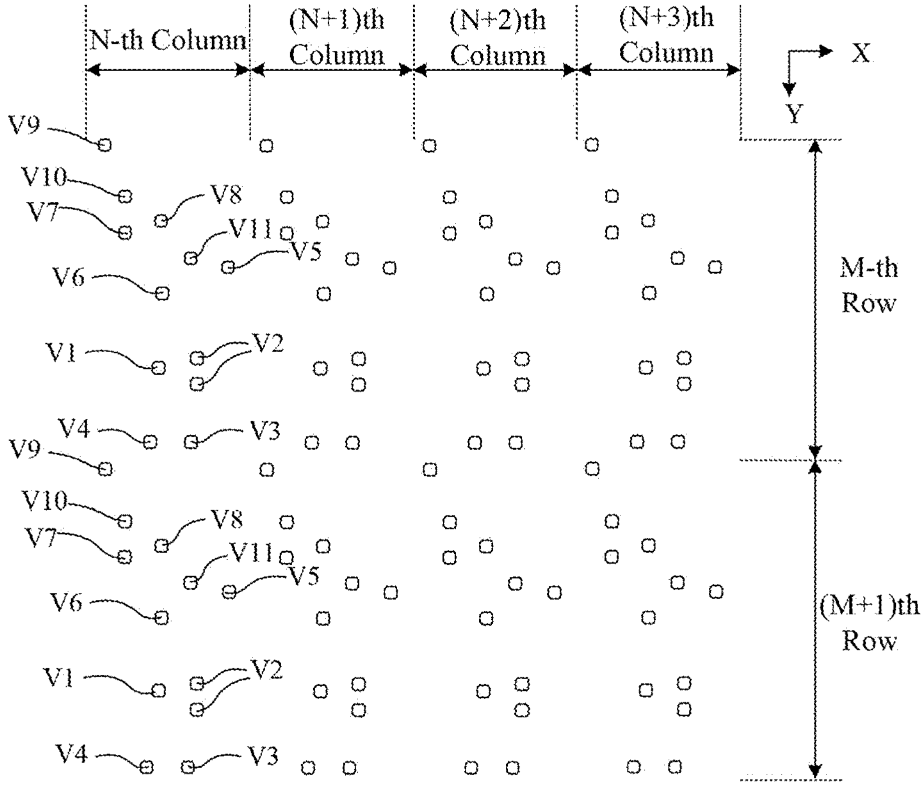
FIG. 13*b* is a schematic planar view of a plurality of vias in FIG. 13*a*.

(14) Forming a pattern of a fourth insulating layer. In an exemplary embodiment, forming a pattern of a fourth insulating layer may include: depositing a fourth insulating thin film on the substrate on which the above-mentioned patterns are formed, and patterning the fourth insulating thin film through a patterning process to form a fourth insulating layer that covers the second conductive layer, wherein each circuit unit is provided with a plurality of vias, which at least include: a first via V1, a second via V2, a third via V3, a fourth via V4, a fifth via V5, a sixth via V6, a seventh via V7, an eighth via V8, a ninth via V9, a tenth via V10 and a eleventh via V11, as shown in FIG. 13*a* and FIG. 13*b*, and FIG. 13*b* is a planar schematic diagram of a plurality of vias in FIG. 13*a*.

As shown in conjunction with FIG. 10 to FIG. 13*b*, an orthographic projection of the first via V1 on the substrate is located within a range of the orthographic projection of the opening 35 of the second plate 33 on the substrate. The fourth insulating layer and the third insulating layer in the first via V1 are etched away to expose a surface of the first plate 24. The first via V1 is configured such that the second electrode of the first transistor T1 formed subsequently is connected with the first plate 24 through the via.

In an exemplary embodiment, an orthographic projection of the second via V2 on the substrate is located within a range of the orthographic projection of the second plate 33 on the substrate. The fourth insulating layer in the second via V2 is etched away to expose a surface of the second plate 33. The second via V2 is configured such that the first power supply line formed subsequently is connected with the second plate 33 through the via. In an exemplary embodiment, the second via V2 served as a power supply via may be plural, and the plurality of second vias V2 may be sequentially arranged along the second direction Y, thereby increasing the connection reliability between the first power supply line and the second plate 33.

In an exemplary embodiment, an orthographic projection of the third via V3 on the substrate is located within a range of an orthographic projection of the fifth insulating layer on the substrate. The fourth insulating layer, the third insulating layer and the second insulating layer in the third via V3 is etched away to expose a surface of the first region of the fifth active layer. The third via V3 is configured such that the first power supply line formed subsequently is connected with the fifth active layer through the via.

In an exemplary embodiment, an orthographic projection of the fourth via V4 on the substrate is located within a range of an orthographic projection of the sixth active layer on the substrate. The fourth insulating layer, the third insulating layer, and the second insulating layer in the fourth via V4 are etched away to expose a surface of the second region of the sixth active layer (i.e., the second region of the seventh active layer). The fourth via V4 is configured such that a second electrode of the sixth transistor T6 subsequently formed is connected with the sixth active layer through the via and a second electrode of the seventh transistor T7 subsequently formed is connected with the seventh active layer through the via.

In an exemplary embodiment, an orthographic projection of the fifth via V5 on the substrate is located within a range of an orthographic projection of the fourth insulating layer on the substrate. The fourth insulating layer, the third insulating layer and the second insulating layer in the fifth via V5 is etched away to expose a surface of the first region of the fourth active layer. The fifth via V5 is configured such that a data signal wire formed subsequently is connected with the fourth active layer through the via, here the fifth via V5 is referred to as a data writing hole.

In an exemplary embodiment, an orthographic projection of the sixth via V6 on the substrate is located within a range of the orthographic projection of the second active layer on the substrate. The fourth insulating layer, the third insulating layer, and the second insulating layer in the sixth via V6 are etched away to expose a surface of the first region of the second active layer (i.e., the second region of the first active layer). The sixth via V6 is configured such that a second electrode of the first transistor T1 subsequently formed is connected with the first active layer through the via and a first electrode of the second transistor T2 subsequently formed is connected with the second active layer through the via.

In an exemplary embodiment, an orthographic projection of the seventh via V7 on the substrate is located within a range of an orthographic projection of the seventh insulating layer on the substrate. The fourth insulating layer, the third insulating layer and the second insulating layer in the seventh via V7 is etched away to expose a surface of the first region of the seventh active layer. The seventh via V7 is configured such that a first electrode of the seventh transistor T7 subsequently formed is connected with the seventh active layer through the via.

In an exemplary embodiment, an orthographic projection of the eighth via V8 on the substrate is located within a range of an orthographic projection of the first insulating layer on the substrate. The fourth insulating layer, the third insulating layer and the second insulating layer in the eighth via V8 is etched away to expose a surface of the first region of the first active layer. The eighth via V8 is configured such that a first electrode of the first transistor T1 subsequently formed is connected with the first active layer through the via.

In an exemplary embodiment, an orthographic projection of the ninth via V9 on the substrate is located within a range of the orthographic projection of the first initial signal wire 31 on the substrate. The fourth insulating layer in the ninth via V9 is etched away to expose a surface of the first initial signal wire 31. The ninth via V9 is configured such that a first electrode of the first transistor T1 subsequently formed is connected with the first initial signal wire 31 through the via.

In an exemplary embodiment, an orthographic projection of the tenth via V10 on the substrate is located within a range of the orthographic projection of the second initial signal wire 32 on the substrate. The fourth insulating layer in the tenth via V10 is etched away to expose a surface of the second initial signal wire 32. The tenth via V10 is configured such that a first electrode of the seventh transistor T7 subsequently formed is connected with the second initial signal wire 32 through the via.

In an exemplary embodiment, an orthographic projection of the eleventh via V11 on the substrate is located within a range of an orthographic projection of the shield electrode 34 on the substrate. The fourth insulating layer in the eleventh via V11 is etched away to expose a surface of the shield electrode 34. The eleventh via V11 is configured such that the first power supply line formed subsequently is connected with the shield electrode 34 through the via.

Figure 14A:
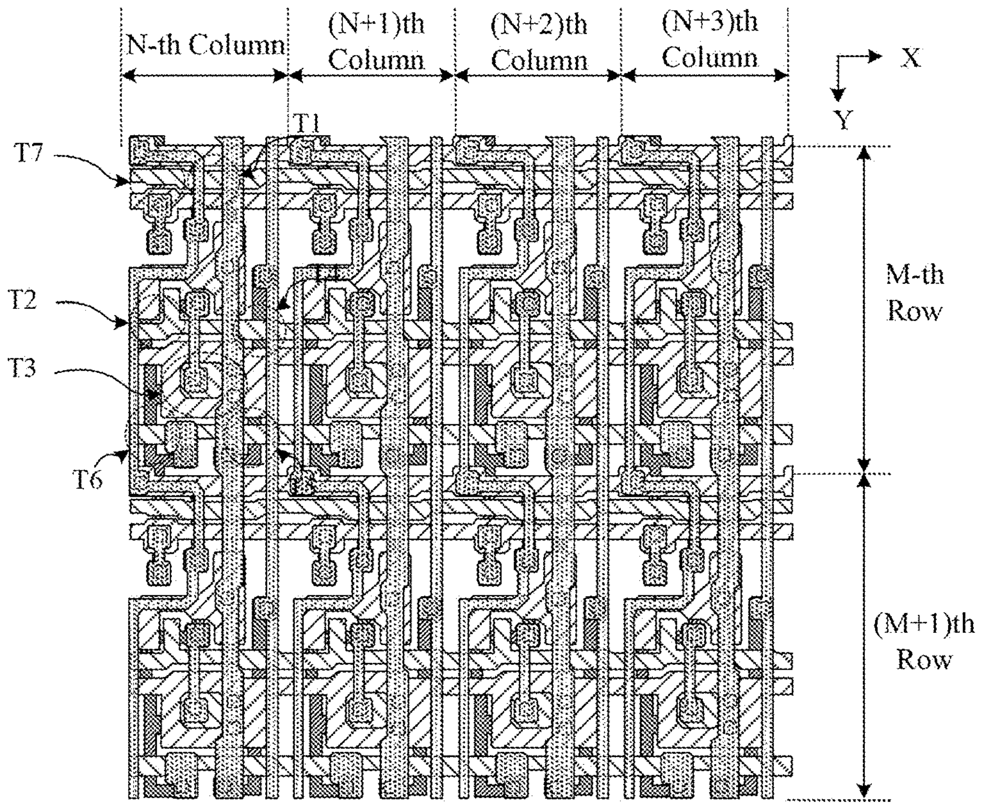
FIG. 14*a* is a schematic diagram of a display substrate after a pattern of a third conductive layer is formed according to the present disclosure.
Figure 14B:
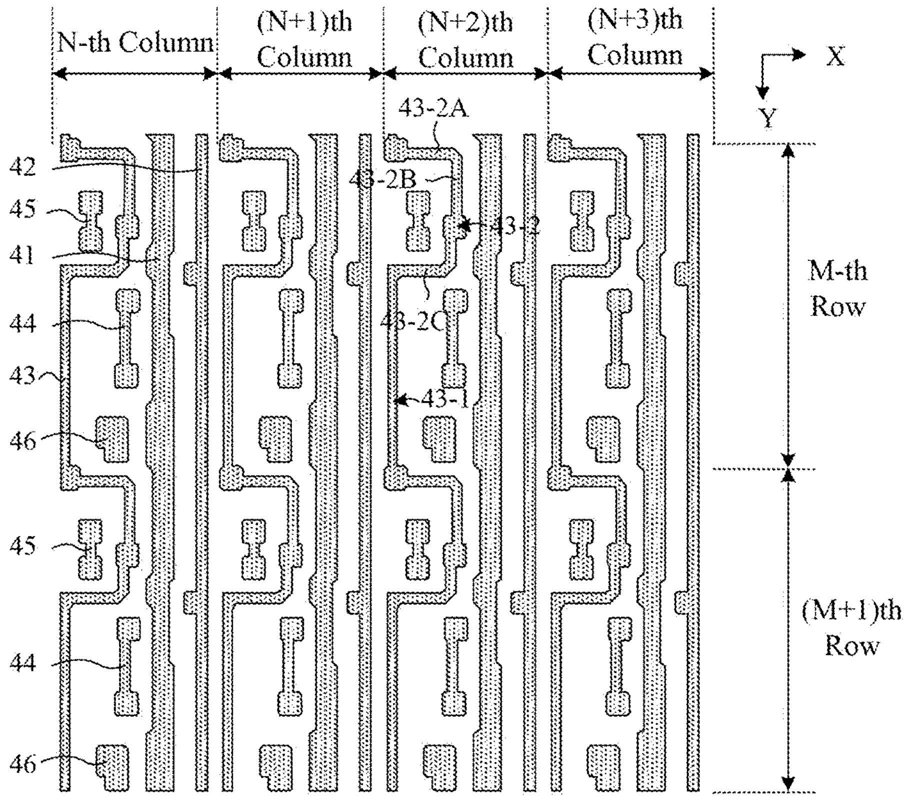
FIG. 14*b* is a schematic planar view of the third conductive layer in FIG. 14*a*.

(15) Forming a pattern of a third conductive layer. In an exemplary embodiment, forming a pattern of a third conductive layer may include: depositing a third conductive thin film on the substrate on which the above-mentioned patterns are formed, and patterning the third conductive thin film through a patterning process to form a third conductive layer disposed on the fourth insulating layer, wherein the third conductive layer at least includes a first power supply line 41, a data signal wire 42, an initial signal connection line 43, a first connection electrode 44, a second connection electrode 45, and a third connection electrode 46, as shown in FIG. 14*a* and FIG. 14*b*, and FIG. 14*b* is a planar schematic diagram of the third conductive layer in FIG. 14*a*. In an exemplary embodiment, the third conductive layer may be referred to as a first metal source-drain layer (SD1).

As shown in conjunction with FIG. 10 to FIG. 14*b*, a body portion of the first power supply line 41 extends in the second direction Y. On the one hand, the first power supply line 41 is connected with the second plate 33 through the second via V2, and on the other hand, the first power supply line 41 is connected with the fifth active layer through the third via V3, and furthermore, is connected with the shield electrode 34 through the eleventh via V11, so that the shield electrode 34 and the second plate 33 have a same potential as the first power supply line 41. Since the shield electrode 34 is connected with the first power supply line 41, and at least a partial region of the shield electrode 34 (such as a vertical portion at the right side of the shield electrode 34) is located between the first connection electrode 44 (which is a second electrode of the first transistor T1 and a first electrode of the second transistor T2, i.e. the second node N2) and the data signal wire 42, the influence of data voltage jump on the key node of the pixel drive circuit is effectively shielded, the influence of data voltage jump on the potential of the key node of the pixel drive circuit is avoided, and the display effect is improved.

In an exemplary embodiment, a body portion of the data signal wire 42 extends along the second direction Y, and the data signal wire 42 is connected with the first region of the fourth active layer through the fifth via V5, so that a data signal transmitted by the data signal wire 42 is written into the fourth transistor T4.

In an exemplary embodiment, the initial signal connection line 43 may have a zigzag shape extending along the second direction Y. In each circuit unit, on one hand, the initial signal connection line 43 is connected with the first initial signal wire 31 through the ninth via V9, on the other hand, the initial signal connection line 43 is connected with the first region of the first active layer through the eighth via V8, and the initial signal connection line 43 may serve as the first electrode of the first transistor T1, thereby realizing that the first initial signal wire 31 writes a first initial signal into the first transistor T1.

In an exemplary embodiment, the initial signal connection line 43 may include a first line segment 43-1 which may be a straight line segment extending along the second direction Y and a second line segment 43-2 which may be a zigzag line segment, the first line segment 43-1 and the second line segment 43-2 are connected with each other.

In an exemplary embodiment, the second line segment 43-2 may include a first sub-line segment 43-2A and a third sub-line segment 43-2C of which body portions extend along the first direction X, and a second sub-line segment 43-2B of which a body portion extends along the second direction Y. In one circuit unit column, a first end of the first sub-segment 43-2A of the M-th circuit unit is connected with the first segment 43-1 of the (M−1)th circuit unit, a second end extends along the first direction X, and sequentially is connected with a first end of the second sub-line segment 43-2B; a second end of the second sub-line segment 43-2B extends along the second direction Y, and sequentially is connected with a first end of the third sub-line segment 43-2C; a second end of the third sub-line segment 43-2C extends along an opposite direction of the first direction X, and sequentially is connected with the first line segment 43-1 of present the circuit unit.

In an exemplary embodiment, the initial signal connection line 43 of the M-th circuit unit rows in each circuit unit column and the initial signal connection line 43 of the (M+1)th circuit unit row are connected with each other, i.e. the initial signal connection lines 43 of adjacent circuit units in each circuit unit column form an integrated structure connected with each other. Since the initial signal connection line 43 is connected with the first initial signal wire 31 through the ninth via V9, the initial signal connection line 43 with the integrated structure can be reused as a vertical initial signal wire, and the first initial signal wire 31 extending along the first direction X and the initial signal connection line 43 of which a body portion extends along the second direction Y form a grid shape. In the present disclosure, the initial signal connection line is disposed to be connected with the first initial signal wire, so that the first initial signal wires form a network structure, a plurality of first initial signal wires 31 in a plurality of circuit unit rows and a plurality of circuit unit columns have a same potential. Therefore, not only a resistance of the first initial signal wire is effectively reduced, a voltage drop of the first initial voltage is reduced, but also a uniformity of the first initial voltage in the display substrate is effectively improved, a display uniformity is effectively improved, and a display character and a display quality are improved.

In an exemplary embodiment, there is an overlapped region between the orthographic projection of the initial signal connection line 43 on the substrate and the orthographic projection of the shield electrode 34 on the substrate.

In an exemplary embodiment, the first connection electrode 44 may have a straight line shape extending along the second direction Y. A first end of the first connection electrode is connected with the second region of the first active layer (i.e., the first region of the second active layer) through the sixth via V6, and a second end of the first connection electrode is connected with the first plate 24 through the first via V1, so that the first plate 24, the second electrode of the first transistor T1 and the first electrode of the second transistor T2 have a same potential. In an exemplary embodiment, the first connection electrode 44 may serve as the second electrode of the first transistor T1 and the first electrode of the second transistor T2.

In an exemplary embodiment, the second connection electrode 45 may have a straight line shape extending along the second direction Y, a first end thereof is connected with the second initial signal wire 32 through the tenth via V10, and a second end thereof is connected with the first region of the seventh active layer through the seventh via V7. The second connection electrode 45 may serve as a first electrode of the seventh transistor T7, thereby realizing that the second initial signal wire 32 writes a second initial signal into the seventh transistor T7.

In an exemplary embodiment, the third connection electrode 46 is connected with the second region of the sixth active layer (i.e., the second region of the seventh active layer) through the fourth via V4, so that the second electrode of the sixth transistor T6 and the second electrode of the seventh transistor T7 have a same potential. In an exemplary embodiment, the third connection electrode 46 may serve as the second electrode of the sixth transistor T6 and the second electrode of the seventh transistor T7. In an exemplary embodiment, the third connection electrode 46 is configured to be connected with an first anode connection electrode subsequently formed.

In an exemplary embodiment, the first power supply lines 41 of each circuit unit may be of an unequal width design, and the first power supply lines 41 adopting the unequal width design may not only facilitate a layout of the pixel structure, but also reduce a parasitic capacitance between the first power supply line and the data signal wire.

In an exemplary embodiment, shapes of the first power supply line 41, the data signal wire 42, the initial signal connection line 43, the first connection electrode 44, the second connection electrode 45, and the third connection electrode 46 of the respective circuit units may be same or may be different, which is not limited in the present disclosure.

Figure 15A:
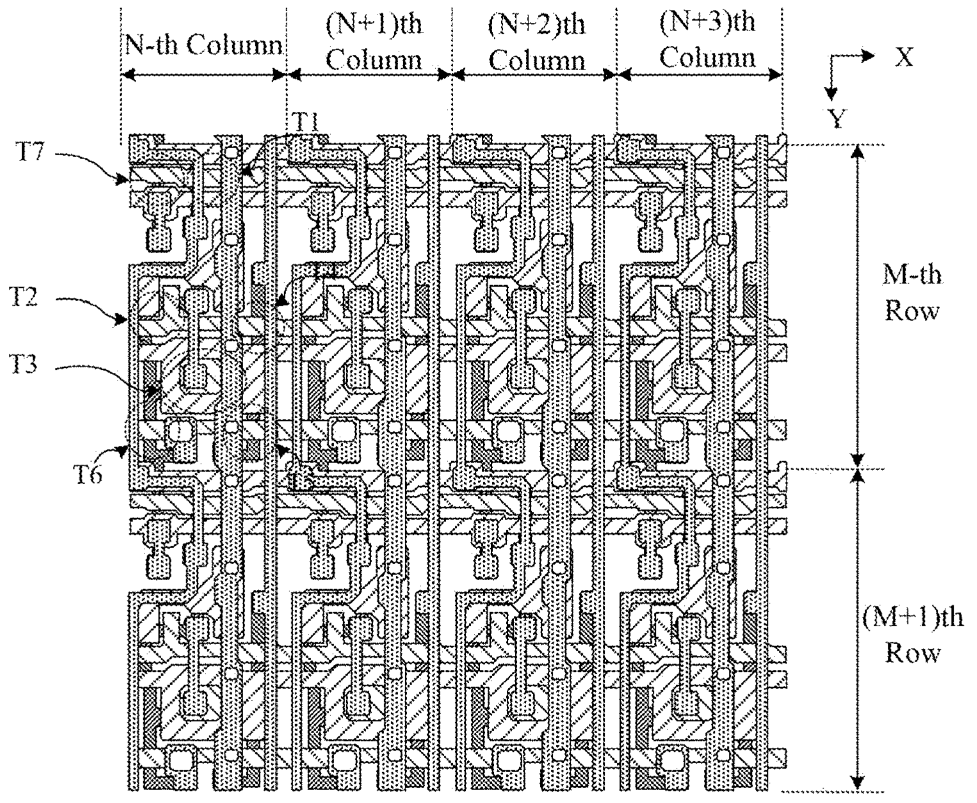
FIG. 15*a* is a schematic diagram of a display substrate after a pattern of a fifth insulating layer is formed according to the present disclosure.
Figure 15B:
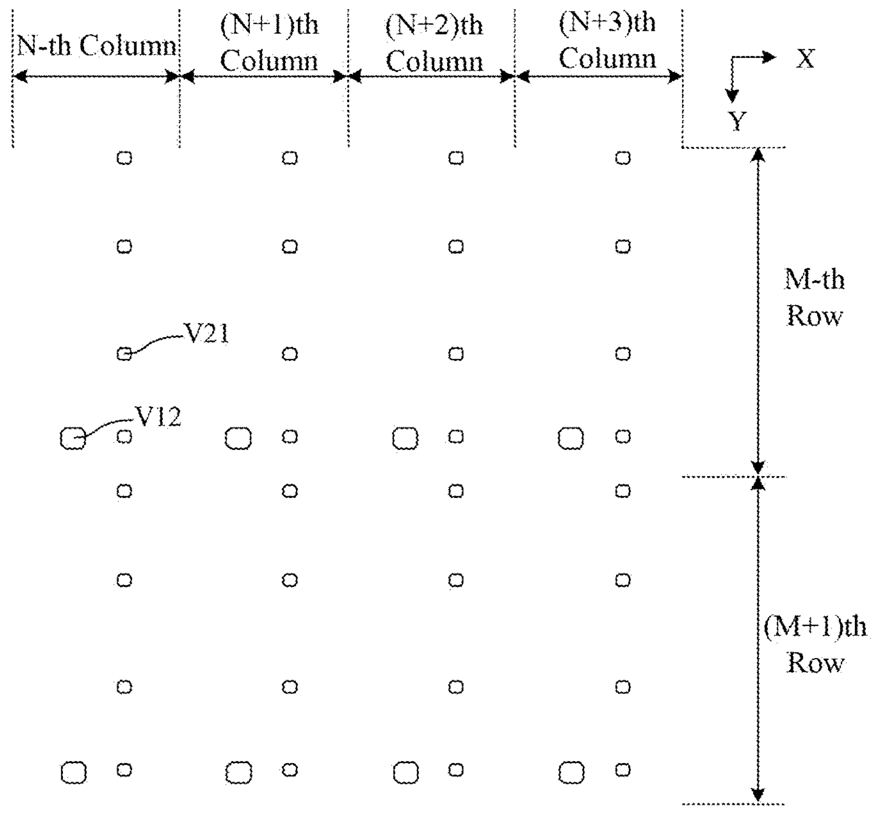
FIG. 15*b* is a schematic planar view of a plurality of vias in FIG. 15*a*.

(16) Forming a pattern of a fifth insulating layer. In an exemplary embodiment, forming a pattern of a fifth insulating layer may include: depositing a fifth insulating film on the substrate on which the above-mentioned patterns are formed, and patterning the fifth insulating film through a patterning process to form a fifth insulating layer covering the third conductive layer, wherein the fifth insulating layer is provided with a plurality of vias, and the plurality of vias at least include a twelfth via V12 and a twenty-first via V21, as shown in FIG. 15*a* and FIG. 15*b*, and FIG. 15*b* is a planar schematic diagram of the plurality of vias in FIG. 15*a*.

As shown in conjunction with FIG. 10 to FIG. 15*b*, an orthographic projection of the twelfth via V12 on the substrate is located within a range of an orthographic projection of the third connection electrode 46 on the substrate, the fifth insulating layer in the twelfth via V12 is removed to expose a surface of the third connection electrode 46, and the twelfth via V12 is configured such that a first anode connection electrode formed subsequently is connected with the third connection electrode 46 through the via.

An orthographic projection of the twenty-first via V21 on the substrate is located within a range of an orthographic projection of the first power supply line 41 on the substrate, the fifth insulating layer in the twenty-first via V21 is removed to expose a surface of the first power supply line 41, and the twenty-first via V21 is configured such that the second compensation line formed subsequently is connected with the first power supply line 41 through the via.

In an exemplary embodiment, the twenty-first via V21 may be plural, and the plurality of twenty-first vias V21 may be sequentially arranged along the second direction Y, thereby increasing connection reliability between the first power supply line and the second compensation line 32.

In an exemplary embodiment, positions of the twelfth via V12 and the twenty-first via V21 in the respective circuit units may be the same or may be different, which is not limited in the present disclosure.

Figure 16A:
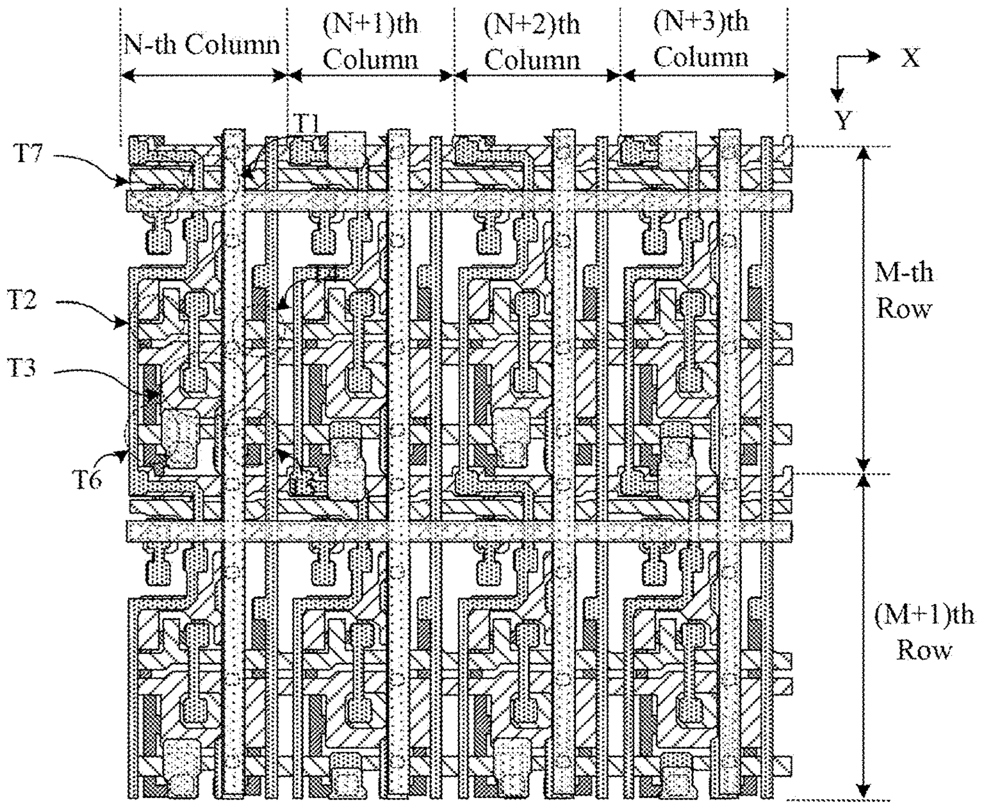
FIG. 16*a* is a schematic diagram of a display substrate after a pattern of a fourth conductive layer is formed according to the present disclosure.
Figure 16B:
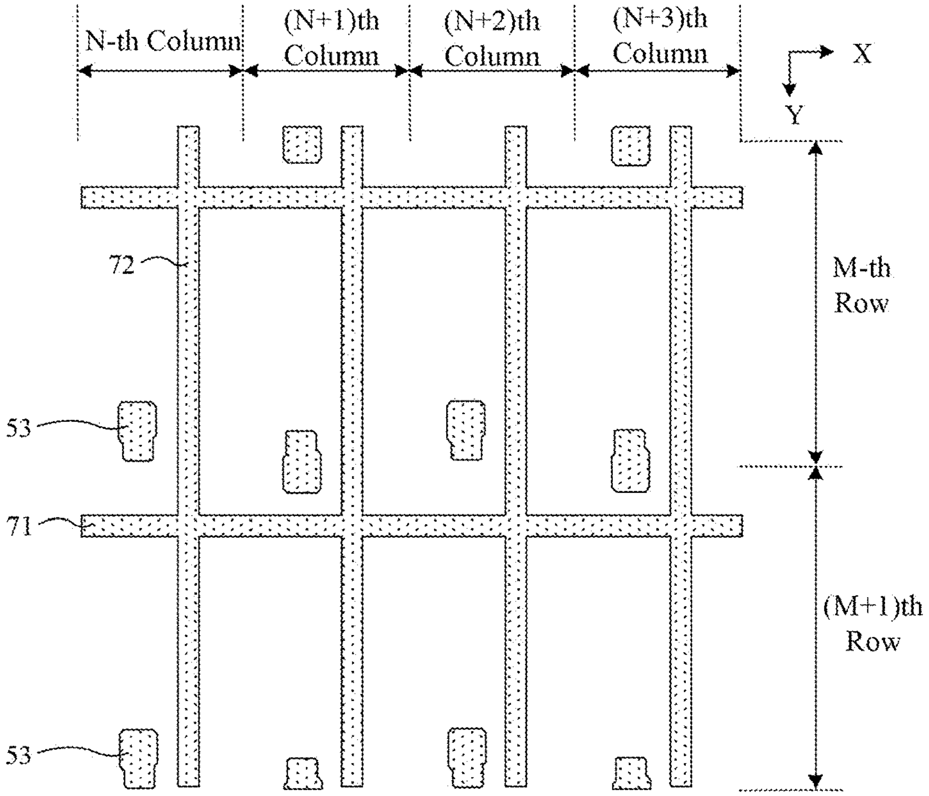
FIG. 16*b* is a schematic planar view of the fourth conductive layer in FIG. 16*a*.

(17) Forming a pattern of a fourth conductive layer. In an exemplary embodiment, forming a pattern of a fourth conductive layer may include: depositing a fourth conductive thin film on the substrate on which the above-mentioned patterns are formed, and patterning the fourth conductive thin film through a patterning process to form a fourth conductive layer disposed on the fifth insulating layer, wherein the fourth conductive layer at least includes a first compensation line 71, a second compensation line 72 and a first anode connection electrode 53, as shown in FIG. 16 and FIG. 16*b*, and FIG. 16*b* is a planar schematic diagram of the fourth conductive layer in FIG. 16*a*. In an exemplary embodiment, the fourth conductive layer may be referred to as a second metal source-drain layer (SD2).

As shown in conjunction with FIG. 10 to FIG. 16*b*, in an exemplary embodiment, the first compensation line 71 may be in a straight line shape of which a body portion extends along the first direction X, the second compensation line 72 may be in a straight line shape of which a body portion extends along the second direction Y, and the first compensation line 71 and the second compensation line 72 intersect with each other and form an integrated structure connected with each other.

In an exemplary implementation, an orthographic projection of the first compensation line 71 in the plane of the display substrate may be at least partially overlapped with an orthographic projection of the second initial signal wire in the plane of the display substrate. In another exemplary embodiment, the orthographic projection of the first compensation line 71 in the plane of the display substrate may be at least partially overlapped with the orthographic projection of the first initial signal wire 31 in the plane of the display substrate.

In an exemplary embodiment, the orthographic projection of the second compensation line 72 on the substrate is at least partially overlapped with the orthographic projection of the first power supply line 41 on the substrate, and the second compensation line 72 is connected with the first power supply line 41 through at least one twenty-first via V21. In a possible exemplary embodiment, the orthographic projection of the second compensation line 72 on the substrate is located within a range of the orthographic projection of the first power supply line 41 on the substrate.

In another exemplary embodiment, the orthographic projection of the second compensation line 72 on the substrate may be located between the orthographic projection of the first power supply line 41 on the substrate and the orthographic projection of the data signal wire 42 in the plane of the display substrate.

In yet another exemplary implementation, an orthographic projection of the second compensation line 72 in the plane of the display substrate may be at least partially overlapped with the orthographic projection of the initial signal connection line 43 in the plane of the display substrate, and the second compensation line 72 may be connected with the initial signal connection line 43 through a via.

In an exemplary embodiment, the first anode connection electrode 53 may be disposed in each circuit unit. The first anode connection electrode 53 is connected with the third connection electrode 46 through the twelfth via V12. Since the third connection electrode 46 is connected with the second region of the sixth active layer (also the second region of the seventh active layer) through the fourth via V4, the first anode connection electrode 53 is connected with the second region of the sixth active layer (also the second region of the seventh active layer) through the third connection electrode 46. In an exemplary embodiment, the first anode connection electrode 53 is configured to be connected with a second anode connection electrode subsequently formed.

In an exemplary embodiment, a shape of the first anode connection electrode in a N-th circuit unit column and a shape of the first anode connection electrode in a (N+2)th circuit unit column may be the same, a shape of the first anode connection electrode in a (N+1)th circuit unit column may be the same as a shape of the first anode connection electrode in a (N+3)th circuit unit column, and the shape of the first anode connection electrode may be rectangular.

In a display substrate, the display region includes a wiring region provided with a data fan-out line and a normal region without a data fan-out line. Since the data fan-out line in the wiring region has a high reflection ability under the irradiation of external light, while the reflection ability of other metal lines in the normal region is weak, so an appearance of the normal region is obviously different from that of the wiring region, which leads to a problem of poor appearance of the display substrate, especially more obvious when the screen is off or the display is in a low gray tone. Exemplary embodiments of the present disclosure provide a compensation line in the normal region, the compensation line and the data fan-out line are arranged on the same layer and formed simultaneously through the same patterning process, so that the reflection ability of the compensation line in the normal region is basically similar to that of the data fan-out line in the wiring region, the difference in appearance between the normal region and the wiring region is eliminated, and the poor appearance of the display substrate is avoided.

In FIG. 16*a* and FIG. 16*b*, only the first compensation line 71 and the second compensation line 72 shown in FIG. 8*c* are illustrated in an exemplary manner. In other exemplary embodiments, the structure of the first compensation line 71 and the second compensation line 72 shown in FIG. 8*d* may be adopted in FIG. 16*a* and FIG. 16*b*, and which is not limited in the present disclosure.

Figure 17A:
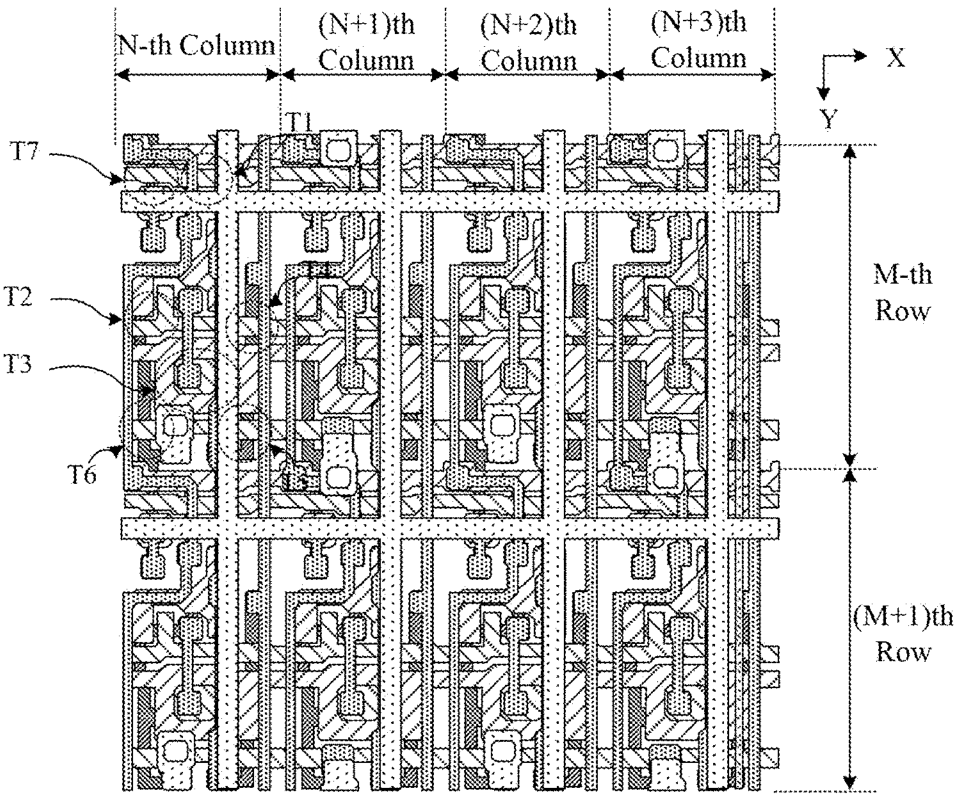
FIG. 17*a* is a schematic diagram of a display substrate after a pattern of a sixth insulating layer is formed according to the present disclosure.
Figure 17B:
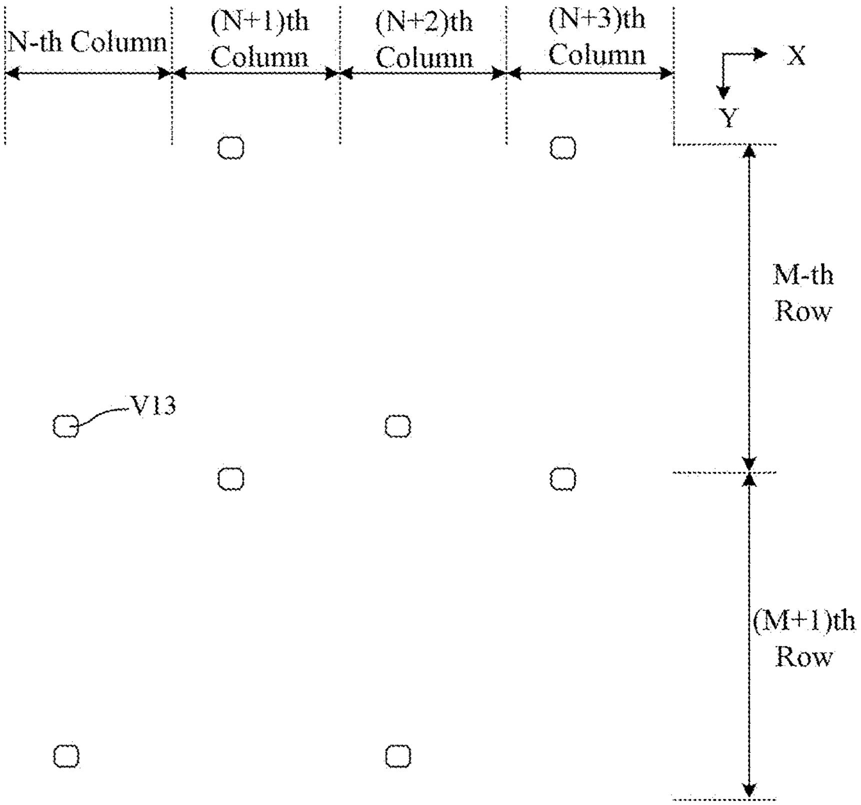
FIG. 17*b* is a schematic planar view of a plurality of vias in FIG. 17*a*.

(18) Forming a pattern of a sixth insulating layer. In an exemplary embodiment, forming a pattern of a sixth insulating layer may include: depositing a sixth insulating film on the substrate on which the above-mentioned patterns are formed, and patterning the sixth insulating film through a patterning process to form a sixth insulating layer covering the fourth conductive layer, wherein the sixth insulating layer is provided with a plurality of vias, and the plurality of vias at least include a thirteenth via V13, as shown in FIG. 17*a* and FIG. 17*b*, and FIG. 17*b* is a planar schematic diagram of the plurality of vias in FIG. 17*a*.

As shown in conjunction with FIG. 10 to FIG. 17*b*, an orthographic projection of the twelfth via V13 on the substrate is located within a range of an orthographic projection of the first anode connection electrode 53 on the substrate, the sixth insulating layer in the thirteenth via V13 is removed to expose a surface of the first anode connection electrode 53, and the thirteenth via V13 is configured such that the second anode connection electrode formed subsequently is connected with the first anode connection electrode 53 through the via.

In an exemplary embodiment, positions of the thirteenth vias V13 in the respective circuit units may be the same or may be different, which is not limited in the present disclosure.

Figure 18A:
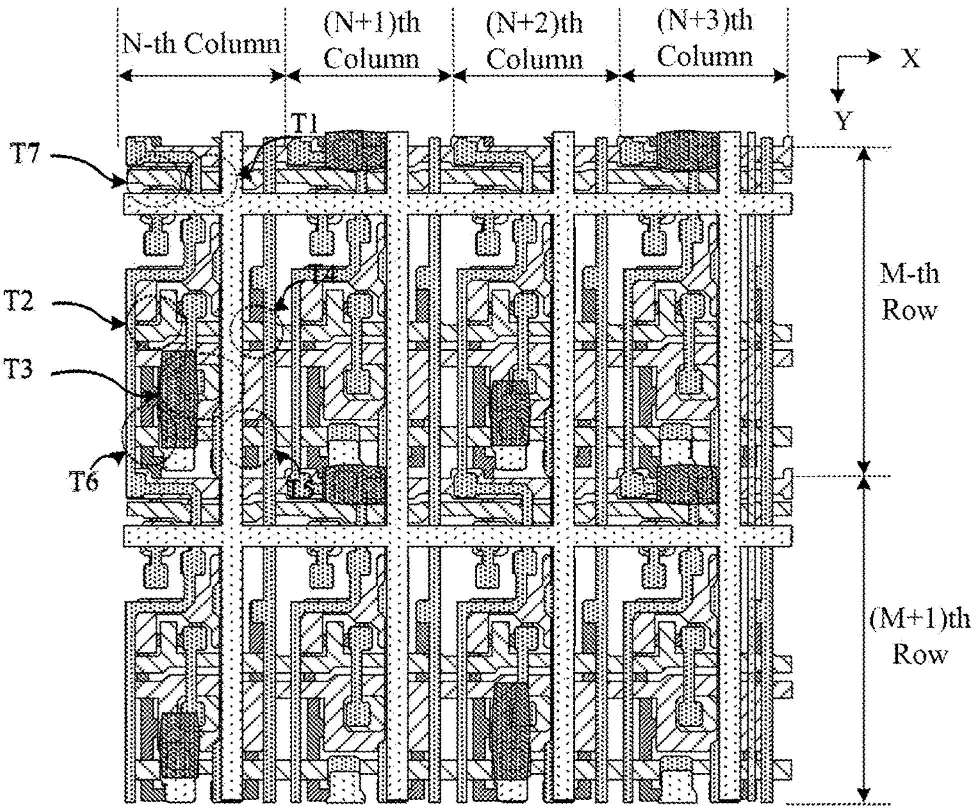
FIG. 18*a* is a schematic diagram of a display substrate after a pattern of a fifth conductive layer is formed according to the present disclosure.
Figure 18B:
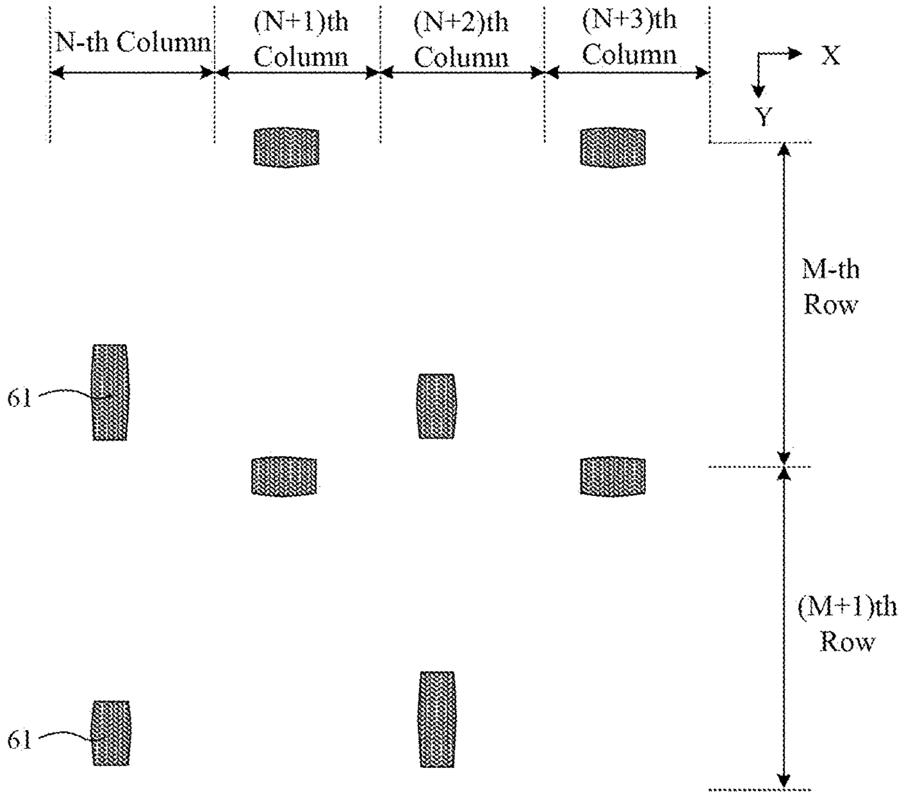
FIG. 18*b* is a schematic planar view of the fifth conductive layer in FIG. 18*a*.

(19) Forming a pattern of a fifth conductive layer. In an exemplary embodiment, forming a pattern of a fifth conductive layer may include: depositing a fifth conductive thin film on the substrate on which the above-mentioned patterns are formed, and patterning the fifth conductive thin film through a patterning process to form a fifth conductive layer disposed on the sixth insulating layer, wherein the fifth conductive layer at least includes a second anode connection electrode 61, as shown in FIG. 18*a* and FIG. 18*b*, and FIG. 18*b* is a planar schematic diagram of the fifth conductive layer in FIG. 18*a*.

As shown in conjunction with FIG. 10 to FIG. 18*b*, in an exemplary embodiment, the second anode connection electrode 61 may be disposed in each circuit unit. The second anode connection electrode 61 is connected with the first anode connection electrode 53 through the thirteenth via V13. Since the first anode connection electrode 53 is connected with the third connection electrode 46 through the twelfth via V12, the third connection electrode 46 is connected with the second region of the sixth active layer (also the second region of the seventh active layer) through the fourth via V4, thereby realizing that the second anode connection electrode 61 is connected with the second region of the sixth active layer (also the second region of the seventh active layer) through the first anode connection electrode 53 and the third connection electrode 46. In an exemplary embodiment, the second anode connection electrode 61 is configured to be connected with an anode formed subsequently.

In an exemplary embodiment, a shape of the anode connection electrode in the circuit unit of the N-th column and the M-th row may be the same as a shape of the second anode connection electrode in circuit unit of the (N+2)th column and the (M+1)th row, a shape of the second anode connection electrode in the circuit unit of the N-th column and the (M+1)th row may be the same as a shape of the second anode connection electrode in the circuit unit of (N+2)th column and the (M)th row, a shape of the second anode connection electrode in the (N+1)th circuit unit column may be the same as a shape of the second anode connection electrode in the (N+3)th circuit unit column, and the shape of the second anode connection electrode may be rectangular.

Figure 19A:
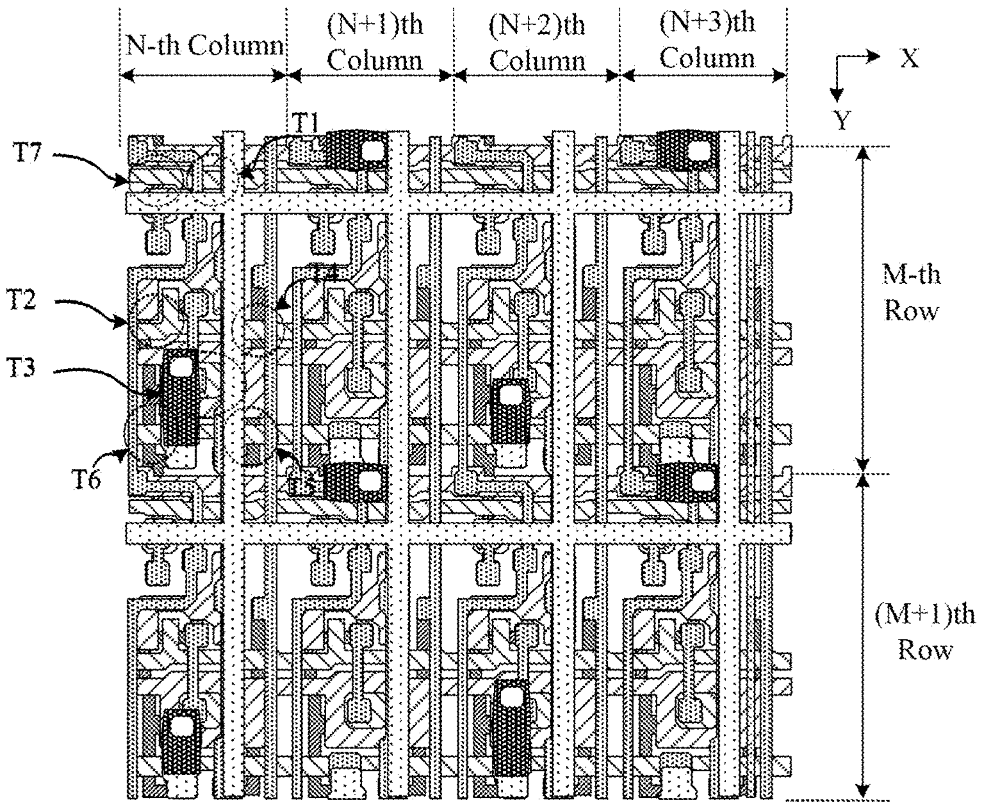
FIG. 19*a* is a schematic diagram of a display substrate after a pattern of a first planarization layer is formed according to the present disclosure.
Figure 19B:
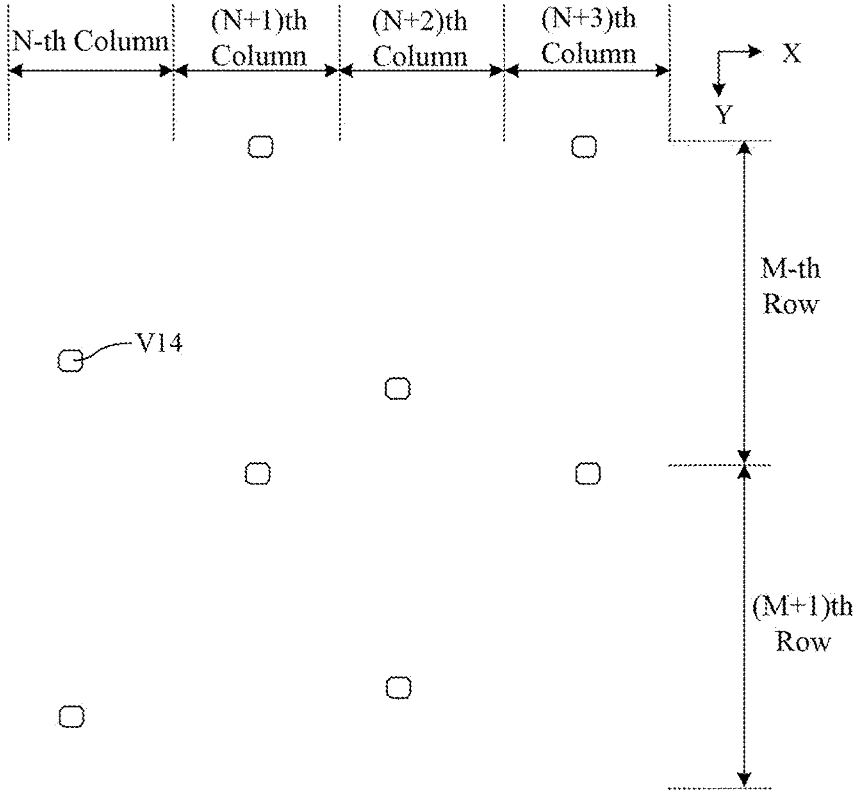
FIG. 19*b* is a schematic planar view of a plurality of vias in FIG. 19*a*.

(110) Forming a pattern of a first planarization layer. In an exemplary embodiment, forming a pattern of a first planarization layer may include: coating a first planarization thin film on the substrate on which the above-mentioned patterns are formed, and patterning the planarization thin film through a patterning process to form a first planarization layer covering the fifth conductive layer, wherein the planarization layer is provided with a fourteenth via V14, as shown in FIG. 19*a* and FIG. 19*b*, and FIG. 19*b* is a planar schematic diagram of the plurality of vias in FIG. 19*a*.

As shown in conjunction with FIG. 10 to FIG. 19*b*, an orthographic projection of the fourteenth via V14 on the substrate is located within a range of an orthographic projection of the second anode connection electrode 61 on the substrate, the first planarization layer in the fourteenth via V14 is removed to expose a surface of the second anode connection electrode 61, and the fourteenth via V14 is configured such that the anode formed subsequently is connected with the second anode connection electrode 61 through the via.

So far, the drive circuit layer is prepared on the substrate. In a plane parallel to the display substrate, the drive circuit layer may include a plurality of circuit units, each of the circuits may include a pixel drive circuit, and a first scan signal wire, a second scan signal wire, a light emission control line, a data signal wire, a first power supply line, a first initial signal wire, and a second initial signal wire connected with the pixel drive circuit. In an exemplary embodiment, at least one circuit unit may include a first data fan-out line disposed between the first power supply line and the data signal wire, and/or a second data fan-out line of which an orthographic projection on the substrate is at least partially overlapped with an orthographic projection of the initial signal connection line on the substrate. In a plane perpendicular to the display substrate, the drive circuit layer may include a first insulating layer, a semiconductor layer, a second insulating layer, a first conductive layer, a third insulating layer, a second conductive layer, a fourth insulating layer, a third conductive layer, a fifth insulating layer, a fourth conductive layer, a sixth insulating layer, a fifth conductive layer and a first planarization layer that are sequentially stacked on the substrate, the first data fan-out line and/or the second data fan-out line may be disposed in the fourth conductive layer.

In an exemplary embodiment, after the drive circuit layer is prepared, a light emitting structure layer is prepared on the driver circuit layer, and a preparation process of the light emitting structure layer may include the following operations.

Figure 20A:
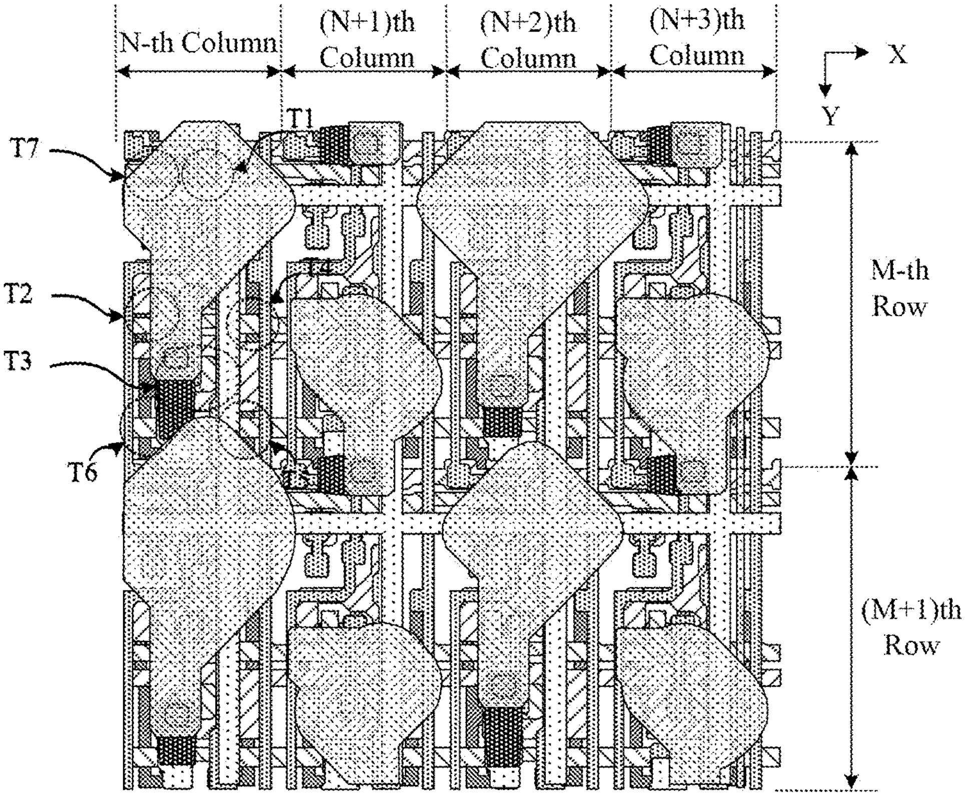
FIG. 20*a* is a schematic diagram of a display substrate after a pattern of an anode is formed according to the present disclosure.
Figure 20B:
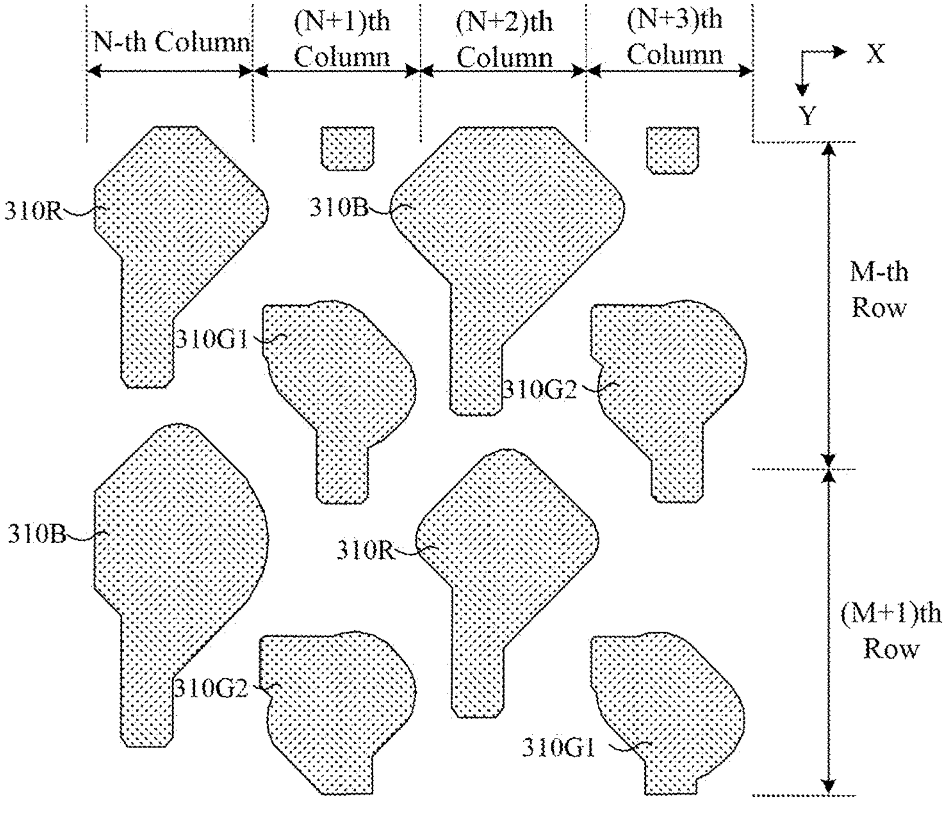
FIG. 20*b* is a schematic planar view of the anode in FIG. 20*a*.

(111) Forming a pattern of an anode. In an exemplary embodiment, forming a pattern of an anode may include: depositing a sixth conductive thin film on the substrate on which the above-mentioned patterns are formed, and patterning the sixth conductive thin film through a patterning process to form a pattern of an anode disposed on the first planarization layer, the anode is arranged in a manner of square to form a GGRB pixel arrangement, as shown in FIG. 20*a* and FIG. 20*b*, and FIG. 20*b* is a planar schematic diagram of the anode in FIG. 20*a*.

As shown in conjunction with FIG. 10 to FIG. 20*b*, the pattern of the anode may include a red anode 301R of a red light emitting device, a blue anode 301B of a blue light emitting device, a first green anode 301G1 of a first green light emitting device, and a second green anode 301G2 of a second green light emitting device, a region where the red anode 301R is located may form a red sub-pixel R that emits red light, a region where the blue anode 301B is located may form a blue sub-pixel B that emits blue light, a region where the first green anode 301G1 is located may form a first green sub-pixel G1 that emits green light, a region where the second green anode 301G2 is located may form a second green sub-pixel G2 that emits green light, the red sub-pixel R and the blue sub-pixel B are sequentially arranged along the second direction Y, the first green sub-pixel G1 and the second green sub-pixel G2 are sequentially arranged along the second direction Y, the first green sub-pixel G1 and the second green sub-pixel G2 are respectively arranged at a side of the red sub-pixel R and the blue sub-pixel B in the first direction X, and the red sub-pixel R, the blue sub-pixel B, the first green sub-pixel G1 and the second green sub-pixel G2 constitute a square-arranged pixel unit.

In an exemplary embodiment, in one pixel unit, the red anode 301R, through the fourteenth via V14 in a circuit unit of the M-th row and the N-th column, is connected with the second anode connection electrode 61 in the circuit unit; the blue anode 301B, through the fourteenth via V14 in a circuit unit of the (M+1)th row and the N-th column, is connected with the second anode connection electrode 61 in the circuit unit; the first green anode 301G1, through the fourteenth via V14 in a circuit unit of the M-th row and the (N+1)th column, is connected with the second anode connection electrode 61 in the circuit unit; the second green anode 301G2, through the fourteenth via V14 in a circuit unit of the (M+1)th row and the (N+1)th column, is connected with the second anode connection electrode 61 in the circuit unit. In another pixel unit, the red anode 301R, through the fourteenth via V14 in a circuit unit of the (M+1)th row and the (N+2)th column, is connected with the second anode connection electrode 61 in the circuit unit; the blue anode 301B, through the fourteenth via V14 in a circuit unit in the M-th row and the (N+2)th column, is connected with the second anode connection electrode 61 in the circuit unit; the first green anode 301G1, through the fourteenth via V14 in a circuit unit of the (M+1)th row and (N+3)th column, is connected with the second anode connection electrode 61 in the circuit unit; the second green anode 301G2, through the fourteenth via V14 in a circuit unit of the (M)th row and (N+3)th column, is connected with the second anode connection electrode 61 in the circuit unit.

In an exemplary embodiment, since each anode is connected with the second region of the sixth active layer (also the second region of the seventh active layer) through the second anode connection electrode, the first anode connection electrode and the third connection electrode 46 in one circuit unit, therefore, four anodes in one pixel unit are correspondingly connected with pixel drive circuits of four circuit units in one circuit unit group, respectively, so that the pixel drive circuit can drive the light emitting device to emit light.

In an exemplary embodiment, shapes and positions of two red anodes 301R respectively connected with pixel drive circuits in the circuit unit of M-th row and N-th column and the circuit unit of (M+1)th row and (N+2)th column are same, shapes and positions of two blue anodes 301B respectively connected with pixel drive circuits in the circuit unit of (M+1)th row and N-th column and the circuit unit of (M)th row and (N+2)th column are same, shapes and positions of two first green anodes 301G1 connected with pixel drive circuits in the circuit unit of M-th row and (N+1)th column and the circuit unit of (M+1)th row and (N+3)th column are same, shapes and positions of two second green anodes 301G2 connected with pixel drive circuits in the circuit unit of (M+1)th row and (N+1)th column and the circuit unit of M-th row and (N+3)th column are same. In an exemplary embodiment, shapes and areas of the red anode 301R, the blue anode 301B, the first green anode 301G1 and the second green anode 301G2 in one pixel unit are all different.

In an exemplary embodiment, shapes and regions of anodes of four sub-pixels in one pixel unit may be same, alternatively be different, a position relationship between four sub-pixels of one pixel unit and four circuit units in one circuit unit group may be same or different, and shapes and positions of the red anode 301R, the blue anode 301B, the first green anode 301G1 and the second green anode 301G2 in different pixel units may be same or different, which is not limited in the present disclosure.

In an exemplary embodiment, the subsequent preparation process may include: first forming a pattern of a pixel define layer, wherein the pattern of the pixel define layer may include a red pixel opening exposing a red anode, a blue pixel opening exposing a blue anode, a first green opening exposing a first green anode, and a second green opening exposing a second green anode. Then, forming an organic light emitting layer by evaporation or inkjet printing process, wherein the organic light emitting layer is connected with an anode through a respective pixel opening, and forming a cathode on the organic light emitting layer, wherein the cathode is connected with the organic light emitting layer. Forming an encapsulation layer, wherein the encapsulation layer may include a first encapsulation layer, a second encapsulation layer, and a third encapsulation layer that are stacked, the first encapsulation layer and the third encapsulation layer may be made of an inorganic material, the second encapsulation layer may be made of an organic material, the second encapsulation layer is disposed between the first encapsulation layer and the third encapsulation layer so that it can be ensured that external water vapor cannot enter the light emitting structure layer.

In an exemplary implementation, the substrate may be a flexible substrate or a rigid substrate. The rigid substrate may be made of, but is not limited to, one or more of glass and quartz. The flexible substrate may be made of, but is not limited to, one or more of polyethylene terephthalate, ethylene terephthalate, polyether ether ketone, polystyrene, polycarbonate, polyarylate, polyarylester, polyimide, polyvinyl chloride, polyethylene, and textile fibers. In an exemplary implementation, the flexible substrate may include a first flexible material layer, a first inorganic material layer, a semiconductor layer, a second flexible material layer and a second inorganic material layer which are stacked, wherein materials of the first flexible material layer and the second flexible material layer may be polyimide (PI), polyethylene terephthalate (PET) or a polymer soft film with surface treatment; materials of the first inorganic material layer and the second inorganic material layer may be silicon nitride (SiNx) or silicon oxide (SiOx), etc., for improving the water-resistance and oxygen-resistance of the substrate; and the material of the semiconductor layer may be amorphous silicon (a-si).

In an exemplary embodiment, the first conductive layer, the second conductive layer, the third conductive layer, the fourth conductive layer, and the fifth conductive layer may be made of metal materials, such as any one or more of silver (Ag), copper (Cu), aluminum (Al) and molybdenum (Mo), or alloy materials of the above metals, such as an aluminum neodymium alloy (AlNd) or a molybdenum niobium alloy (MoNb), and may be a single-layer structure or a multi-layer composite structure, such as Mo/Cu/Mo, etc. The sixth conductive layer may be made of a single-layer structure, such as indium tin oxide ITO or indium zinc oxide IZO, or may be made of a multi-layer composite structure, such as ITO/Ag/ITO, etc. The first insulating layer, the second insulating layer, the third insulating layer, the fourth insulating layer, the fifth insulating layer and the sixth insulating layer may be made of any one or more of Silicon Oxide (SiOx), Silicon Nitride (SiNx), and Silicon OxyNitride (SiON), and may be a single layer, a multi-layer, or a composite layer. The first insulating layer is referred to as a buffer layer for improving the water and oxygen resistance of the substrate, the second and the third insulating layers are referred to as gate insulating (GI) layers, the fourth insulating layer is referred to as an interlayer insulating (ILD) layer, and the fifth insulating layer and the sixth insulating layer are referred to as a passivation (PVX) layer. The first planarization layer may be made of an organic material such as resin. The active layer may be made of materials such as amorphous indium gallium zinc oxide (a-IGZO), zinc oxynitride (ZnON), indium zinc tin oxide (IZTO), amorphous silicon (a-Si), polysilicon (p-Si), hexathiophene, or polythiophene, etc. That is, the present disclosure is applicable to transistors that are manufactured based on oxide technology, silicon technology or organic technology.

FIG. 21*a* to FIG. 22*b* show a preparation process of a first wiring region in a display substrate by taking eight circuit units (two circuit unit rows and four circuit unit columns) as an example. In an exemplary implementation, the preparation process of the display substrate may include the following operations.

In the exemplary embodiment, the process of forming patterns of the semiconductor layer, the first conductive layer, the second conductive layer, the fourth insulating layer, and the third conductive layer in the present exemplary embodiment may be substantially the same as the (11) to (15) in the foregoing embodiments, and will not be repeated herein.

Figure 21A:
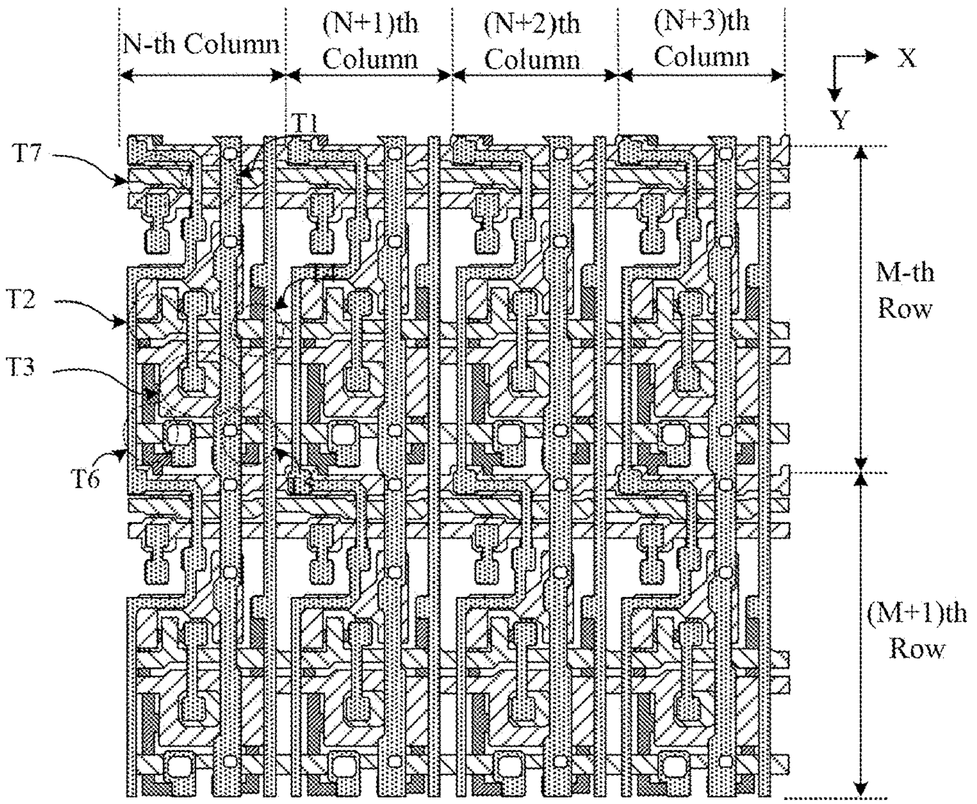
FIG. 21*a* is a schematic diagram of a display substrate after another pattern of a fifth insulating layer is formed according to the present disclosure.
Figure 21B:
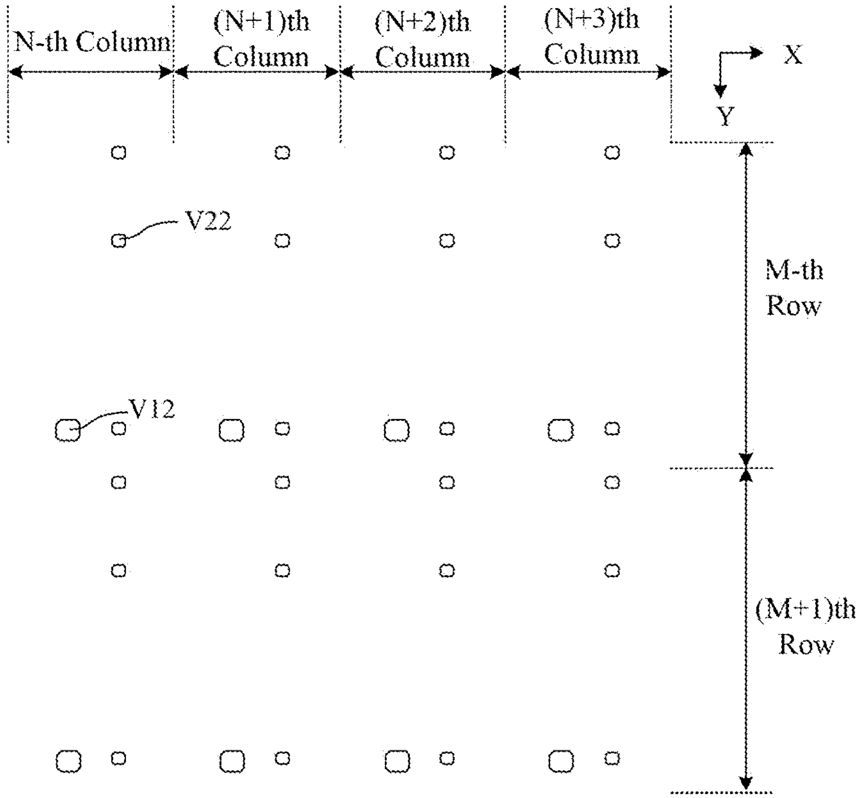
FIG. 21*b* is a schematic planar view of a plurality of vias in FIG. 21*a*.

(26) Forming a pattern of a fifth insulating layer. In an exemplary embodiment, forming a pattern of a fifth insulating layer may include: depositing a fifth insulating film on the substrate on which the above-mentioned patterns are formed, and patterning the fifth insulating film through a patterning process to form a fifth insulating layer covering the third conductive layer, wherein the fifth insulating layer is provided with a plurality of vias, and the plurality of vias at least include a twelfth via V12 and a twenty-second via V22, as shown in FIG. 21*a* and FIG. 21*b*, and FIG. 21*b* is a planar schematic diagram of the plurality of vias in FIG. 21*a*.

In an exemplary embodiment, an orthographic projection of the twelfth via V12 on the substrate is located within a range of an orthographic projection of the third connection electrode 46 on the substrate, the fifth insulating layer in the tenth via V12 is removed to expose a surface of the third connection electrode 46, and the twelfth via V12 is configured such that a first anode connection electrode formed subsequently is connected with the third connection electrode 46 through the via.

An orthographic projection of the twenty-second via V22 on the substrate is located within a range of an orthographic projection of the first power supply line 41 on the substrate, the fifth insulating layer in the twenty-second via V22 is removed to expose a surface of the first power supply line 41, and the twenty-second via V22 is configured such that a third compensation line formed subsequently is connected with the first power supply line 41 through the via.

In an exemplary embodiment, the twenty-second via V22 may be plural, and the plurality of twenty-second vias V22 may be sequentially arranged along the second direction Y, thereby increasing connection reliability between the first power supply line and the third compensation line.

In an exemplary embodiment, positions of the twelfth via V12 and the twenty-second via V22 in the respective circuit units may be the same or may be different, which is not limited in the present disclosure.

Figure 22A:
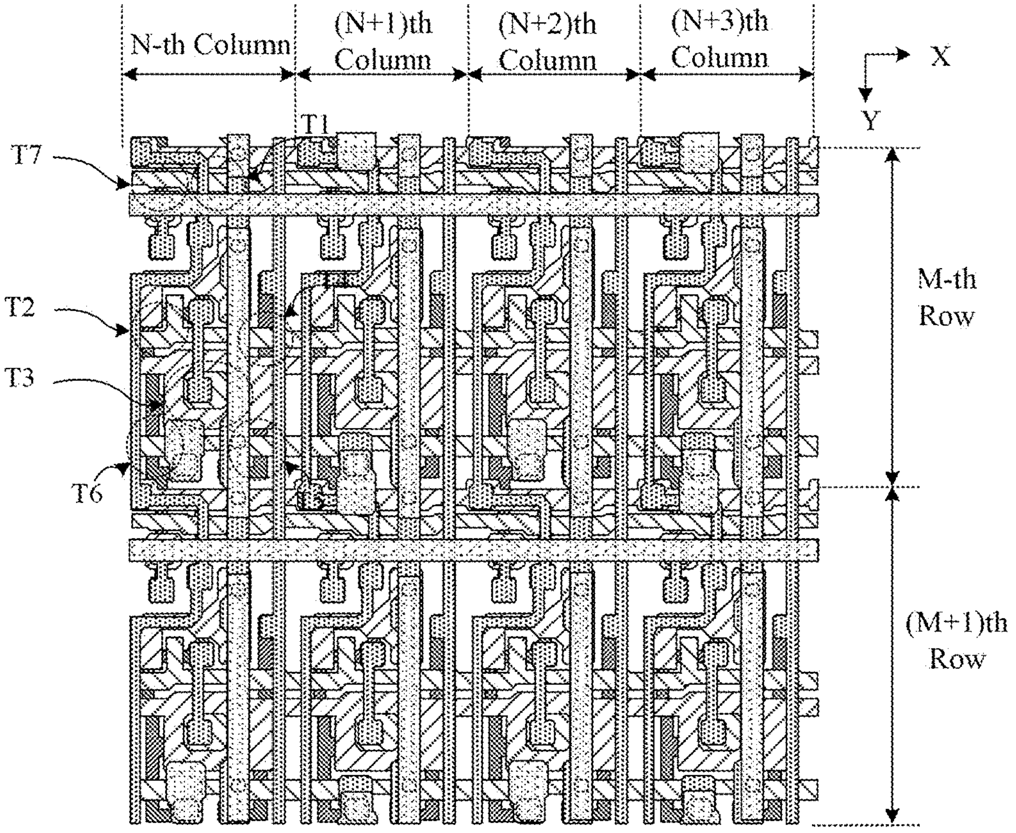
FIG. 22*a* is a schematic diagram of a display substrate after another pattern of a fourth conductive layer is formed according to the present disclosure.
Figure 22B:
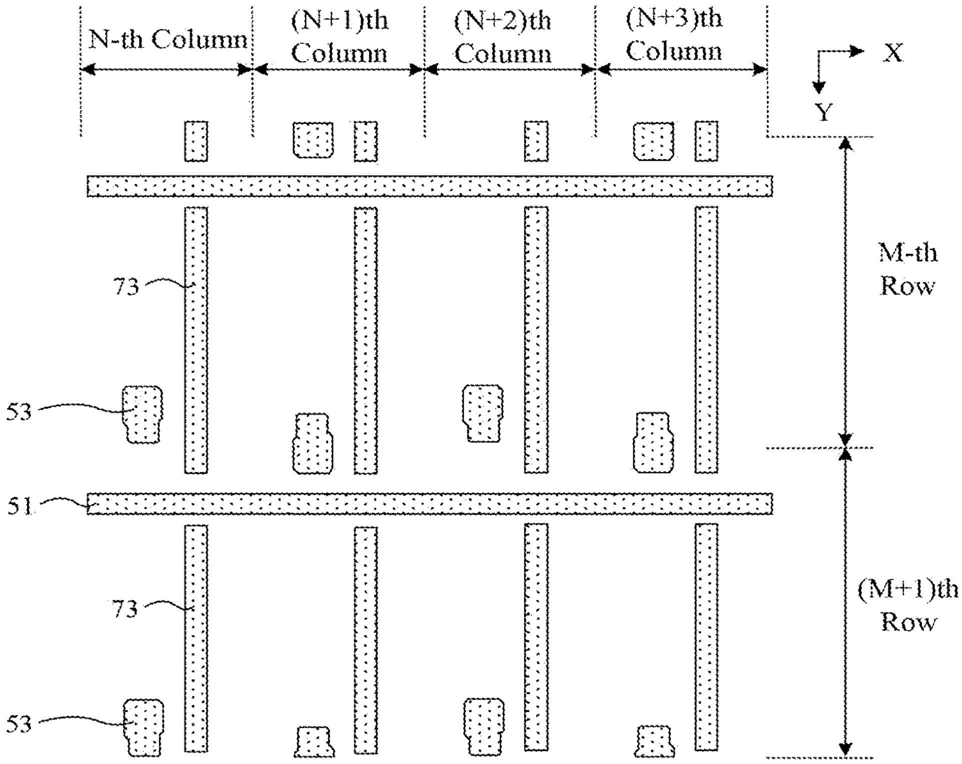
FIG. 22*b* is a schematic planar view of the fourth conductive layer in FIG. 22*a*.

(27) Forming a pattern of a fourth conductive layer. In an exemplary embodiment, forming a pattern of a fourth conductive layer may include: depositing a fourth conductive thin film on the substrate on which the above-mentioned patterns are formed, and patterning the fourth conductive thin film through a patterning process to form a fourth conductive layer disposed on the fifth insulating layer, wherein the fourth conductive layer at least includes a first data fan-out line 51, a first anode connection electrode 53 and a third compensation line 73, as shown in FIG. 22*a* and FIG. 22*b*, and FIG. 22*b* is a planar schematic diagram of the fourth conductive layer in FIG. 22*a*.

In an exemplary implementation, the first data fan-out line 51 may be straight line extending along the first direction X, and the third compensation line 73 may a straight line extending along the second direction Y. The first data fan-out lines 51 may be arranged continuously in one circuit unit row, and the first data fan-out lines 51 in adjacent first circuit units in the first direction X are connected with each other. The third compensation lines 73 may be arranged at intervals in one circuit unit column, and may be arranged at both sides of the first data fan-out line 51 in the second direction Y. There is a first distance between an edge of the first data fan-out line 51 close to the third compensation line 73 and an end face of the third compensation line 73 close to the first data fan-out line 51.

In an exemplary implementation, an orthographic projection of the first data fan-out line 51 in the plane of the display substrate may be at least partially overlapped with an orthographic projection of the second initial signal wire 32 in the plane of the display substrate. In another exemplary implementation, the orthographic projection of the first data fan-out line 51 in the plane of the display substrate may be at least partially overlapped with the orthographic projection of the first initial signal wire 31 in the plane of the display substrate.

In an exemplary embodiment, the orthographic projection of the third compensation line 73 on the substrate is at least partially overlapped with the orthographic projection of the first power supply line 41 on the substrate, and the third compensation line 73 is connected with the first power supply line 41 through at least one twenty-second via V22. In a possible exemplary embodiment, the orthographic projection of the third compensation line 73 on the substrate is located within a range of the orthographic projection of the first power supply line 41 on the substrate.

In another exemplary embodiment, the orthographic projection of the third compensation line 73 on the substrate may be located between the orthographic projection of the first power supply line 41 on the substrate and the orthographic projection of the data signal wire 42 in the plane of the display substrate.

In yet another exemplary implementation, an orthographic projection of the third compensation line 73 in the plane of the display substrate may be at least partially overlapped with the orthographic projection of the initial signal connection line 43 in the plane of the display substrate, and the second compensation line 73 may be connected with the initial signal connection line 43 through a via.

The third compensation line 73 shown in FIG. 8*e* is only for exemplary illustration for FIG. 22*a* and FIG. 22*b* and in other exemplary embodiments, the structure of the fifth compensation line shown in FIG. 8*g* or the structure of the seventh compensation line shown in FIG. 8*i* may be adopted for FIG. 22*a* and FIG. 22*b*, which is not limited in the present disclosure.

In an exemplary embodiment, the structure of the first anode connection electrode 53 is similar to that of the foregoing embodiment and will not be repeated herein.

In an exemplary embodiment, the process of forming patterns of the sixth insulating layer, the fifth conductive layer, the first planarization layer and the anode in the present exemplary implementation may be substantially the same as (18) to (111) in the foregoing embodiments, and will not be repeated herein.

FIG. 23*a* to FIG. 24*b* show a preparation process of a second wiring region in a display substrate by taking eight circuit units (two circuit unit rows and four circuit unit columns) as an example. In an exemplary implementation, the preparation process of the display substrate may include the following operations.

In the exemplary embodiment, the process of forming patterns of the semiconductor layer, the first conductive layer, the second conductive layer, the fourth insulating layer, and the third conductive layer in the present exemplary embodiment may be substantially the same as (11) to (15) in the foregoing embodiments, and will not be repeated herein.

Figure 23A:
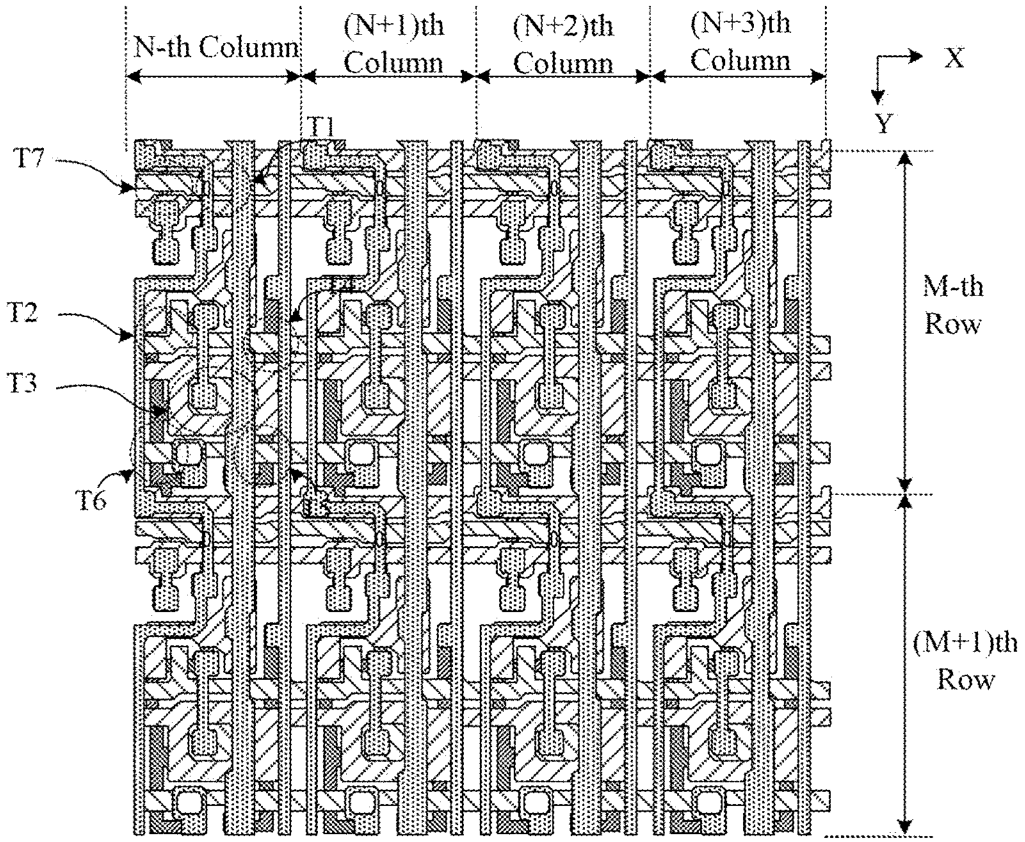
FIG. 23*a* is a schematic diagram of another display substrate after yet another pattern of a fifth insulating layer is formed according to the present disclosure.
Figure 23B:
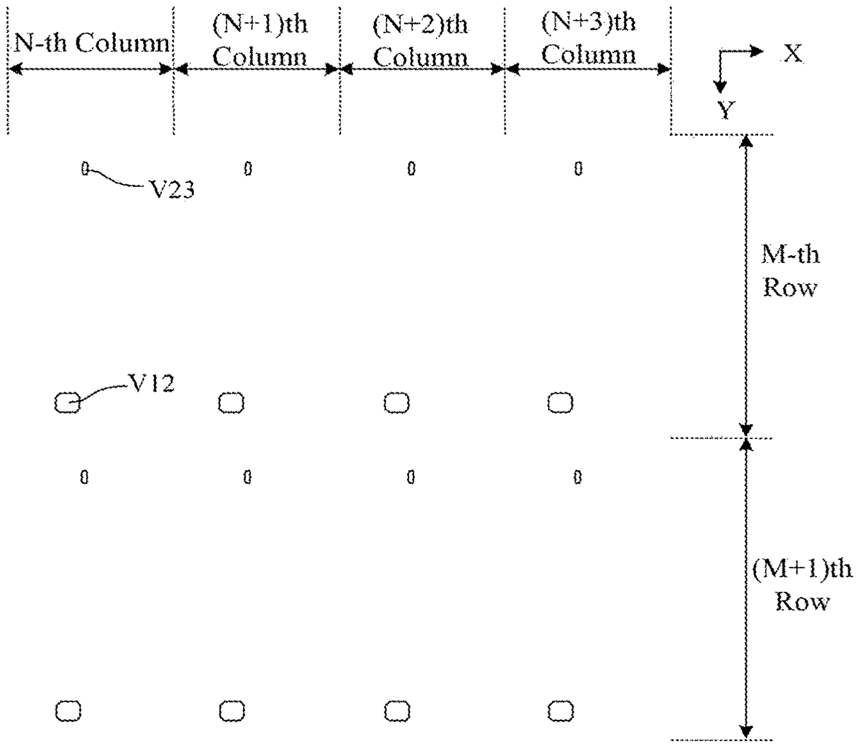
FIG. 23*b* is a schematic planar view of a plurality of vias in FIG. 23*a*.

(36) Forming a pattern of a fifth insulating layer. In an exemplary embodiment, forming a pattern of a fifth insulating layer may include: depositing a fifth insulating film on the substrate on which the above-mentioned patterns are formed, and patterning the fifth insulating film through a patterning process to form a fifth insulating layer covering the third conductive layer, wherein the fifth insulating layer is provided with a plurality of vias, and the plurality of vias at least include a twelfth via V12 and a twenty-third via V23, as shown in FIG. 23*a* and FIG. 23*b*, and FIG. 23*b* is a planar schematic diagram of the plurality of vias in FIG. 23*a*.

In an exemplary embodiment, an orthographic projection of the twelfth via V12 on the substrate is located within a range of an orthographic projection of the third connection electrode 46 on the substrate, the fifth insulating layer in the tenth via V12 is removed to expose a surface of the third connection electrode 46, and the twelfth via V12 is configured such that a first anode connection electrode formed subsequently is connected with the third connection electrode 46 through the via.

The orthographic projection of the twenty-third via V23 on the substrate is located within the orthographic projection of the initial signal connection line 43 on the substrate, the fifth insulating layer of the twenty-third via V23 is removed to expose a surface of the initial signal connection line 43, and the twenty-third via V23 is configured such that a fourth compensation line formed subsequently is connected with the initial signal connection line 43 through the via.

Figure 24A:
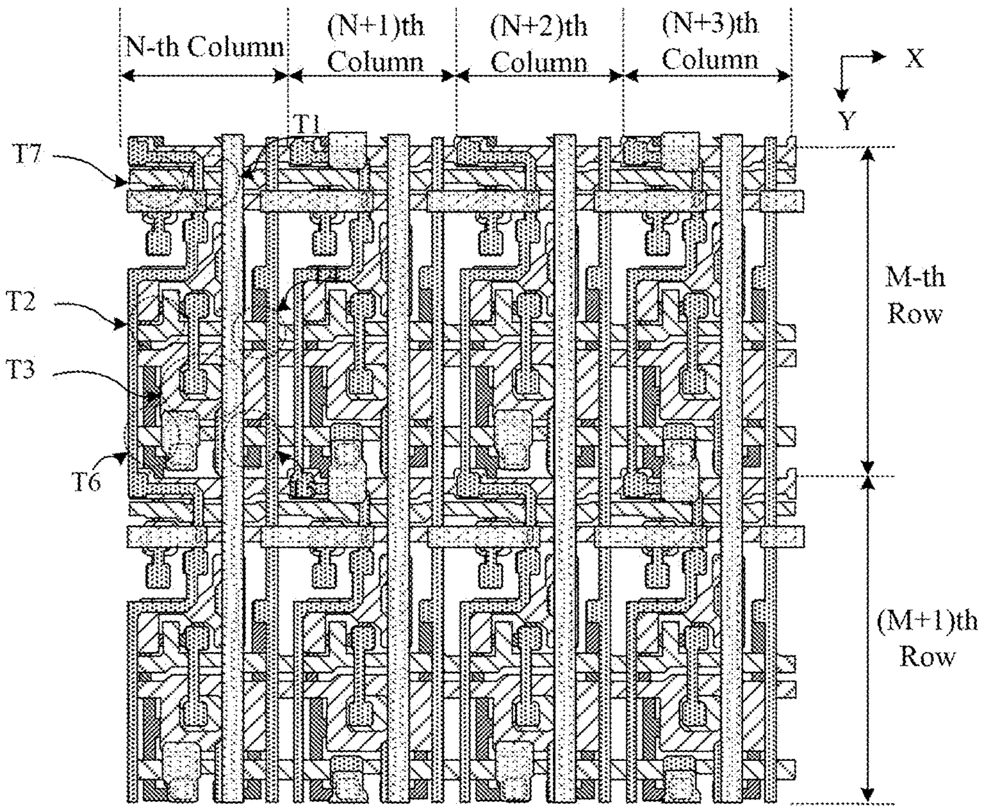
FIG. 24*a* is a schematic diagram of a display substrate after another pattern of a fourth conductive layer is formed according to the present disclosure.
Figure 24B:
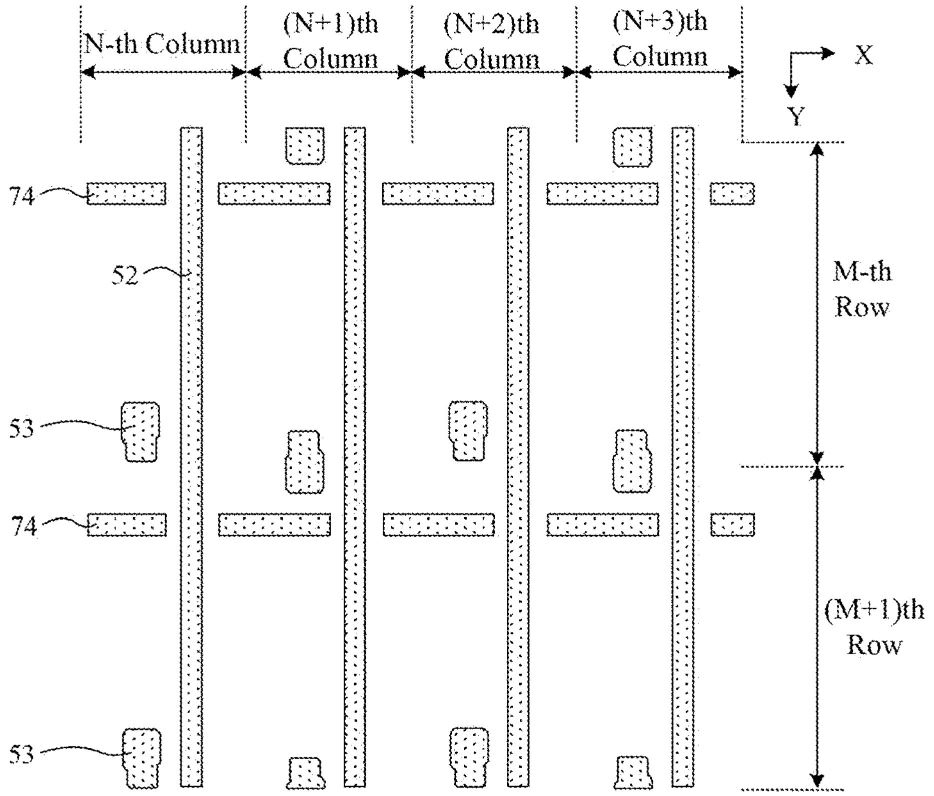
FIG. 24*b* is a schematic planar view of the fourth conductive layer in FIG. 24*a*.

(37) Forming a pattern of a fourth conductive layer. In an exemplary embodiment, forming a pattern of a fourth conductive layer may include: depositing a fourth conductive thin film on the substrate on which the above-mentioned patterns are formed, and patterning the fourth conductive thin film through a patterning process to form a fourth conductive layer disposed on the fifth insulating layer, wherein the fourth conductive layer at least includes a second data fan-out line 52, a first anode connection electrode 53 and a fourth compensation line 74, as shown in FIG. 24*a* and FIG. 24*b*, and FIG. 24*b* is a planar schematic diagram of the fourth conductive layer in FIG. 24*a*.

In an exemplary implementation, in an exemplary embodiment, the second data fan-out line 52 may be in a straight line shape extending along the second direction Y, the fourth compensation line 74 may be in a straight line shape extending along the first direction X, and the fourth compensation line 74 is connected with the initial signal connection line 43 through the twenty-third via V23. The second data fan-out line 52 may be arranged continuously in one circuit unit column, and the second data fan-out lines 52 in adjacent first circuit units in the second direction Y are connected with each other. The fourth compensation lines 74 may be arranged at intervals in one circuit unit row, and may be arranged at both sides of the second data fan-out line 52 in the first direction X, and there is a second spacing between an edge of the second data fan-out line 52 close to the fourth compensation line 74 and an end face of the fourth compensation line 74 close to the second data fan-out line 52.

In an exemplary implementation, the orthographic projection of the second data fan-out line 52 on the substrate is at least partially overlapped with the orthographic projection of the first power supply line 41 on the substrate. In a possible exemplary embodiment, the orthographic projection of the second data fan-out line 52 on the substrate is located within a range of the orthographic projection of the first power supply line 41 on the substrate.

In another exemplary embodiment, the orthographic projection of the second data fan-out line 52 on the substrate may be located between the orthographic projection of the first power supply line 41 on the substrate and the orthographic projection of the data signal wire 42 in the plane of the display substrate.

In yet another exemplary implementation, the orthographic projection of the second data fan-out line 52 in the plane of the display substrate may be at least partially overlapped with the orthographic projection of the first initial signal wire 43 in the plane of the display substrate.

In an exemplary implementation, an orthographic projection of the fourth compensation line 74 in the plane of the display substrate may be at least partially overlapped with the orthographic projection of the first initial signal wire 31 or second initial signal wire 32 in the plane of the display substrate.

In an exemplary implementation, the fourth compensation line 74 may be connected with the first power supply line 41 through a via, alternatively, the fourth compensation line 74 may be connected with the initial signal connection line 43 through a via.

The fourth compensation line 74 shown in FIG. 8*f* is only for exemplary illustration for FIG. 24*a* and FIG. 24*b* and in other exemplary embodiments, the structure of the sixth compensation line shown in FIG. 8*h* or the structure of the eighth compensation line shown in FIG. 8*j* may be adopted for FIG. 24*a* and FIG. 24*b*, which is not limited in the present disclosure.

In an exemplary embodiment, the structure of the first anode connection electrode 53 is similar to that of the foregoing embodiment and will not be repeated herein.

In an exemplary embodiment, the process of forming patterns of the sixth insulating layer, the fifth conductive layer, the first planarization layer and the anode in the present exemplary implementation may be substantially the same as (18) to (111) in the foregoing embodiments, and will not be repeated herein.

In a display substrate, a display region includes a wiring region provided with a data fan-out line and a normal region without a data fan-out line, the wiring region includes a first data fan-out line and a second data fan-out line with different extending directions. Since a reflection ability of the normal region is weak, the data fan-out line in the wiring region has a strong reflection ability, and a reflective ability of the first data fan-out line is different from that of the second data fan-out line, therefore, an appearance of the normal region is obviously different from that of the wiring region, an appearance of the first wiring region with which the first data fan-out line is provided is different from that of the second wiring region with which the second data fan-out line is provided, which leads to a problem that the display substrate has a poor appearance, especially more obvious when the screen is off or the display is in a low gray tone. Exemplary embodiments of the present disclosure provide compensation lines in each of the normal region, the first wiring region and the second wiring region, the compensation line and the data fan-out line are arranged on the same layer, and is formed at the same time by the same patterning process, the normal region is provided with a first compensation line extending along a first direction X and a second compensation line extending along a second direction Y, the first wiring region is provided with a third compensation line extending along the second direction Y, the second wiring region is provided with a fourth compensation line extending along the first direction X, So that the reflective ability of the first compensation line and the second compensation line in the normal region, the reflective ability of the first data fan-out line and the third compensation line in the first wiring region, and the reflective ability of the second data fan-out line and the fourth compensation line in the second wiring region are substantially similar, the difference in appearance among the normal region, the first tracing region and the second tracing region is eliminated, and the poor appearance of the display substrate is avoided.

As can be seen from the structure and preparation process of the display substrate described above, according to the present disclosure, the data fan-out line is disposed in the display region, so that the lead line of the bonding region is connected with the data signal wire through the data fan-out line. Therefore, there is no need to dispose fan-shaped oblique lines in the lead region, a length of the lead region in the vertical direction is effectively reduced, and a width of the lower bezel is greatly reduced, so that widths of the upper bezel, the lower bezel, the left bezel and the right bezel of the display apparatus are similar and all below 1.0 mm, which increases a screen-to-body ratio and is beneficial to realizing bezel-less display. In the present disclosure, an initial signal connection line of which a body portion extends along the second direction is disposed, and the initial signal connection line is connected with the first initial signal wire through a via, so that the initial signal connection line and the first initial signal wire form a network structure, which not only effectively reduces a resistance of the first initial signal wire and a voltage drop of a first initial voltage, but also effectively improves an uniformity of the first initial voltage in the display substrate, effectively improves the display uniformity, and improves the display character and the display quality. According to the present disclosure, compensation lines are disposed in the normal region, the first wiring region and the second wiring region, and the compensation lines are arranged on the same layer as the data fan-out line and are formed simultaneously by the same patterning process, therefore a difference of appearance among the normal region, the first wiring region and the second wiring region is eliminated, a poor appearance of the display substrate is avoided. According to the present disclosure, the compensation line is connected with the first power supply line or the initial signal connection line, therefore an electrical defect caused by a floating of the compensation line is avoided, and the working reliability and the display effect are improved. The preparation process in the present disclosure may be compatible well with an existing preparation process, which is simple in process implementation, easy to implement, high in production efficiency and yield, and low in production cost.

According to the present disclosure, the first data fan-out line is disposed between the first power supply line and the data signal wire, so that the first data fan-out line avoids the first power supply line, thus effectively reducing a parasitic capacitance between the first data fan-out line and the first power supply line, and effectively reducing crosstalk.

The structure shown and above mentioned in the present disclosure and the preparation process thereof are merely an exemplary description. In an exemplary implementation, the corresponding structures may be altered and the patterning processes may be added or reduced according to actual needs. For example, the twenty-first via in FIG. 15*a* and FIG. 15*b* may expose the surface of the initial signal connection line, and the second compensation line in FIG. 16*a* and FIG. 16*b* may be at least partially overlapped with the initial signal connection line, and the second compensation line is connected with the initial signal connection line through the twenty-first via. For another example, the twenty-second via in FIG. 21*a* and FIG. 21*b* may expose the surface of the initial signal connection line, and the third compensation line in FIG. 22*a* and FIG. 22*b* may be at least partially overlapped with the initial signal connection line, and the third compensation line is connected with the initial signal connection line through the twenty-second via. For yet another example, the twenty-third via in FIG. 23*a* and FIG. 23*b* may expose the surface of the first power supply line, the fourth compensation line 74 in FIG. 24*a* and FIG. 24*b* may be connected with the first power supply line through the twenty-third via, and the second data fan-out line may be at least partially overlapped with the initial signal connection line. For yet another example, the fan-out line and the compensation line may be disposed in the third conductive layer, and the first power supply line and the data signal wire may be disposed in the fourth conductive layer. For yet another example, the first power supply line and the data signal wire may be disposed in the fourth conductive layer, and the fan-out line and the compensation line may be disposed in the fifth conductive layer. For yet another example, the first power supply line and the data signal wire may be disposed in different film layers. For yet another example, the display substrate may further include a second power supply line VSS extending along the second direction, and orthographic projections of the data fan-out line and the compensation line extending along the second direction in the plane of the display substrate may be at least partially overlapped with an orthographic projection of the second power supply line VSS in the plane of the display substrate, etc. which is not limited in the present disclosure.

Figure 25:
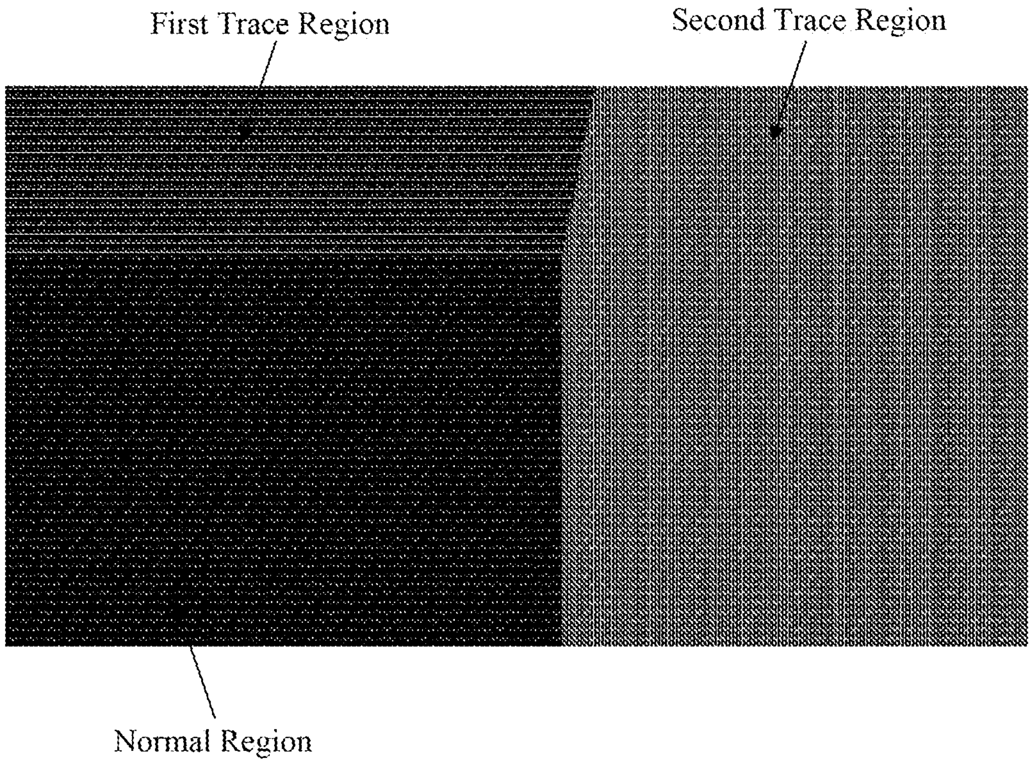
FIG. 25 is a schematic diagram of an appearance of a display substrate.
Figure 26:
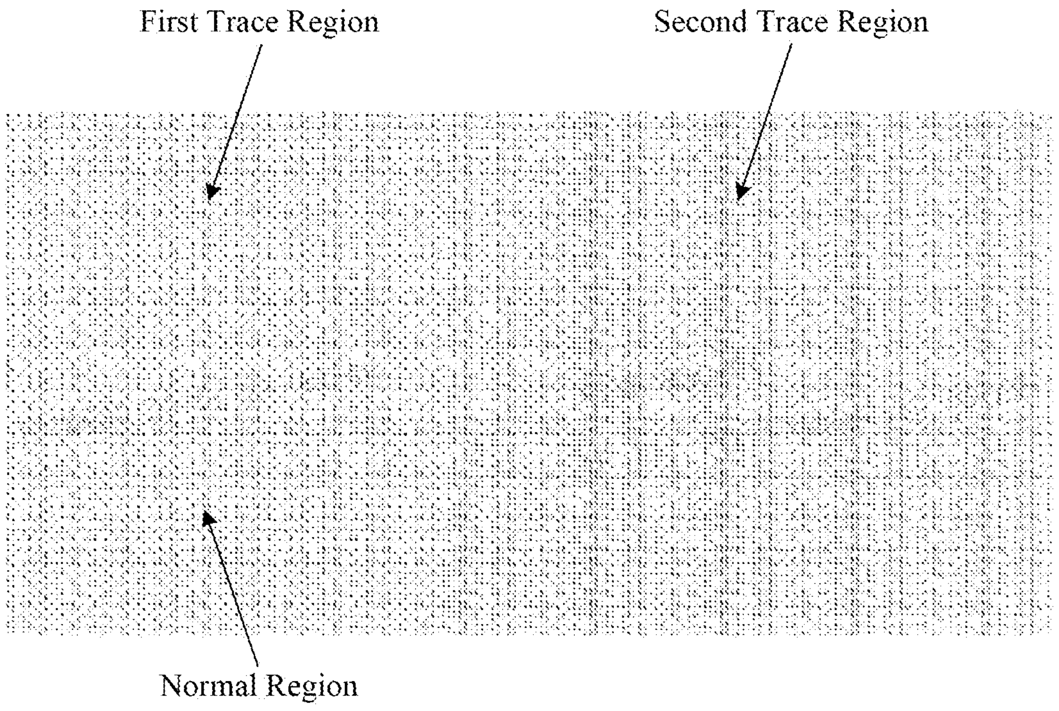
FIG. 26 is a schematic diagram of an appearance of a display substrate according to an embodiment of the present disclosure.

FIG. 25 is a schematic diagram of an appearance of a display substrate, and FIG. 26 is a schematic view of an appearance of a display substrate according to an exemplary embodiment of the present disclosure. In a display substrate, a display region includes a wiring region provided with a data fan-out line and a normal region without a data fan-out line, the wiring region includes a first data fan-out line and a second data fan-out line with different extending directions. Since a reflection ability of the normal region is weak, the data fan-out line in the wiring region has a strong reflection ability, and a reflective ability of the first data fan-out line is different from that of the second data fan-out line, therefore, an appearance of the normal region is obviously different from that of the wiring region, an appearance of the first wiring region with which the first data fan-out line is provided is different from that of the second wiring region with which the second data fan-out line is provided, which leads to a problem that the display substrate has a poor appearance, as shown in FIG. 25. Exemplary embodiments of the present disclosure provide compensation lines in each of the normal region, the first wiring region and the second wiring region, a first compensation line and a second compensation line are disposed in the normal region, a third compensation line is disposed in the first wiring region, and a fourth compensation line is disposed in the second wiring region, so that the reflection conditions of the normal region, the first wiring region and the second wiring region are substantially similar, thus eliminating the difference in appearance among the normal region, the first wiring region and the second wiring region, and avoiding a poor appearance of the display substrate, as shown in FIG. 26.

In an exemplary embodiment, the display substrate of the present disclosure may be applied to a display apparatus with a pixel drive circuit, such as an OLED, a quantum dot display (QLED), a light emitting diode display (Micro LED or Mini LED) or a quantum dot light emitting diode display (QDLED), which is not limited herein in the present disclosure.

The present disclosure further provides a preparation method for a display substrate, for preparing the display substrate according to the foregoing embodiments. In an exemplary embodiment, the preparation method may include:

forming a drive circuit layer on the substrate; the drive circuit layer includes a plurality of circuit units, the circuit units include a pixel drive circuit and a data signal wire providing a data signal to the pixel drive circuit and an initial signal wire providing an initial signal; the plurality of circuit units includes at least one normal circuit unit and at least one tracing circuit unit, the normal circuit unit is provided with a first compensation line extending along a first direction and a second compensation line extending along a second direction, the tracing circuit unit is provided with a first data fan-out line extending along the first direction or a second data fan-out line extending along the second direction, the first direction intersects with the second direction; an orthographic projection of the first compensation line in a plane of the display substrate is at least partially overlapped with an orthographic projection of the initial signal wire in the plane of the display substrate.

The present disclosure further provides a display apparatus which includes the aforementioned display substrate. The display apparatus may be any product or component with a display function, such as a mobile phone, a tablet computer, a television, a display, a notebook computer, a digital photo frame, or a navigator, and the embodiments of the present invention are not limited thereto.

Although the implementations disclosed in the present disclosure are described as above, the described contents are only implementations which are used in order to facilitate understanding of the present disclosure, and are not intended to limit the present invention. Any skilled person in the art to which the present disclosure pertains may make any modifications and alterations in forms and details of implementation without departing from the spirit and scope of the present disclosure. However, the patent protection scope of the present invention should be subject to the scope defined by the appended claims.

The invention claimed is:

1. A display substrate, comprising a drive circuit layer disposed on a base substrate, wherein the drive circuit layer comprises a plurality of circuit units, and a circuit unit comprises a pixel drive circuit and a data signal wire providing a data signal to the pixel drive circuit and an initial signal wire providing an initial signal;

the plurality of circuit units comprises at least one first circuit unit and at least one tracing circuit unit, the first circuit unit is provided with a first compensation line extending along a first direction and a second compensation line extending along a second direction, the tracing circuit unit is provided with a first data fan-out line extending along the first direction or a second data fan-out line extending along the second direction, the first data fan-out line or the second data fan-out line is connected with the data signal wire, and the first direction intersects with the second direction; and an orthographic projection of the first compensation line in a plane of the display substrate is at least partially overlapped with an orthographic projection of the initial signal wire in the plane of the display substrate;

the first compensation line, the second compensation line, and the first data fan-out line are formed simultaneously through a same patterning process; or the first compensation line, the second compensation line, and the second data fan-out line are formed simultaneously through a same patterning process.

2. The display substrate according to claim 1, wherein the first circuit unit further comprises a first power supply line providing a power supply signal to the pixel drive circuit, a body portion of the first power supply line extends along the second direction, and the second compensation line is connected with the first power supply line through a via.

3. The display substrate according to claim 1, wherein the first circuit unit further comprises a first power supply line providing a power supply signal to the pixel drive circuit, a body portion of the first power supply line extends along the second direction, and at least a portion of the second compensation line is disposed between the first power supply line and the data signal wire.

4. The display substrate according to claim 1, wherein the initial signal wire comprises a first initial signal wire and a second initial signal wire, body portions of the first initial signal wire and the second initial signal wire extend along the first direction, and the orthographic projection of the first compensation line in the plane of the display substrate is at least partially overlapped with an orthographic projection of the first initial signal wire or the second initial signal wire in the plane of the display substrate.

5. The display substrate according to claim 4, wherein the initial signal wire further comprises an initial signal connection line, a body portion of the initial signal connection line extends along the second direction, and the initial signal connection line is connected with the first initial signal wire.

6. The display substrate according to claim 5, wherein an orthographic projection of the second compensation line in the plane of the display substrate is at least partially overlapped with an orthographic projection of the initial signal connection line in the plane of the display substrate.

7. The display substrate according to claim 1, wherein the first compensation line and the second compensation line intersect with each other and form an integrated structure connected with each other.

8. The display substrate according to claim 1, wherein two second compensation lines are connected at a side of the first compensation line in the second direction or at a side of the first compensation line in an opposite direction of the second direction, and the two second compensation lines are connected with each other by a connection strip extending along the first direction.

9. The display substrate according to claim 1, wherein the tracing circuit unit comprises a first circuit unit provided with the first data fan-out line and a second circuit unit provided with the second data fan-out line; the first circuit unit is further provided with any one or more of the following: a third compensation line, a fifth compensation line and a seventh compensation line; the second circuit unit is further provided with any one or more of the following: a fourth compensation line, a sixth compensation line and an eighth compensation line.

10. The display substrate according to claim 9, wherein the seventh compensation line extends along the second direction; at a side of the first data fan-out line in the second direction, two seventh compensation lines are arranged at intervals from the first data fan-out line, and the two seventh compensation lines are connected with each other by a connection strip extending along the first direction.

11. The display substrate according to claim 9, wherein the first circuit unit further comprises a first power supply line providing a power supply signal to the pixel drive circuit, a body portion of the first power supply line extends along the second direction, and the third compensation line or the seventh compensation line is connected with the first power supply line through a via.

12. The display substrate according to claim 9, wherein the first circuit unit further comprises a first power supply line providing a power supply signal to the pixel drive circuit, a body portion of the first power supply line extends along the second direction, and at least a portion of the third compensation line, or the fifth compensation line, or the seventh compensation line is disposed between the first power supply line and the data signal wire.

13. The display substrate according to claim 9, wherein the sixth compensation line extends along the first direction; the sixth compensation line and the second data fan-out line are connected with each other at a side of the second data fan-out line in the first direction or at a side of the second data fan-out line in an opposite direction of the first direction.

14. The display substrate according to claim 9, wherein the second circuit unit further comprises a first initial signal wire and a second initial signal wire, body portions of the first initial signal wire and the second initial signal wire extend along the first direction, an orthographic projection of the fourth compensation line, the sixth compensation line and the eighth compensation line in the plane of the display substrate is at least partially overlapped with an orthographic projection of the first initial signal wire or the second initial signal wire in the plane of the display substrate.

15. The display substrate according to claim 1, wherein the initial signal wire comprises a first initial signal wire and a second initial signal wire, body portions of the first initial signal wire and the second initial signal wire extend along the first direction, and an orthographic projection of the first data fan-out line in the plane of the display substrate is at least partially overlapped with an orthographic projection of the first initial signal wire or the second initial signal wire in the plane of the display substrate.

16. The display substrate according to claim 1, wherein the circuit unit further comprises a first power supply line providing a power supply signal to the pixel drive circuit, a body portion of the first power supply line extends along the second direction, and at least a portion of the second data fan-out line is disposed between the first power supply line and the data signal wire.

17. The display substrate according to claim 5, wherein, in a plane perpendicular to the display substrate, the drive circuit layer comprises a first conductive layer, a second conductive layer, a third conductive layer and a fourth conductive layer sequentially arranged on the base substrate, and insulating layers are arranged between the first conductive layer and the second conductive layer, between the second conductive layer and the third conductive layer, and between the third conductive layer and the fourth conductive layer; the first compensation line, the second compensation line, the first data fan-out line and the second data fan-out line are arranged on the same layer.

18. The display substrate according to claim 17, wherein the data signal wire is disposed in a different conductive layer from the first data fan-out line and the second data fan-out line, and the first data fan-out line or the second data fan-out line is connected with the data signal wire through a via.

19. The display substrate according to claim 18, wherein the data signal wire is disposed in the third conductive layer, and the first data fan-out line and the second data fan-out line are disposed in the fourth conductive layer.

20. The display substrate according to claim 17, wherein the first initial signal wire of the initial signal wire is disposed in the second conductive layer, and the initial signal connection line of the initial signal wire is disposed in the third conductive layer, the initial signal connection line is connected with the first initial signal wire through a via.

* * * * *